US012360630B2

(12) United States Patent
Van Ostrand et al.

(10) Patent No.: US 12,360,630 B2
(45) Date of Patent: Jul. 15, 2025

(54) TOUCH SENSOR DEVICE WITH DIFFERENTIATED PRIORITY SENSING REGION

(71) Applicant: SIGMASENSE, LLC., Wilmington, DE (US)

(72) Inventors: Daniel Keith Van Ostrand, Leander, TX (US); Richard Stuart Seger, Jr., Belton, TX (US); Kevin Joseph Derichs, Buda, TX (US)

(73) Assignee: SIGMASENSE, LLC., Austin, TX (US)

( * ) Notice: Subject to any disclaimer, the term of this patent is extended or adjusted under 35 U.S.C. 154(b) by 0 days.

(21) Appl. No.: 18/204,734

(22) Filed: Jun. 1, 2023

(65) Prior Publication Data

US 2023/0393686 A1 Dec. 7, 2023

Related U.S. Application Data

(60) Provisional application No. 63/348,515, filed on Jun. 3, 2022.

(51) Int. Cl.
*G06F 3/041* (2006.01)
(52) U.S. Cl.
CPC .............................. *G06F 3/04166* (2019.05)
(58) Field of Classification Search
CPC .................................................. G06F 3/04166
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

Baker; How delta-sigma ADCs work, Part 1; Analog Applications Journal; Oct. 1, 2011; 6 pgs.

(Continued)

*Primary Examiner* — Ariel A Balaoing
(74) *Attorney, Agent, or Firm* — Garlick & Markison; Timothy W. Markison; Shayne X. Short

(57) ABSTRACT

A touch sensor device (TSD) includes a panel and drive-sense circuits (DSCs). The panel includes electrodes, and the DSCs are operably coupled to the electrodes. A DSC is operably coupled via a single line to an electrode and is configured to provide a signal via the single line to the electrode and simultaneously to sense the signal via the single line. The sensing of the signal includes detection of an electrical characteristic of the electrode and/or a change of the signal. The DSC is also configured to generate a digital signal representative of the electrical characteristic of the electrode and/or the change of the signal. The TSD also includes one or more processing modules operably coupled to the DSCs and configured to execute operational instructions to process first digital signals generated by a first subset of the DSCs that includes fewer than all of the DSCs in a prioritized manner.

20 Claims, 55 Drawing Sheets
(22 of 55 Drawing Sheet(s) Filed in Color)

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 10,222,912 B2 | 3/2019 | Hristov |
| 2003/0052657 A1 | 3/2003 | Koernle et al. |
| 2005/0235758 A1 | 10/2005 | Kowal et al. |
| 2011/0063154 A1 | 3/2011 | Hotelling et al. |
| 2011/0298745 A1 | 12/2011 | Souchkov |
| 2012/0278031 A1 | 11/2012 | Oda |
| 2013/0027347 A1* | 1/2013 | Doi ................... G06F 3/0416 345/174 |
| 2013/0154983 A1* | 6/2013 | Christiansson ....... G06F 3/0446 345/173 |
| 2013/0278447 A1 | 10/2013 | Kremin |
| 2014/0327644 A1 | 11/2014 | Mohindra |
| 2014/0380155 A1* | 12/2014 | Kim ..................... G06F 3/016 715/702 |
| 2015/0091847 A1 | 4/2015 | Chang |
| 2015/0227233 A1* | 8/2015 | Yi ...................... G06F 3/0446 345/174 |
| 2015/0346889 A1 | 12/2015 | Chen |
| 2016/0188049 A1 | 6/2016 | Yang et al. |
| 2018/0157354 A1 | 6/2018 | Blondin et al. |
| 2018/0275824 A1 | 9/2018 | Li |
| 2020/0142521 A1* | 5/2020 | Van Ostrand ........ G06F 3/0446 |
| 2020/0218322 A1* | 7/2020 | Gray ................. G01R 19/2513 |
| 2021/0208725 A1* | 7/2021 | Derichs ................. G06F 3/0412 |
| 2022/0155938 A1* | 5/2022 | Hirai .................. G06F 3/04184 |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

* cited by examiner communication system 10 computing device 12 computing device 14 computing device 18

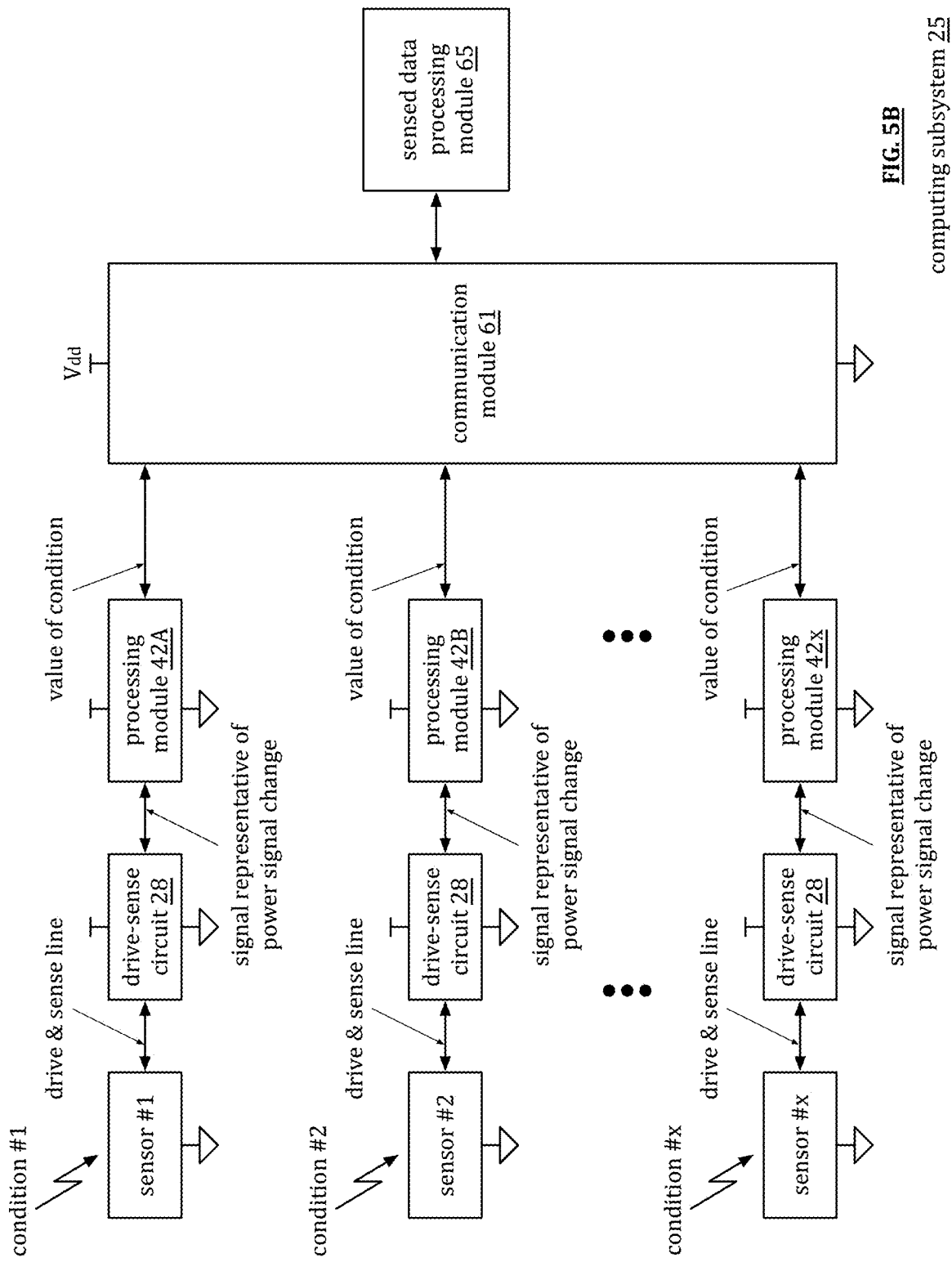

computing subsystem 25 sensor graph power signal graph power signal graph power signal graph power signal graph power signal graph

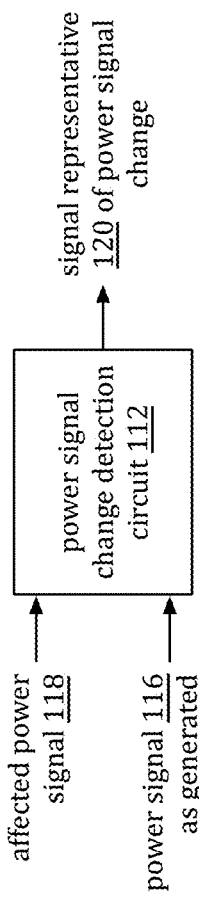
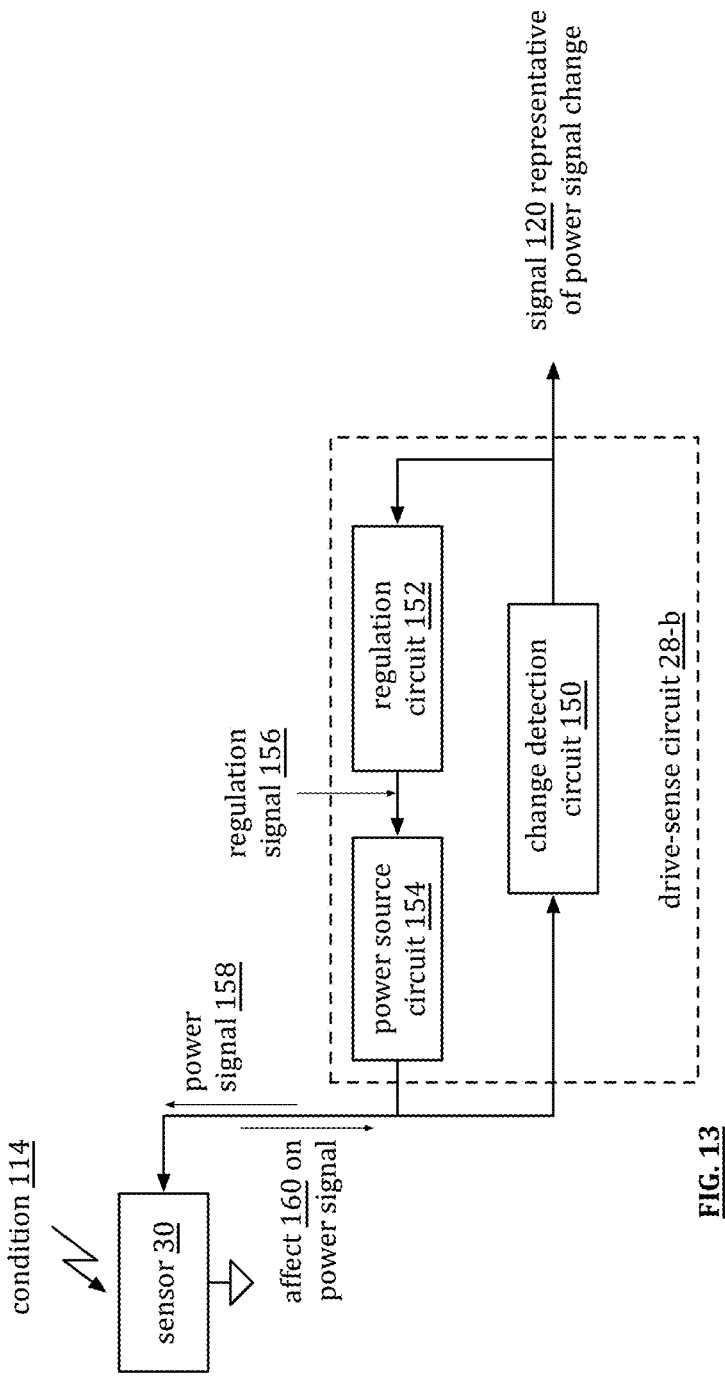

1400

1700

2100

2200

2301

2302

2400
drive-sense circuit 28-24

2500

2600

2700

2800

2901

2902

2903

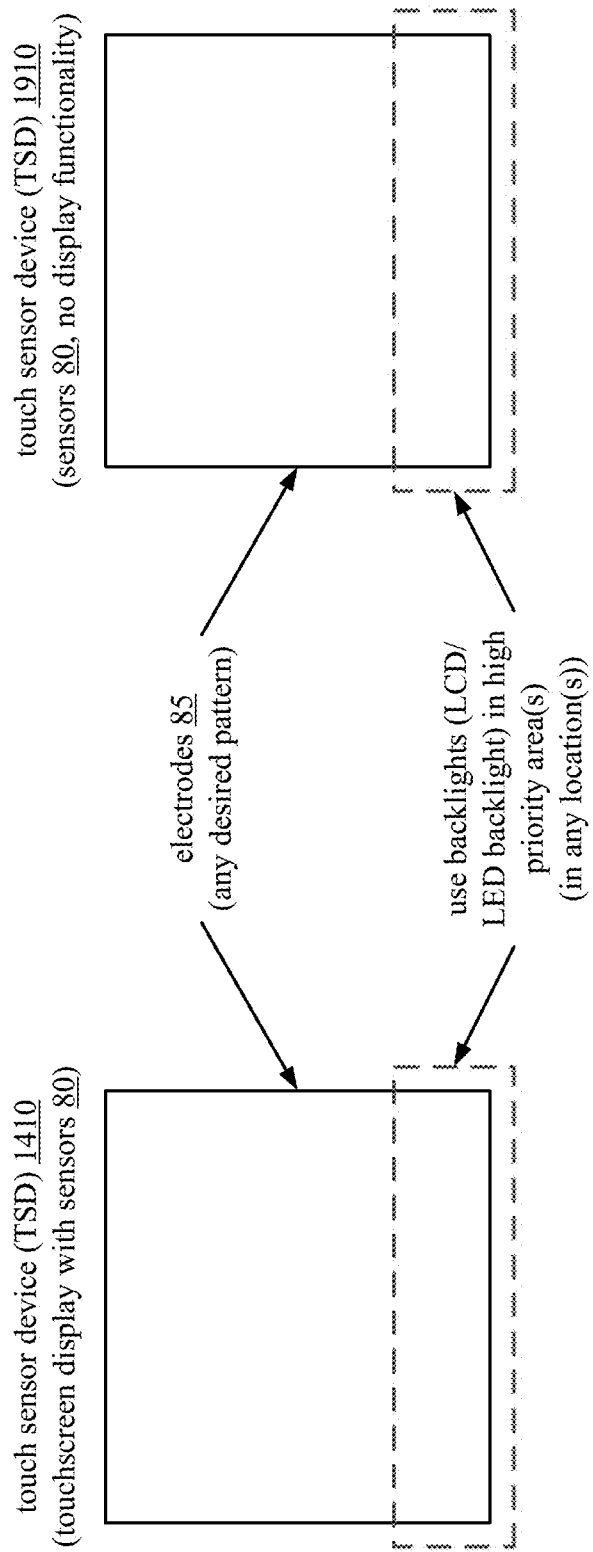

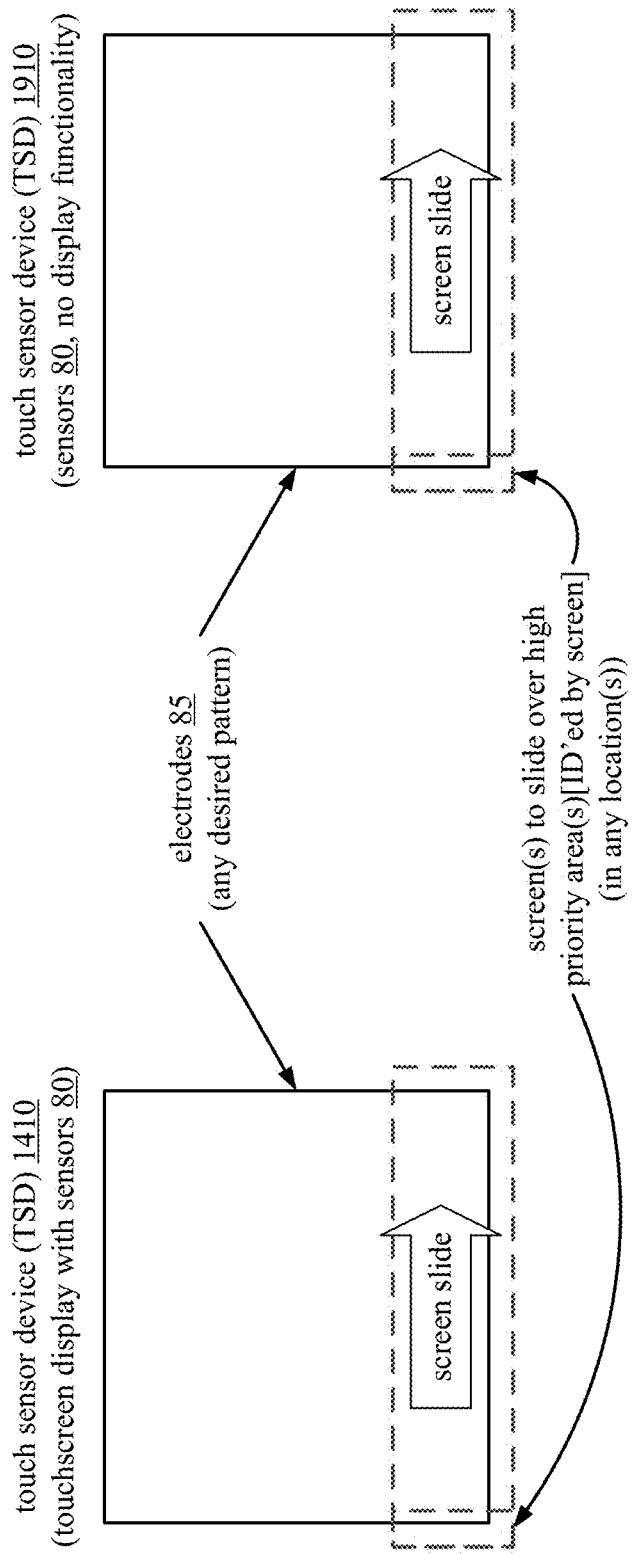

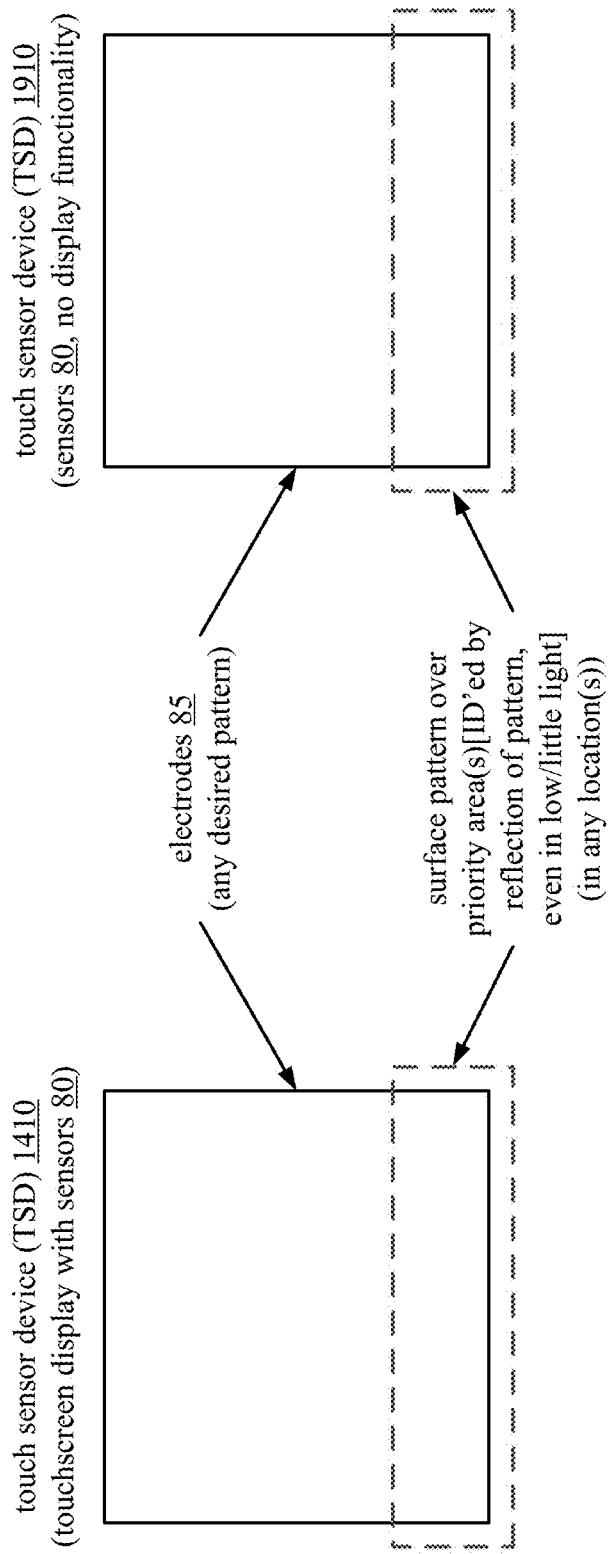

3101

3102

3103

3104

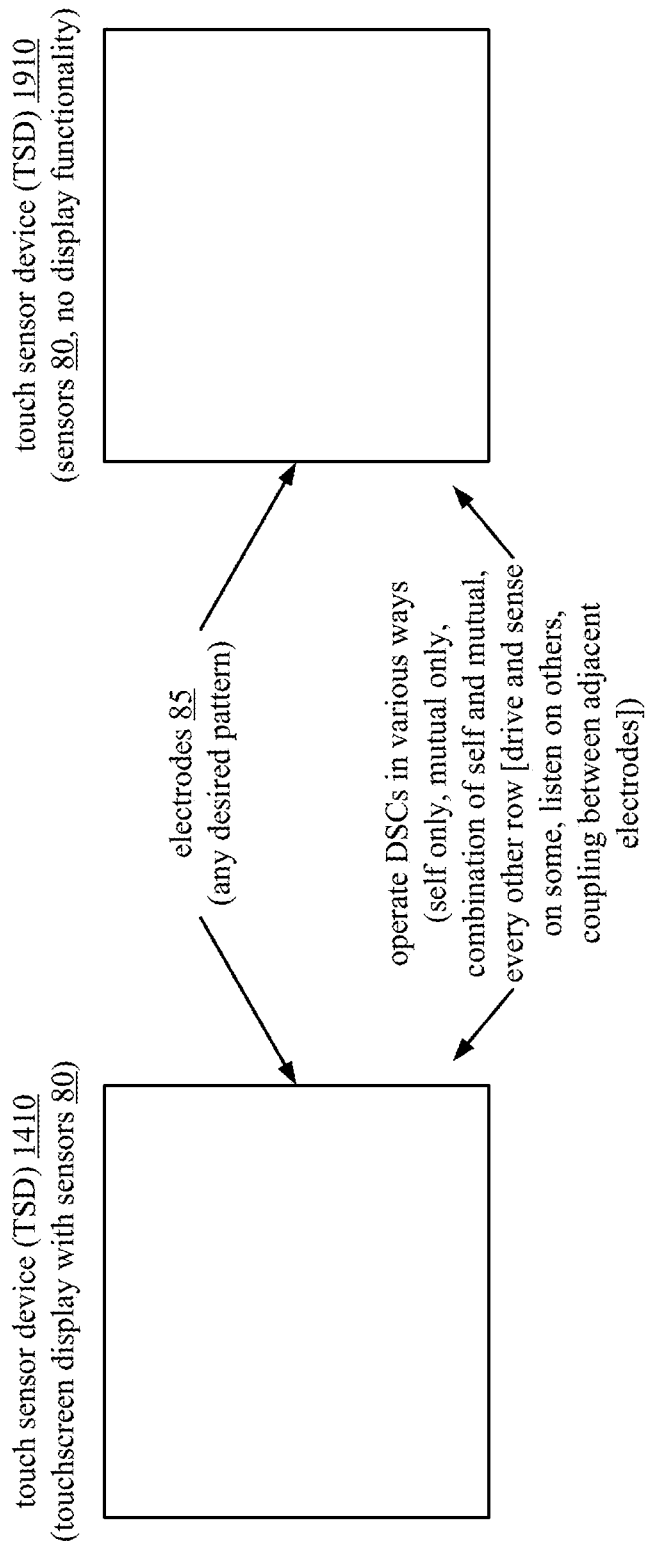

3300

3404

3501

3502

3601

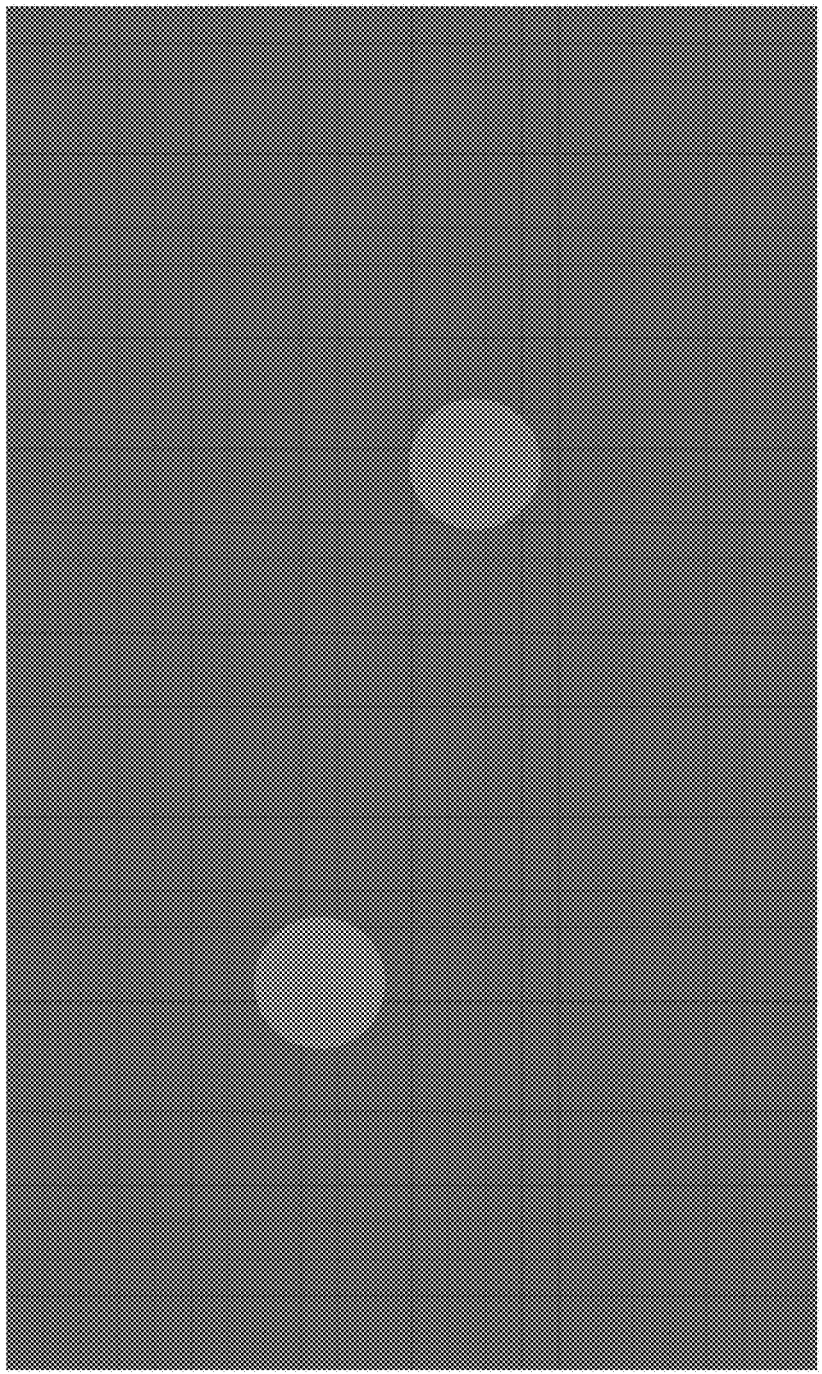
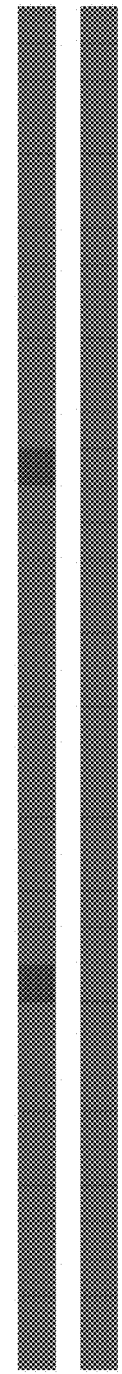
FIG. 36B
3602

3603

3604

3605

3606

3607

3608

3609

3610

TOUCH SENSOR DEVICE WITH DIFFERENTIATED PRIORITY SENSING REGION

CROSS REFERENCE TO RELATED PATENTS/PATENT APPLICATIONS

The present U.S. Utility patent application claims priority pursuant to 35 U.S.C. § 119(e) to U.S. Provisional Application No. 63/348,515, entitled "Touch Sensor Device with Differentiated Priority Sensing Region," filed Jun. 3, 2022, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to touch sensor systems and more particularly to touch sensor devices (with or without display functionality) that operate with differentiated priority sensing regions.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for a variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 5B is a schematic block diagram of another embodiment of a computing subsystem in accordance with the present disclosure;

FIG. 12 is a schematic block diagram of an embodiment of a power signal change detection circuit in accordance with the present disclosure;

FIG. 13 is a schematic block diagram of another embodiment of a drive-sense circuit in accordance with the present disclosure;

FIG. 30A is a schematic block diagram of an embodiment of a touch sensor device (TSD), which includes touchscreen display or display functionality, that includes one or more prioritized sensing regions as identified using backlights in accordance with the present disclosure;

FIG. 30B is a schematic block diagram of an embodiment of a touch sensor device (TSD), which does not include touchscreen display or display functionality yet does include at least one portion having backlights, that includes one or more prioritized sensing regions as identified using the backlights in accordance with the present disclosure;

FIG. 30C is a schematic block diagram of an embodiment of a touch sensor device (TSD), which includes touchscreen display or display functionality, that includes one or more prioritized sensing regions as identified by a screen that is configured to slide over the one or more prioritized sensing regions in accordance with the present disclosure;

FIG. 30D is a schematic block diagram of an embodiment of a touch sensor device (TSD), which does not include touchscreen display or display functionality, that includes one or more prioritized sensing regions as identified by a screen that is configured to slide over the one or more prioritized sensing regions in accordance with the present disclosure;

FIG. 30E is a schematic block diagram of an embodiment of a touch sensor device (TSD), which includes touchscreen display or display functionality, that includes one or more prioritized sensing regions as identified by a surface pattern in accordance with the present disclosure;

FIG. 30F is a schematic block diagram of an embodiment of a touch sensor device (TSD), which does not include touchscreen display or display functionality, that includes one or more prioritized sensing regions as identified by a surface pattern in accordance with the present disclosure;

Figure 15:
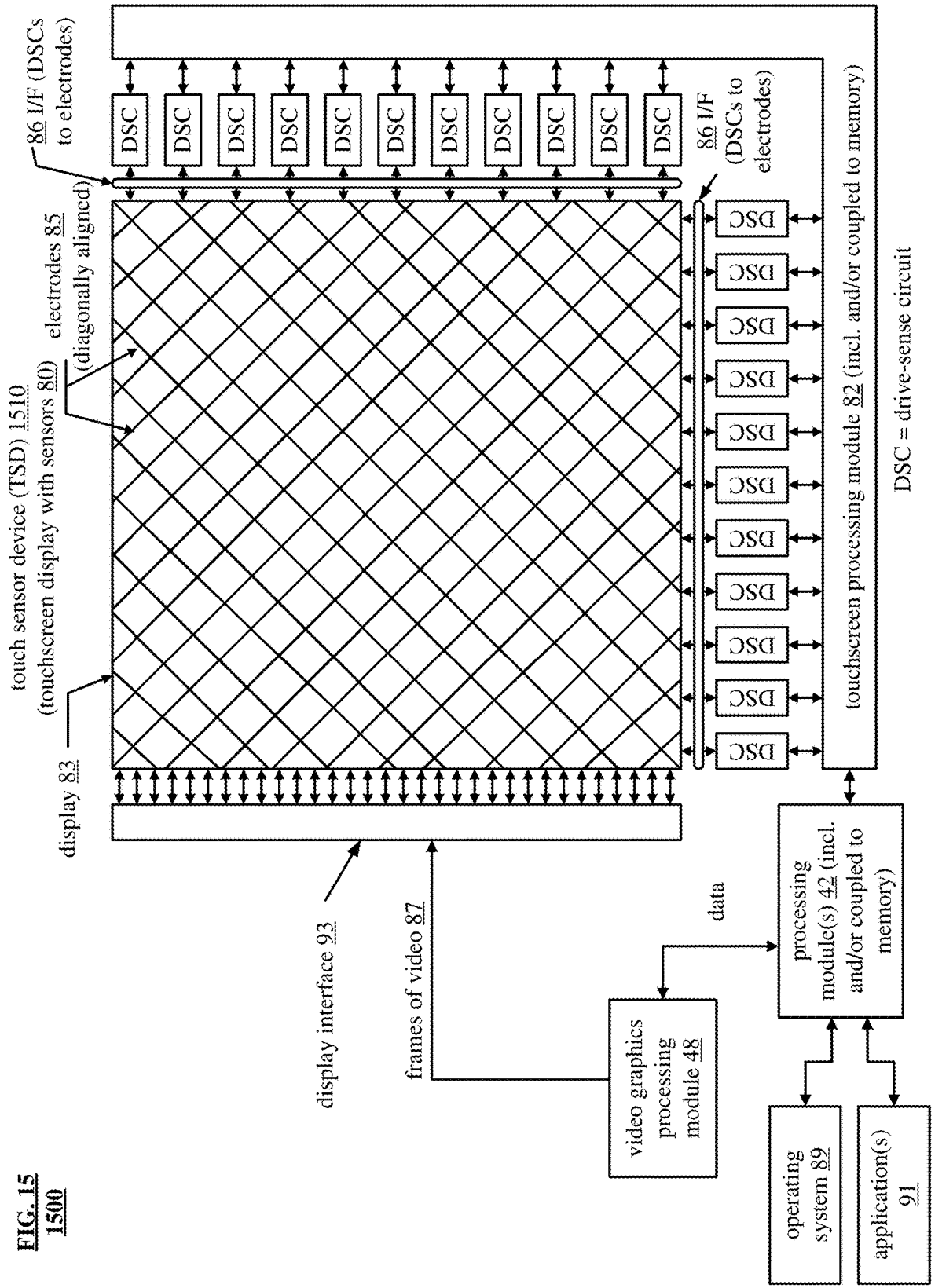
FIG. 15 is a schematic block diagram of another embodiment of a touch sensor device (TSD) in accordance with the present disclosure.
Figure 17:
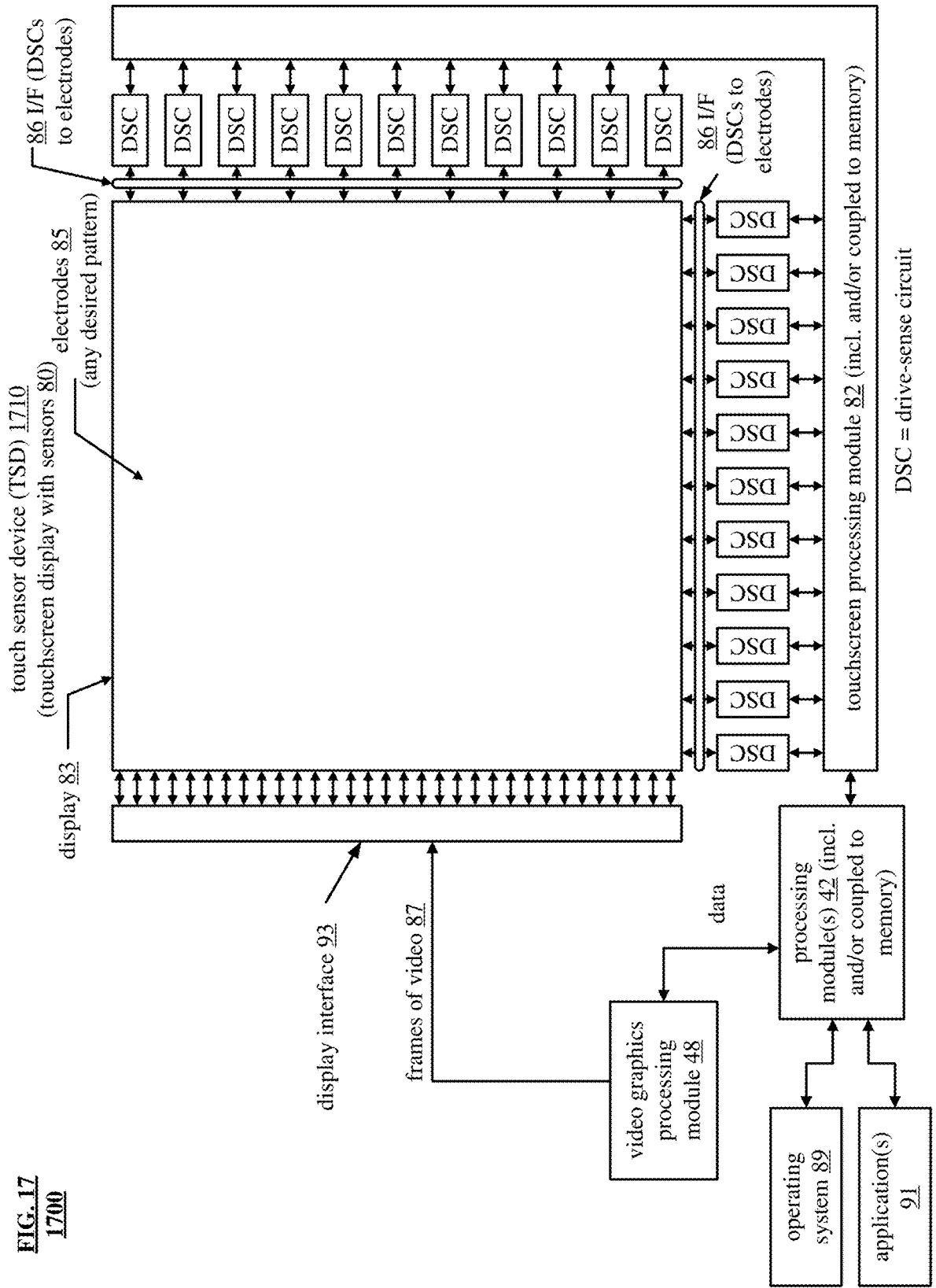
FIG. 17 is a schematic block diagram of another embodiment of a touch sensor device (TSD) that is similar to FIG. 15 with the option of using any desired electrode pattern in accordance with the present disclosure.
Figure 18:
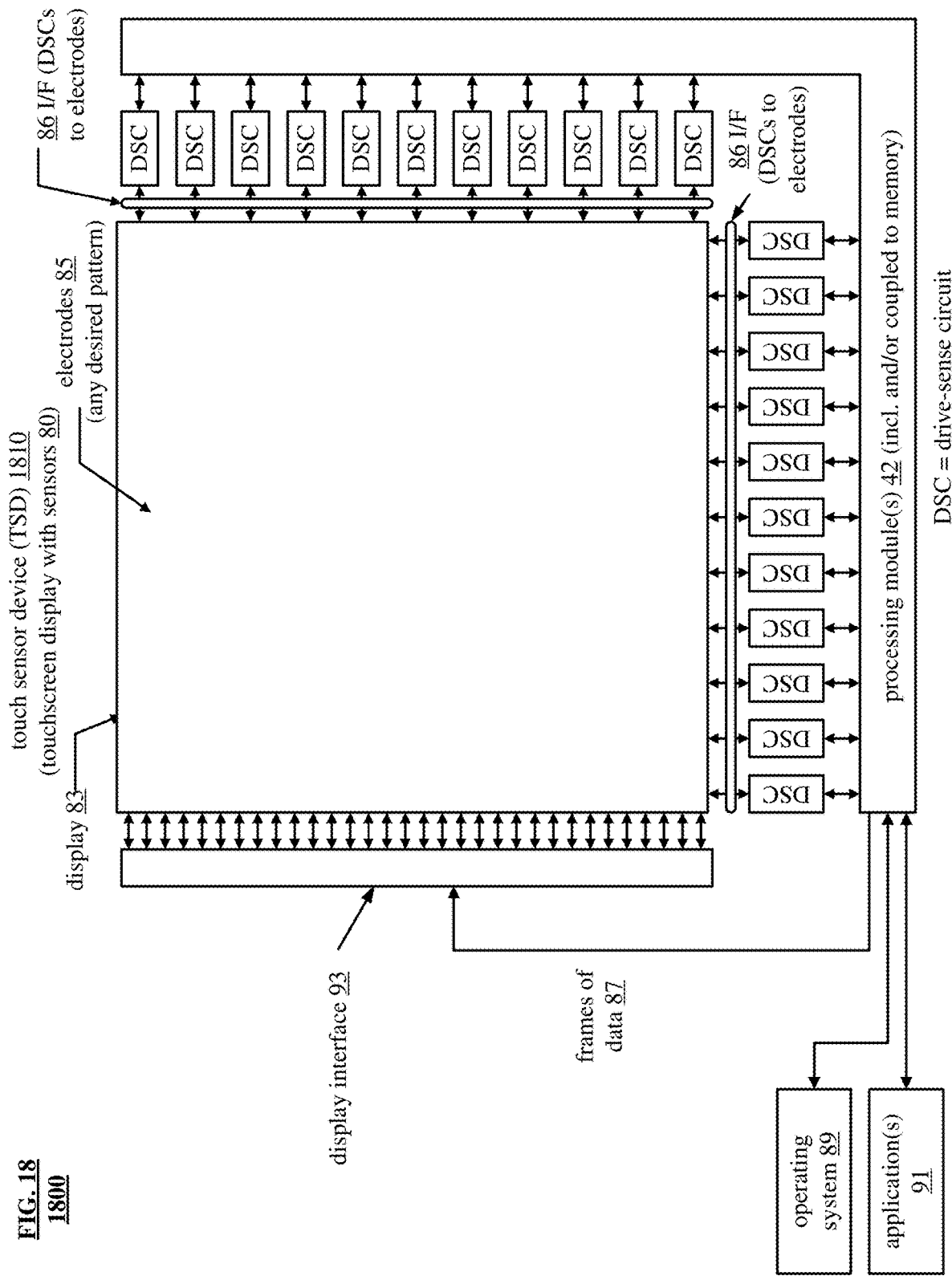
FIG. 18 is a schematic block diagram of another embodiment of a touch sensor device (TSD) in accordance with the present disclosure.
Figure 19:
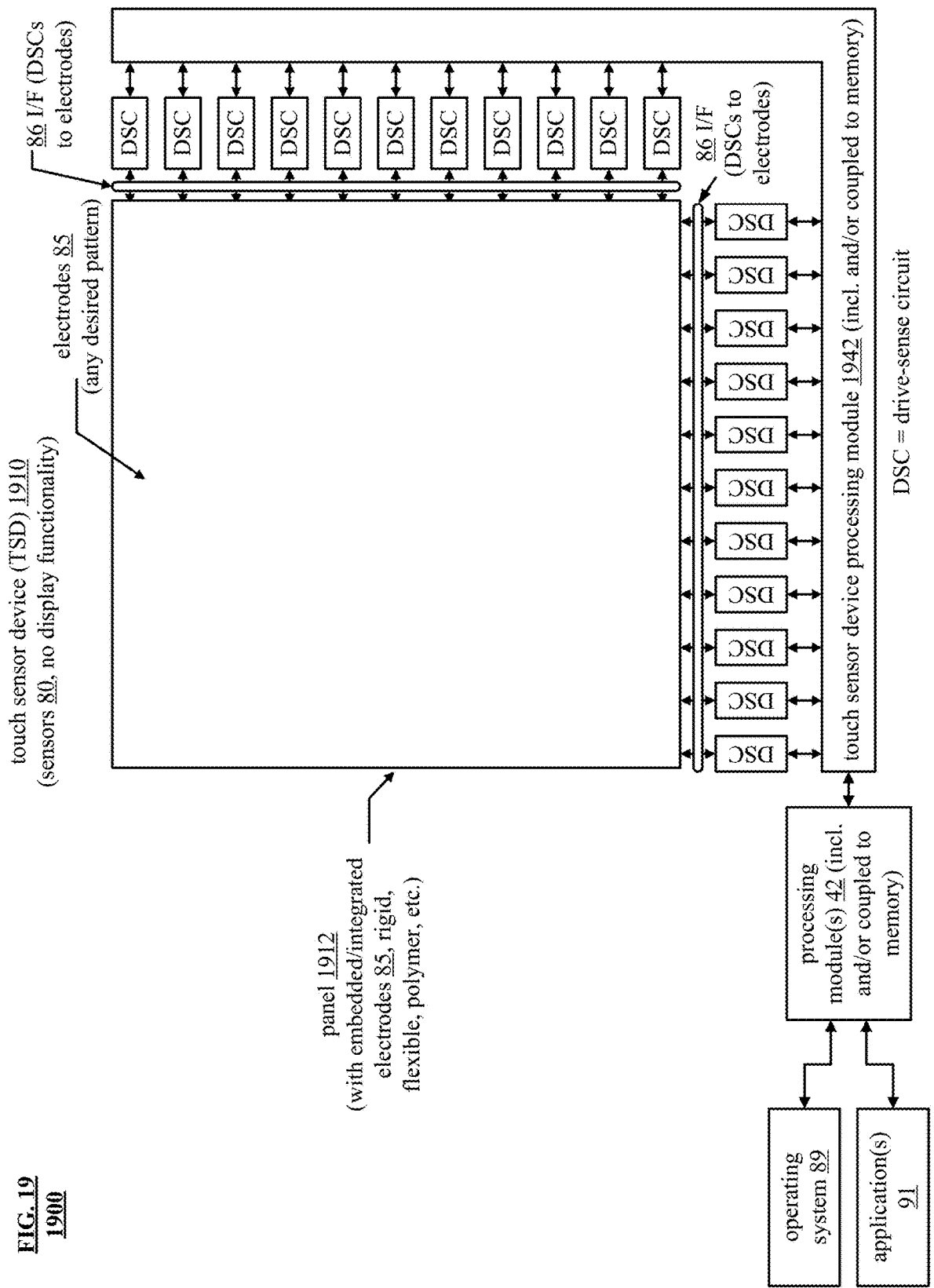
FIG. 19 is a schematic block diagram of an embodiment of a touch sensor device (TSD) in accordance with the present disclosure.
Figure 20:
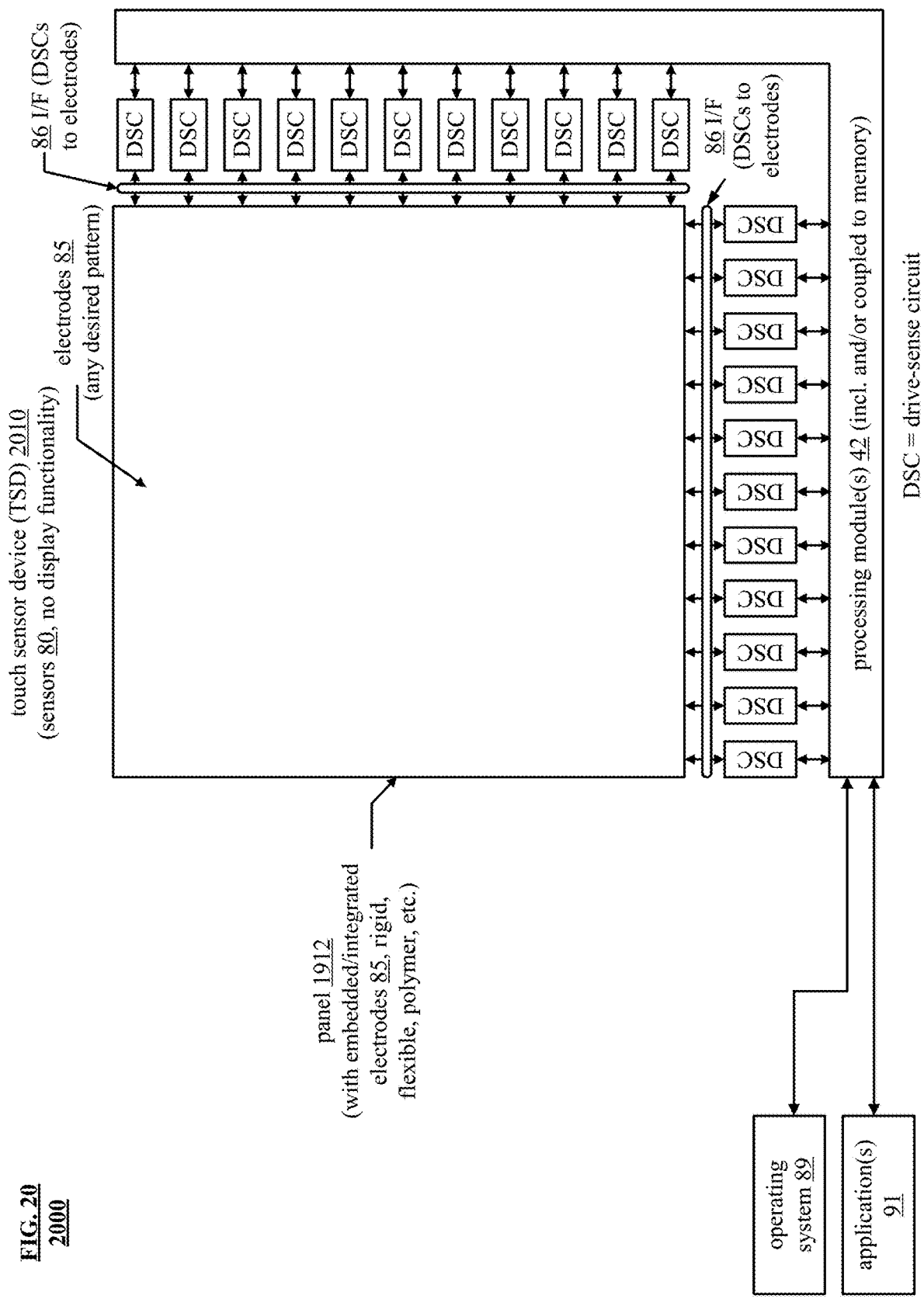
FIG. 20 is a schematic block diagram of another embodiment of a touch sensor device (TSD) in accordance with the present disclosure.
Figure 33:
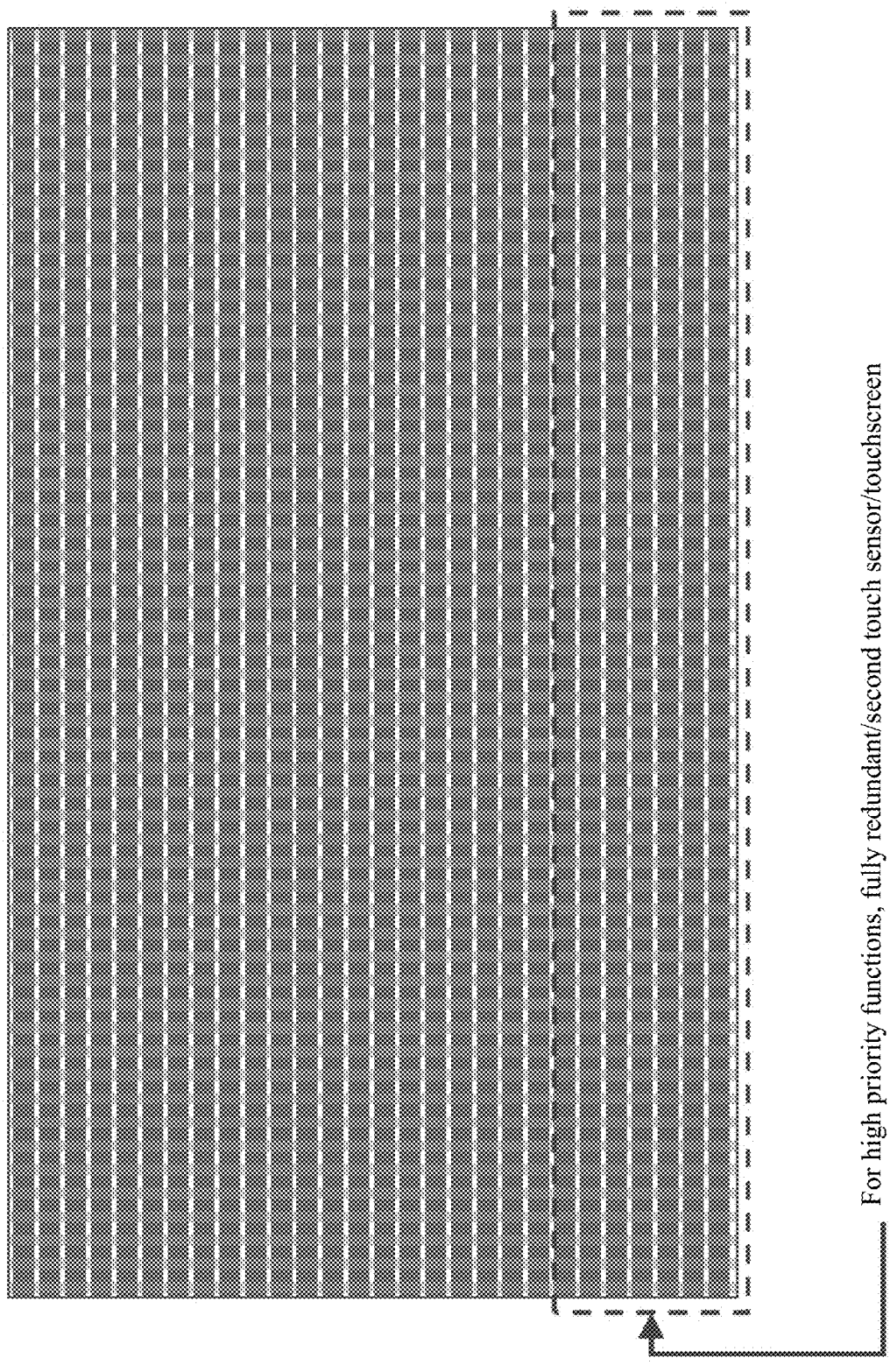
Figure 34A:
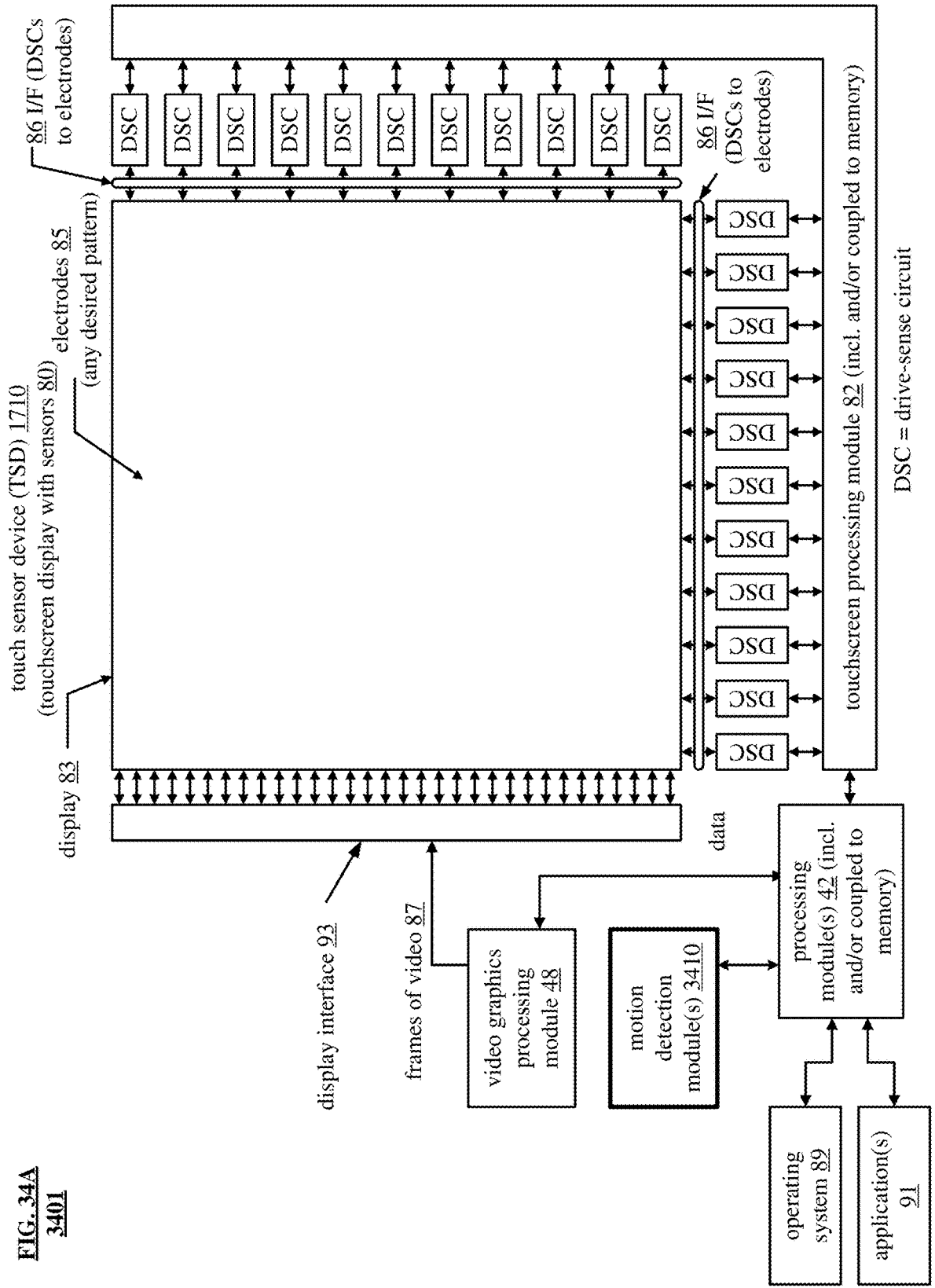
Figure 34B:
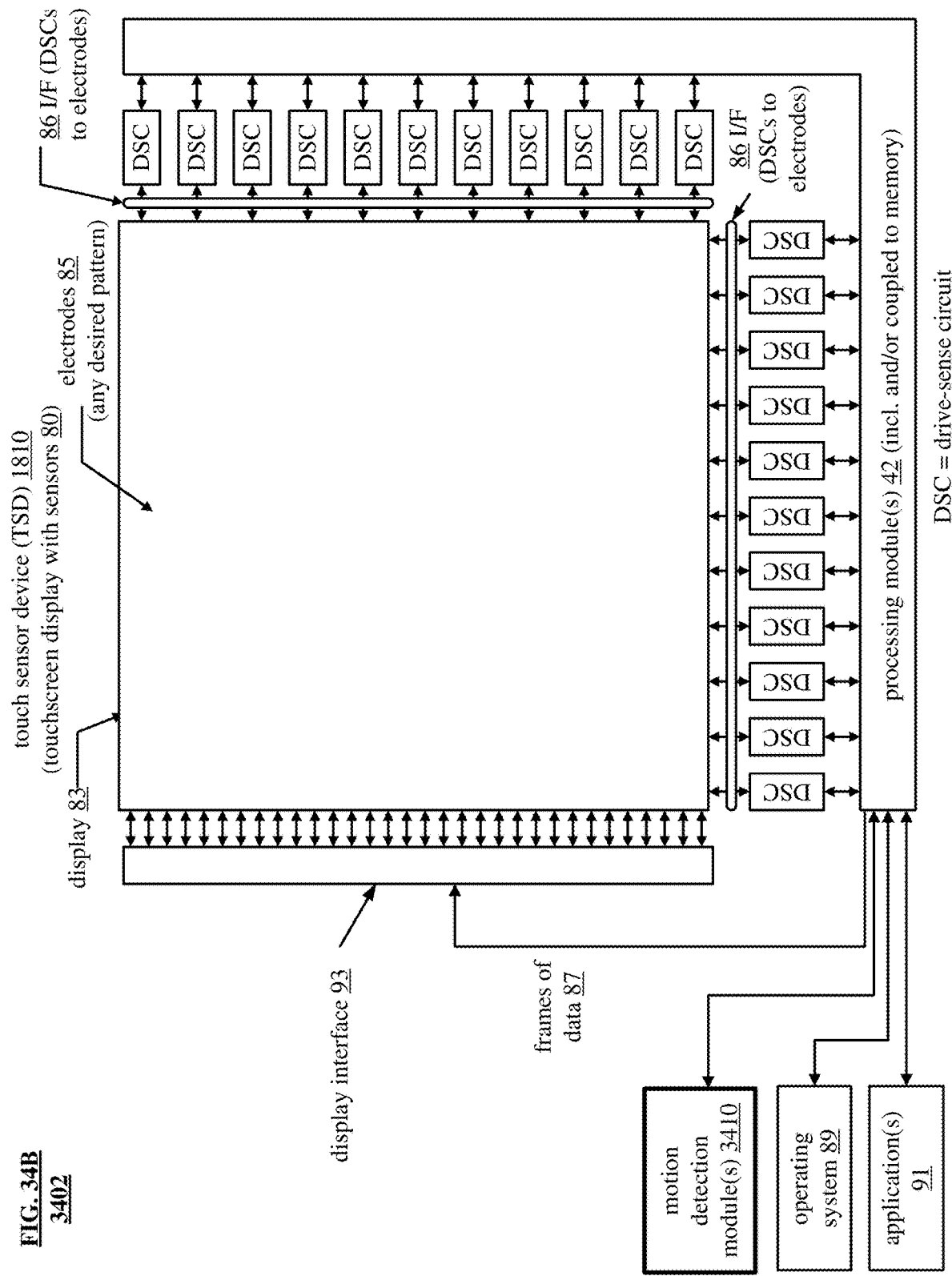
Figure 34C:
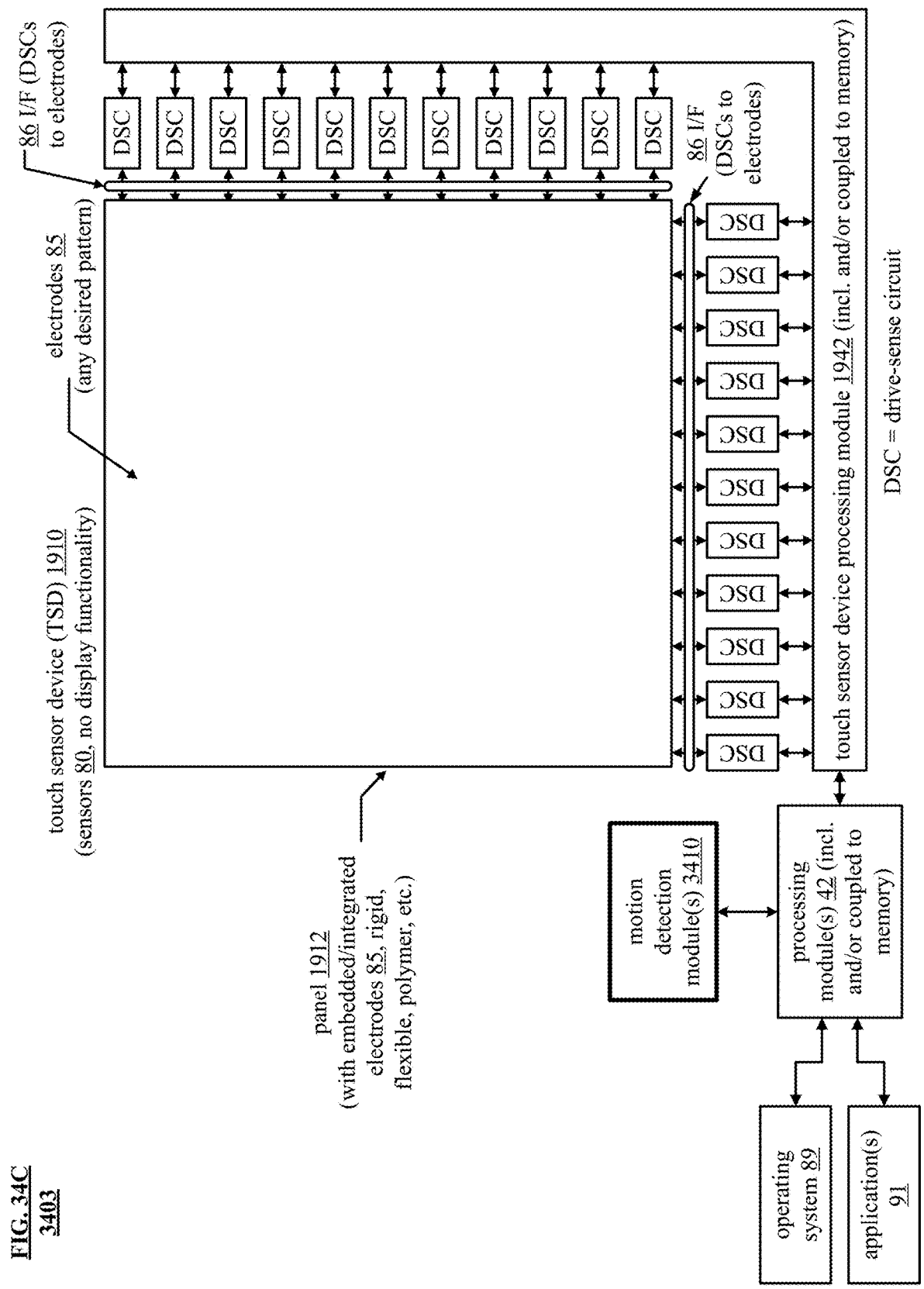
Figure 34D:
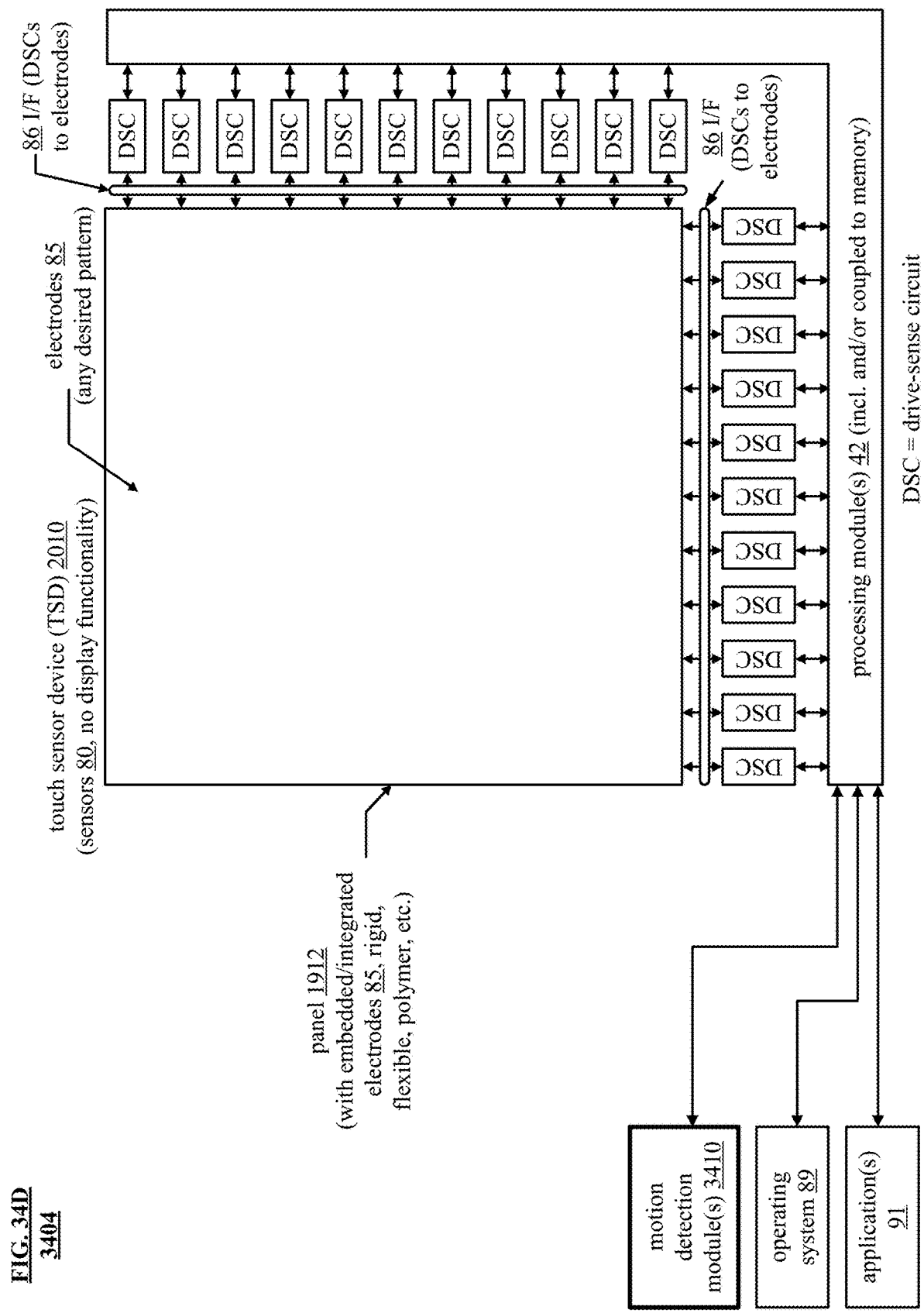
Figure 35A:
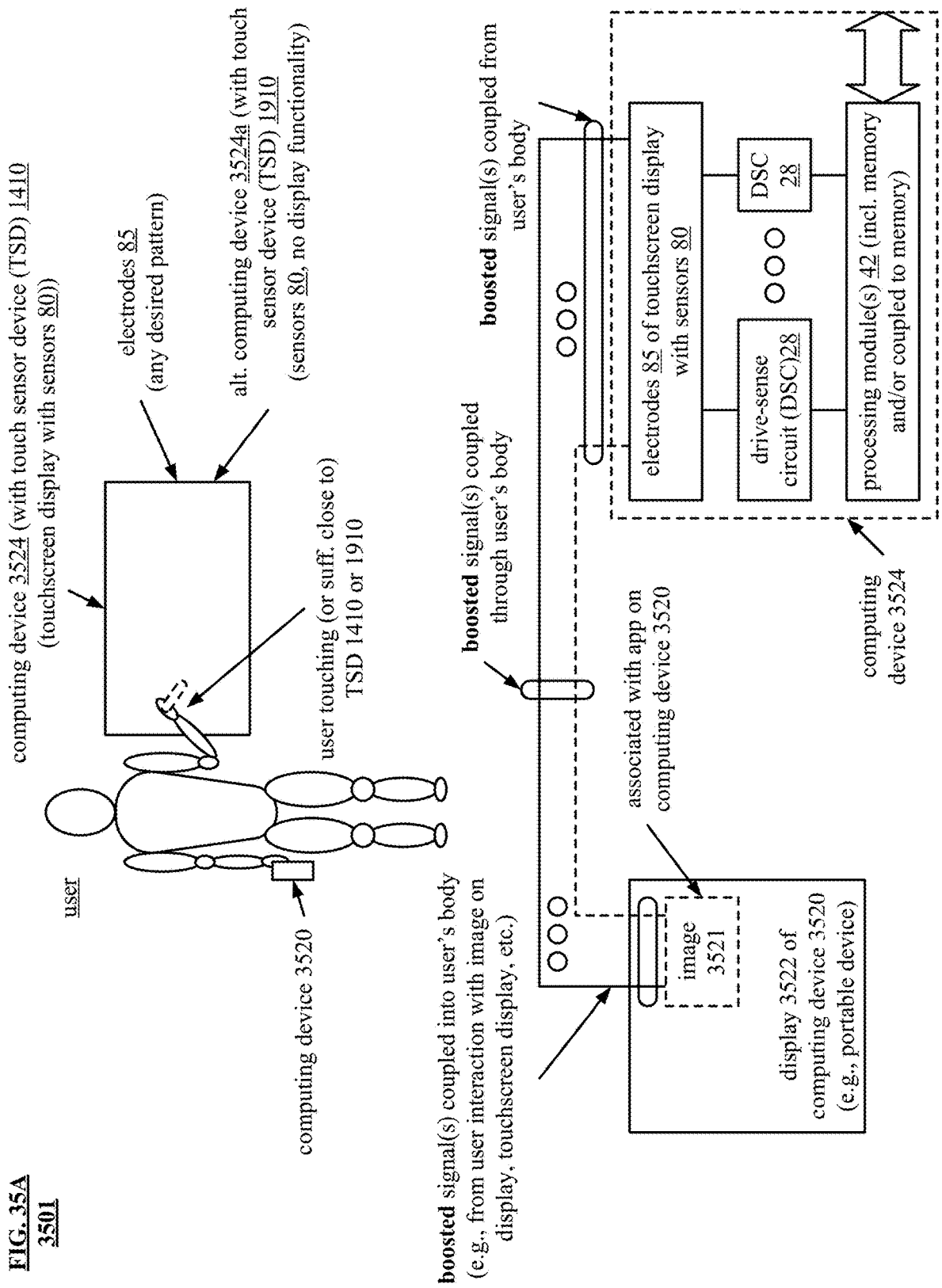
Figure 35B:
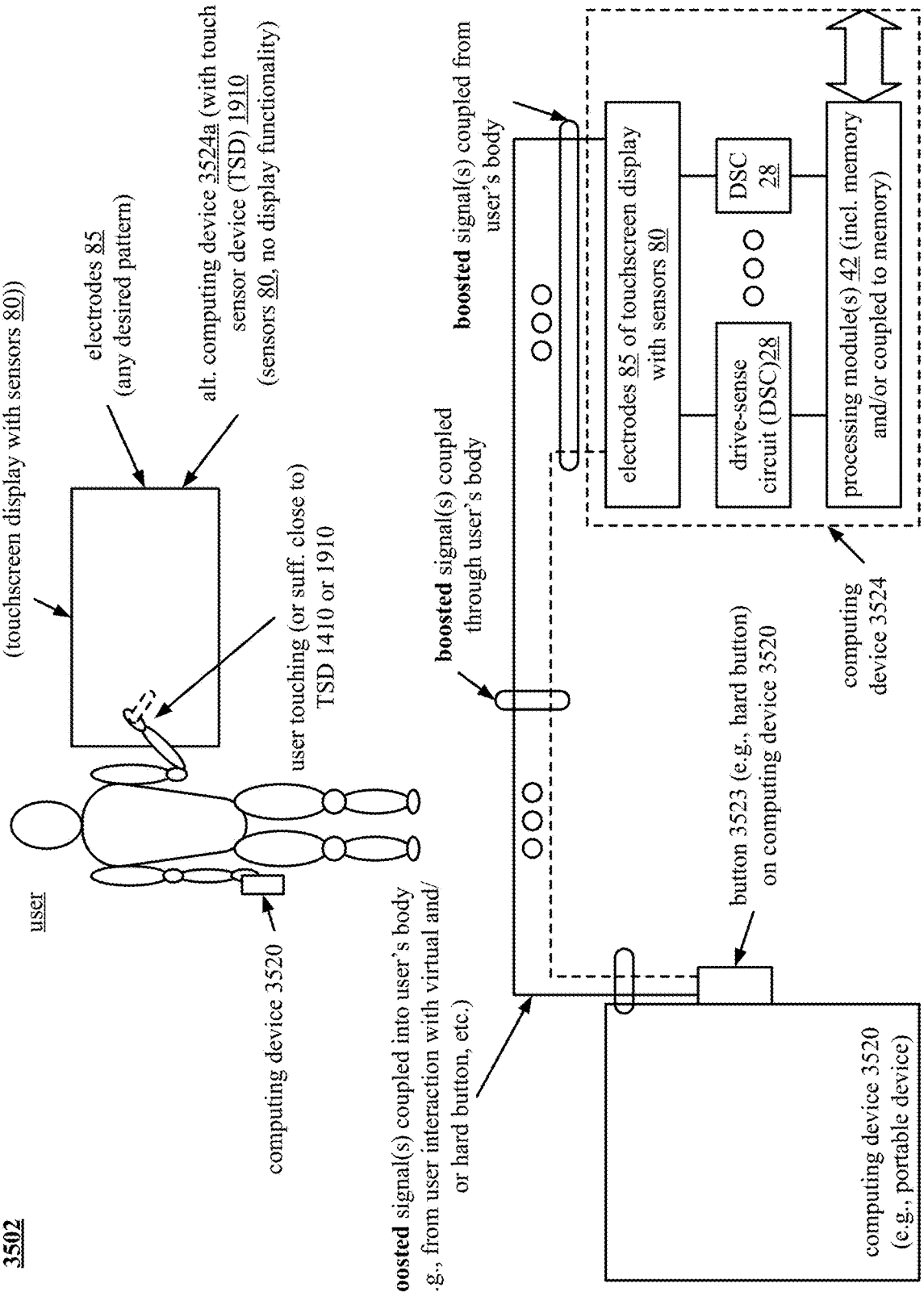
Figure 36A:
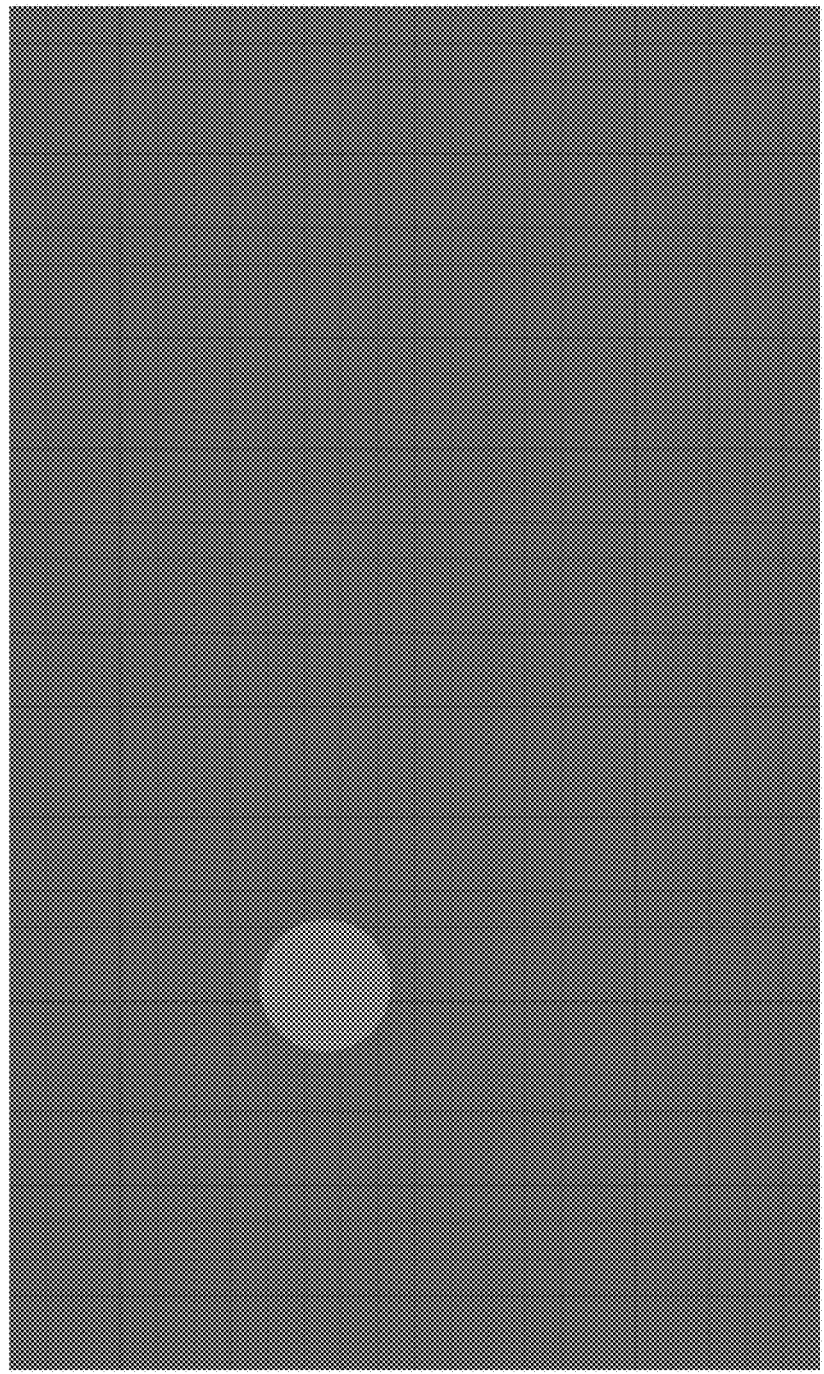
Figure 36C:
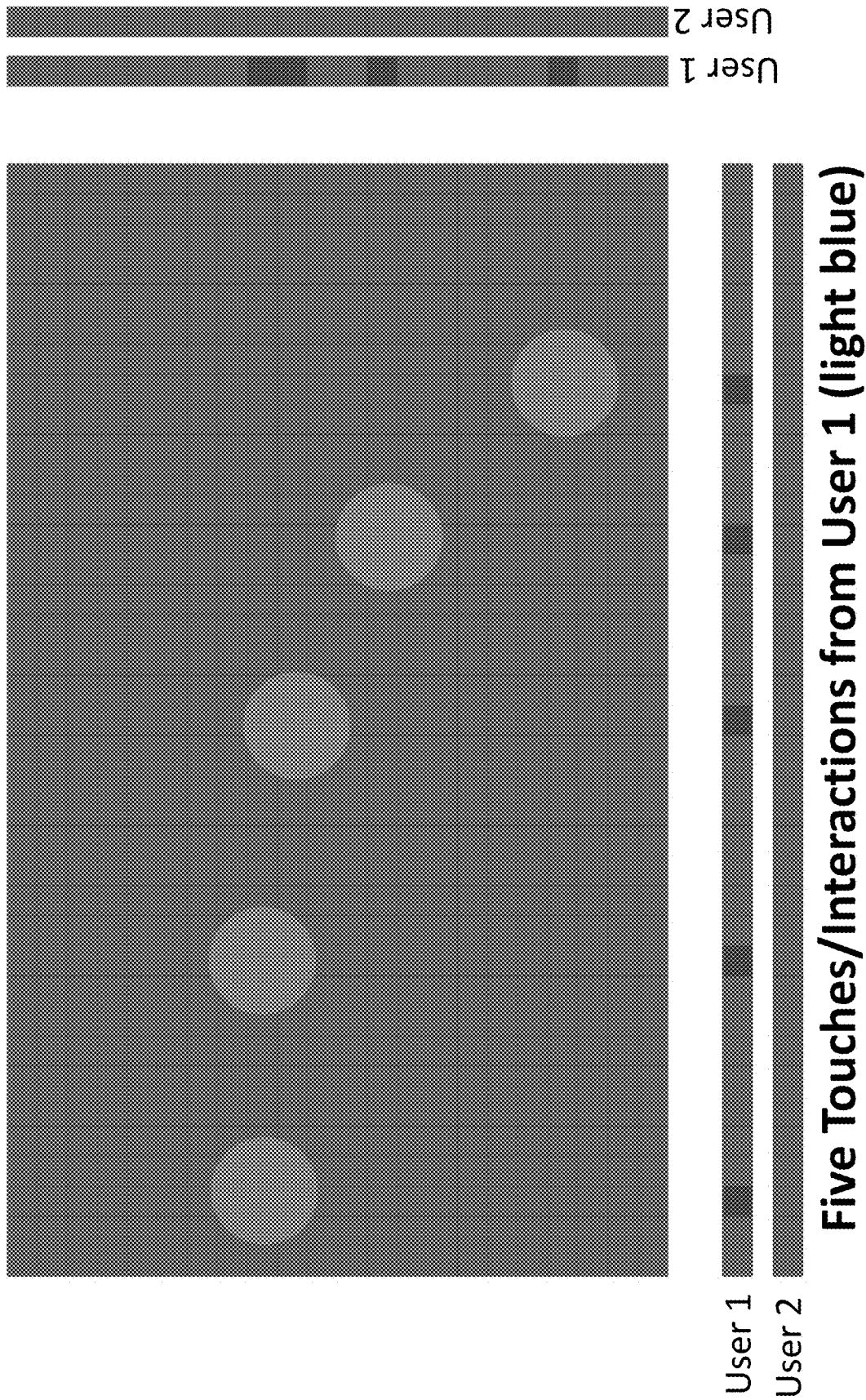
Figure 36D:
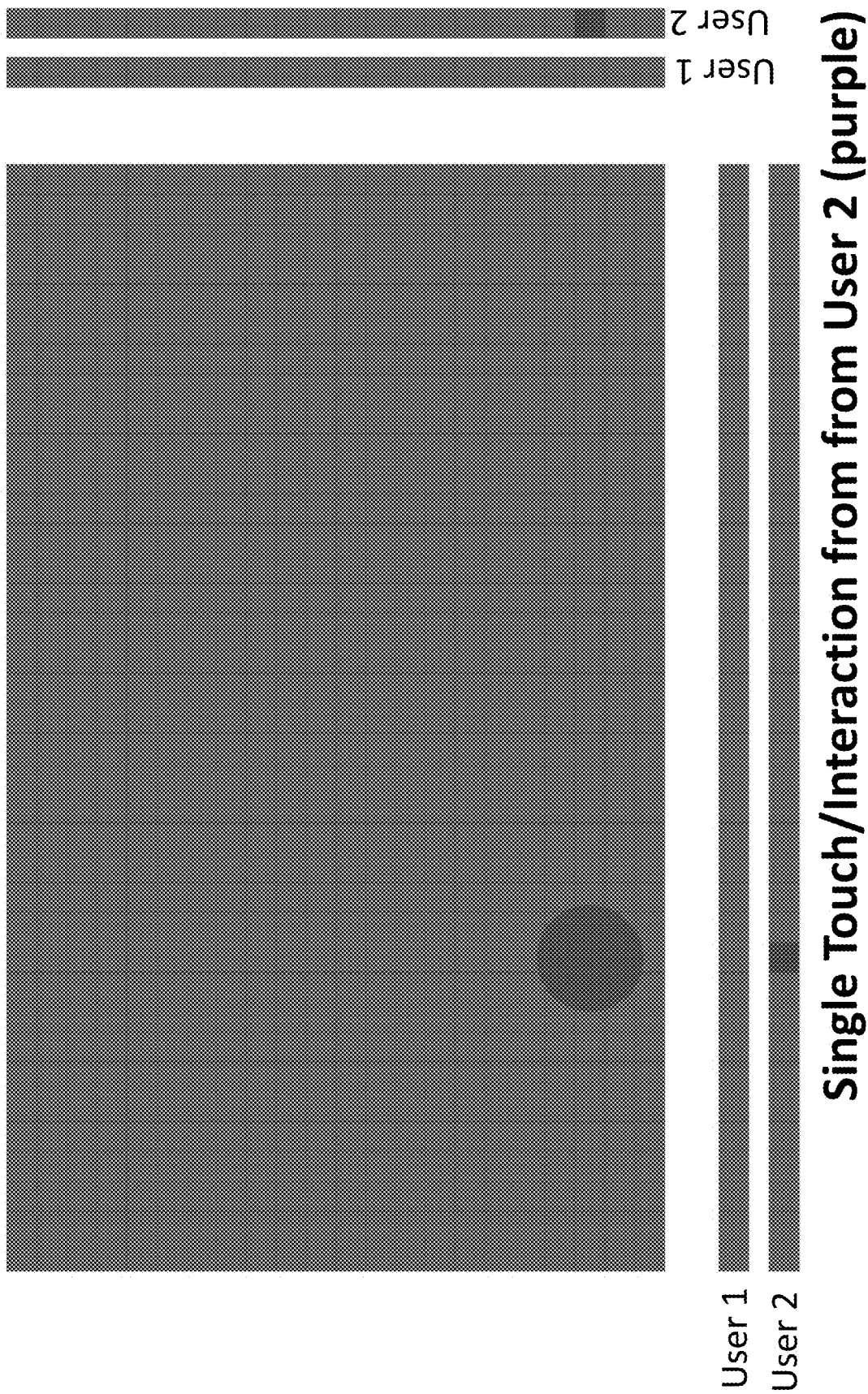
Figure 36E:
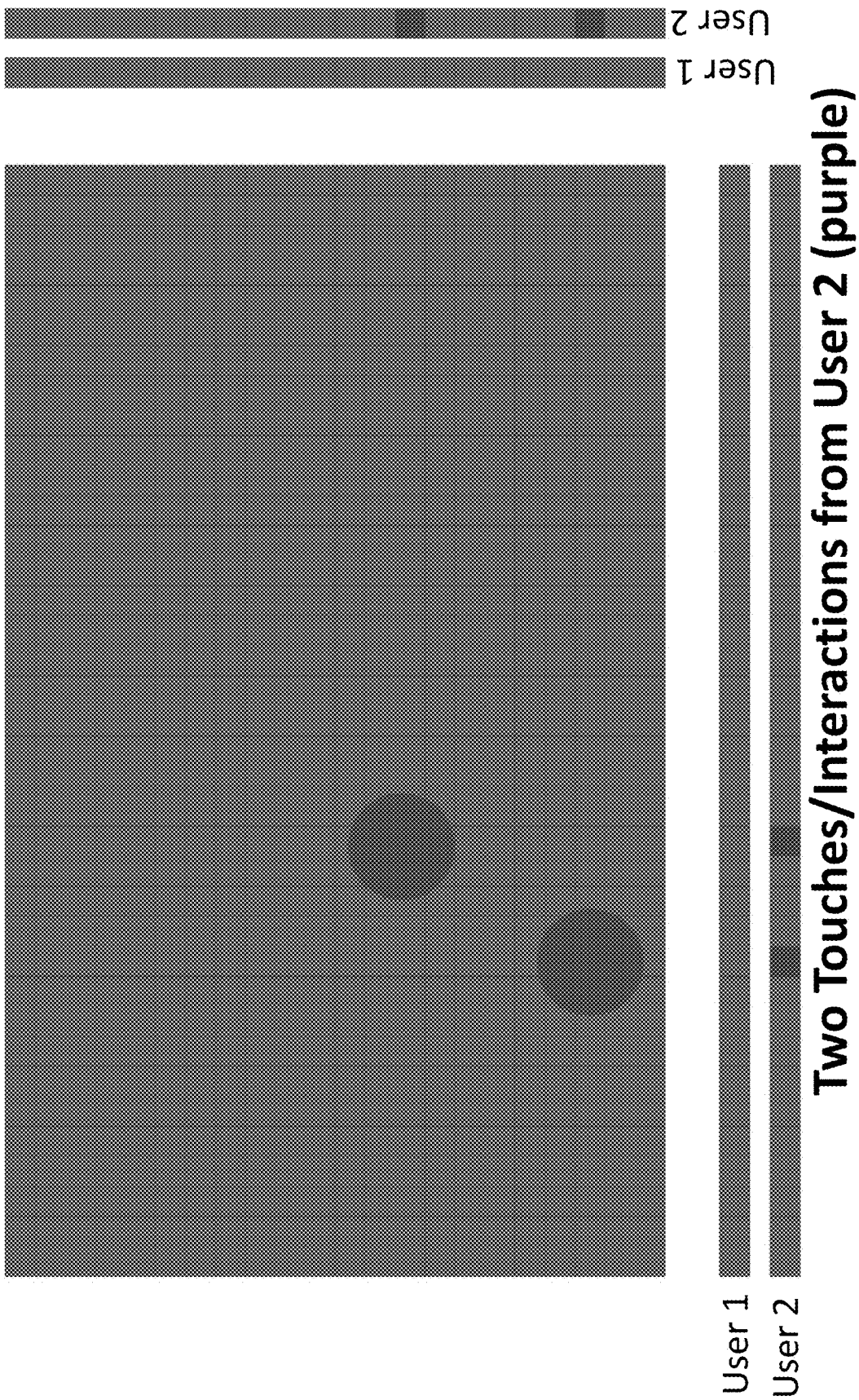
Figure 36F:
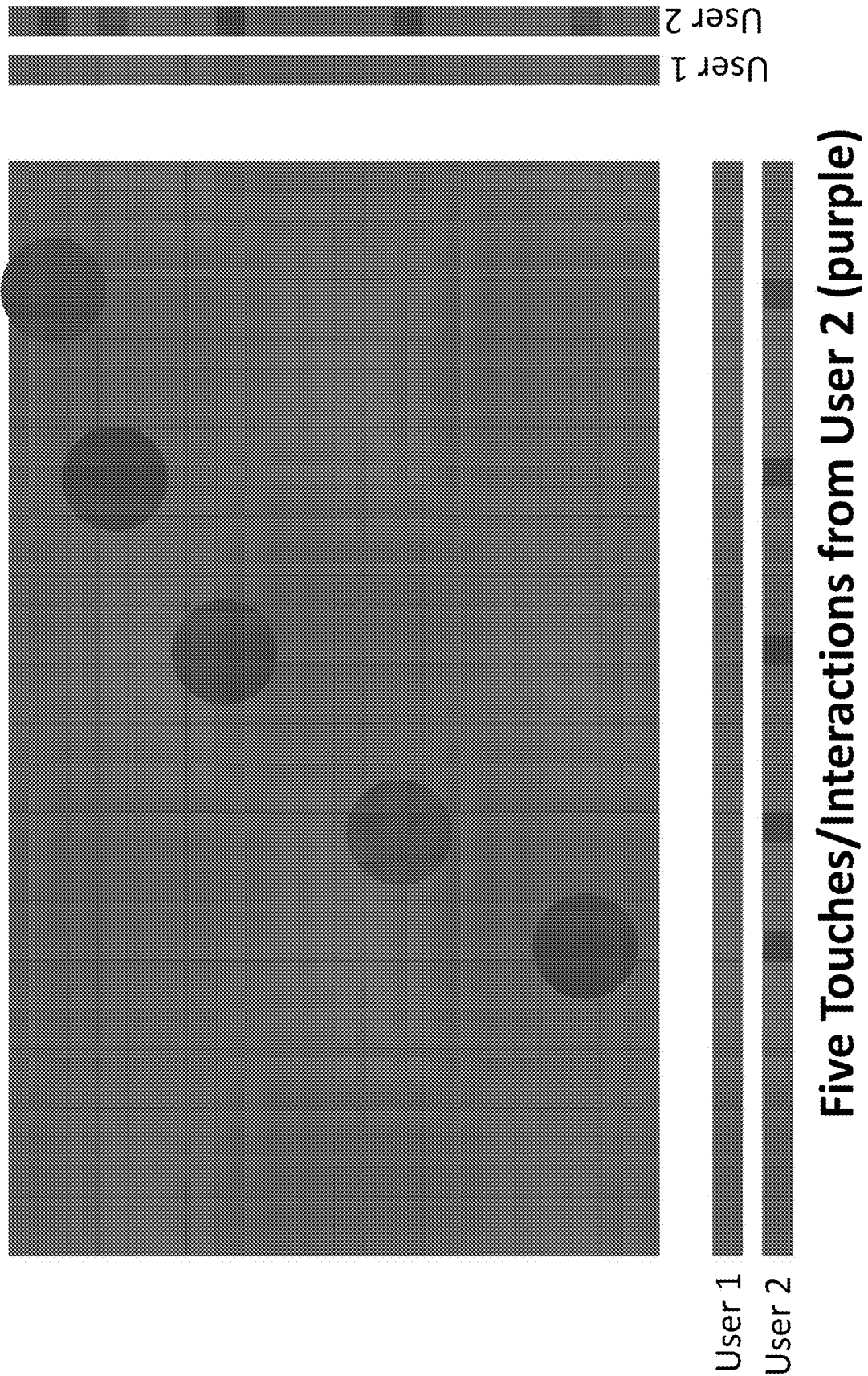
Figure 36G:
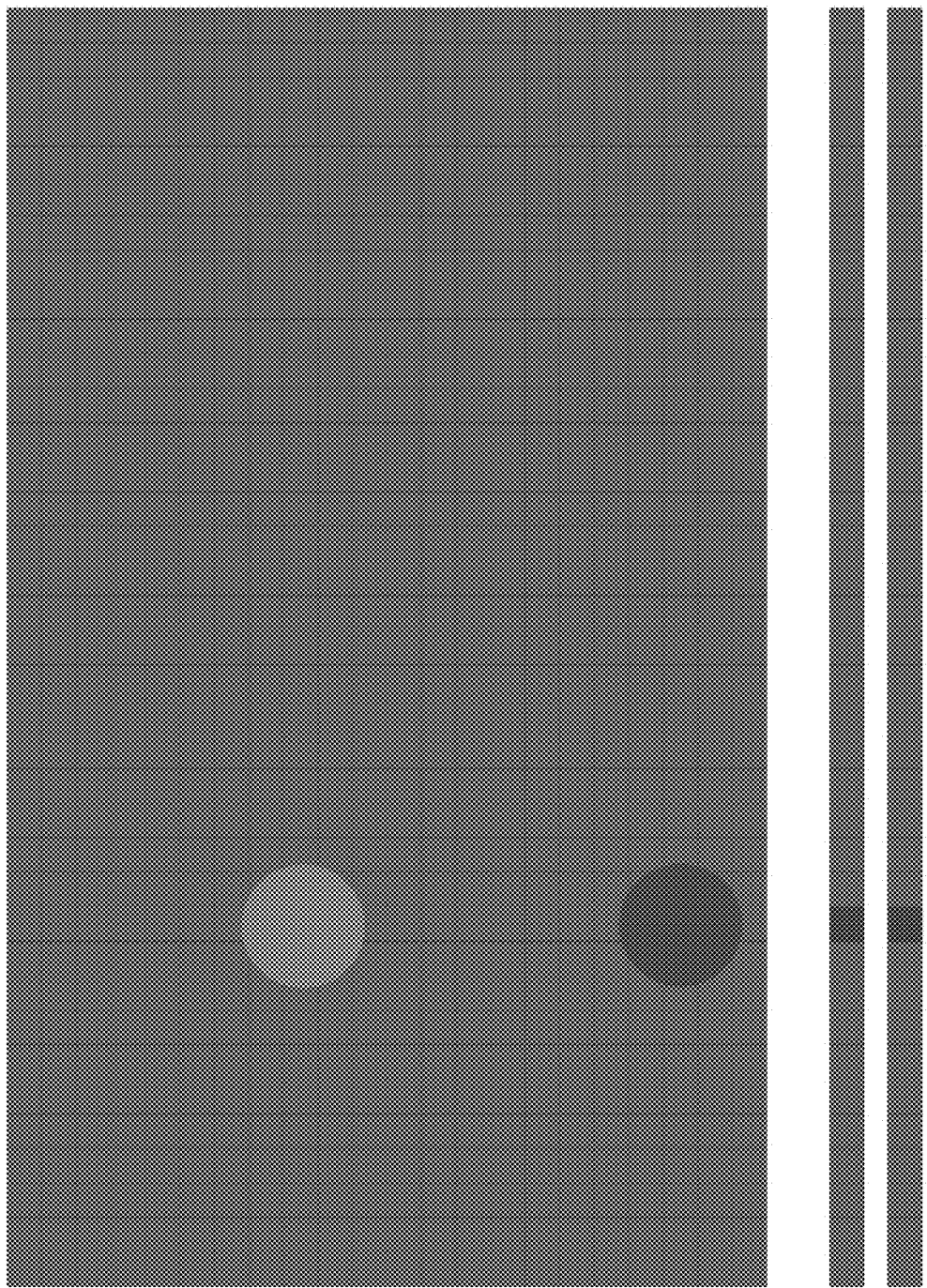
Figure 36H:
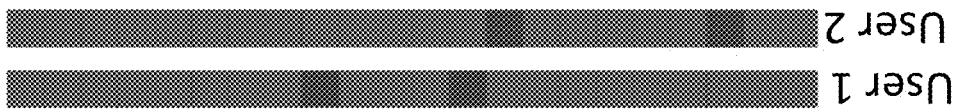
Figure 36I:
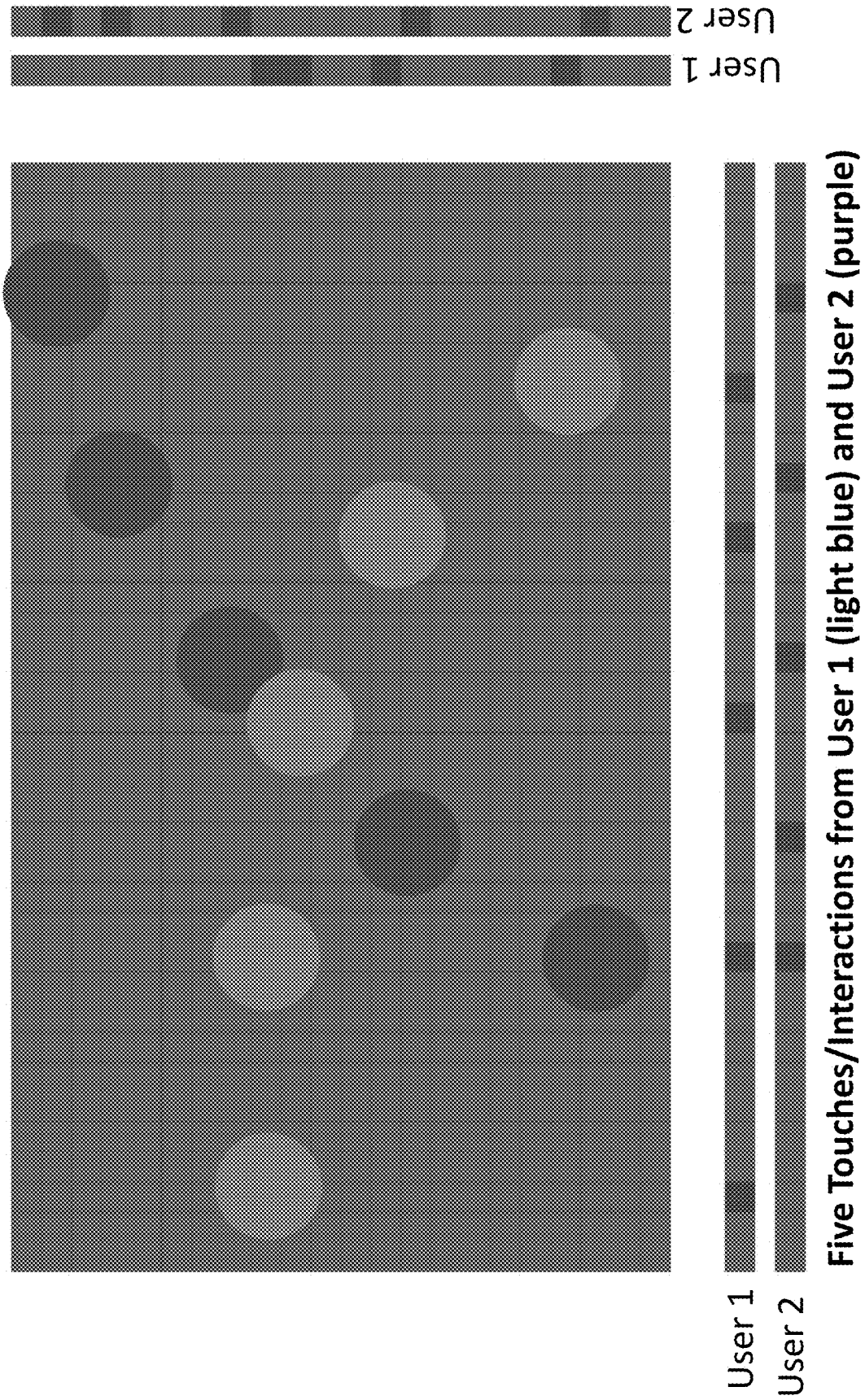
Figure 36J:
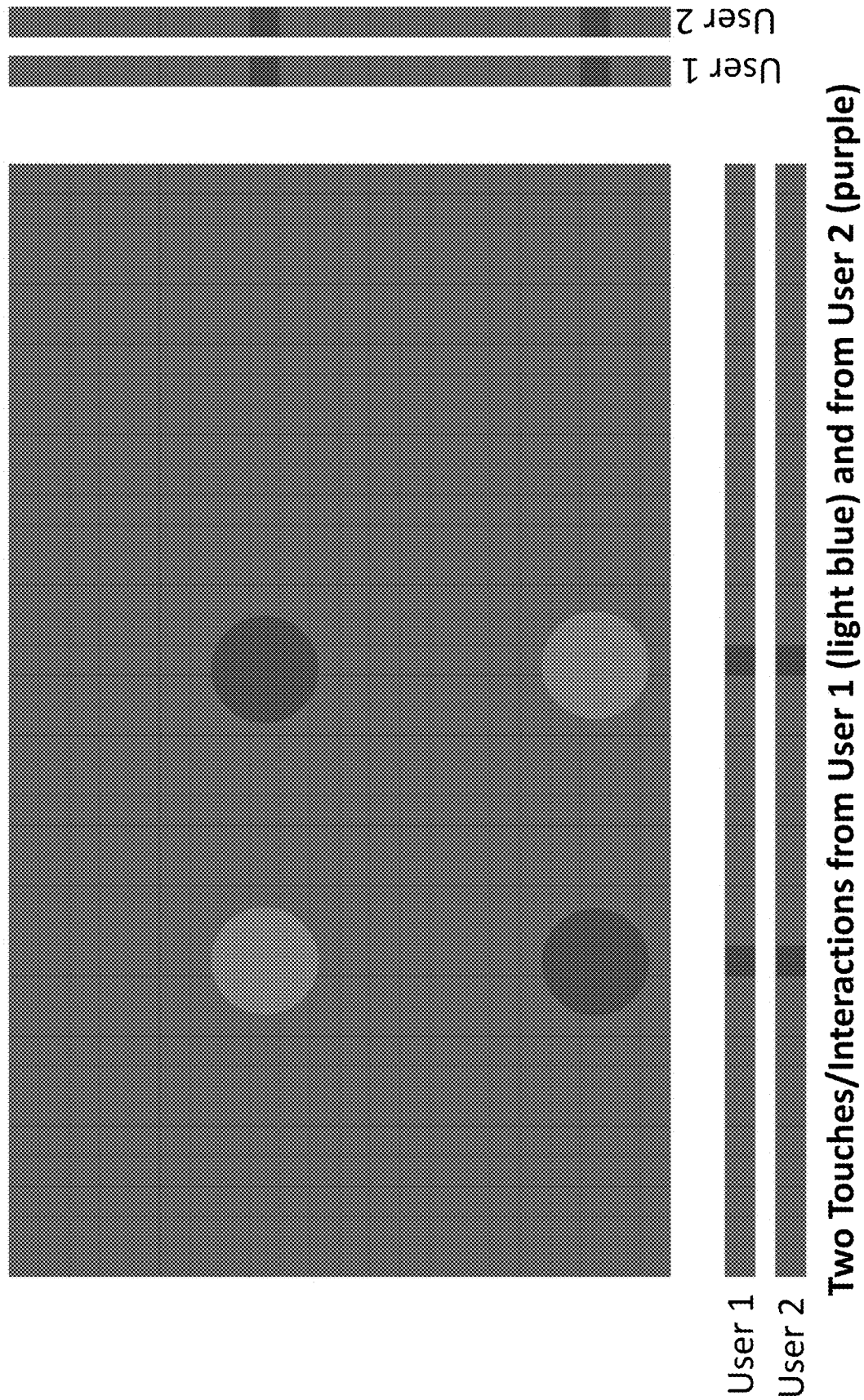

FIG. 32A is a schematic block diagram of an embodiment of a touch sensor device (TSD), which includes touchscreen display or display functionality, that is configured to operate in different modes of operation that includes one or more of self only, mutual only, self and mutual, every other electrode, subsets of electrodes, some electrodes for drive and sense and other electrodes for sense only, some electrodes for drive only and other electrodes for sense only, etc. in accordance with the present disclosure;

FIG. 32B is a schematic block diagram of an embodiment of a touch sensor device (TSD), which does not include touchscreen display or display functionality, that is configured to operate in different modes of operation that includes one or more of self only, mutual only, self and mutual, every other electrode, subsets of electrodes, some electrodes for drive and sense and other electrodes for sense only, some electrodes for drive only and other electrodes for sense only, etc. in accordance with the present disclosure;

FIG. 33 is a schematic block diagram of an embodiment of a touch sensor device (TSD), which may or may not include touchscreen display or display functionality, that includes a fully redundant TSD implemented within one or more prioritized sensing regions in accordance with the present disclosure;

FIG. 34A is a schematic block diagram of another embodiment of a touch sensor device (TSD) that is similar to FIG. 15 and FIG. 17 with the option of using any desired electrode pattern and that also includes one or more motion detection modules in accordance with the present disclosure;

FIG. 34B is a schematic block diagram of another embodiment of a touch sensor device (TSD) that is similar to FIG. 18 and that also includes one or more motion detection modules in accordance with the present disclosure;

FIG. 34C is a schematic block diagram of an embodiment of a touch sensor device (TSD) that is similar to FIG. 19 and that also includes one or more motion detection modules in accordance with the present disclosure;

FIG. 34D is a schematic block diagram of another embodiment of a touch sensor device (TSD) that is similar to FIG. 20 and that also includes one or more motion detection modules in accordance with the present disclosure;

FIG. 35A is a schematic block diagram of an embodiment of computing devices within a system operative to facilitate coupling of one or more signals from a first computing device via a user to a second computing device in accordance with the present invention;

FIG. 35B is a schematic block diagram of another embodiment of computing devices within a system operative to facilitate coupling of one or more signals from a first computing device via a user to a second computing device in accordance with the present invention;

FIG. 36A is a schematic block diagram of an embodiment of a touch sensor device (TSD), which may or may not include touchscreen display or display functionality, that is configured to distinguish separate user interaction from at least two users in accordance with the present invention;

FIG. 36B is a schematic block diagram of another embodiment of a touch sensor device (TSD), which may or may not include touchscreen display or display functionality, that is configured to distinguish separate user interaction from at least two users in accordance with the present invention;

FIG. 36C is a schematic block diagram of another embodiment of a touch sensor device (TSD), which may or may not include touchscreen display or display functionality, that is configured to distinguish separate user interaction from at least two users in accordance with the present invention;

FIG. 36D is a schematic block diagram of another embodiment of a touch sensor device (TSD), which may or may not include touchscreen display or display functionality, that is configured to distinguish separate user interaction from at least two users in accordance with the present invention;

FIG. 36E is a schematic block diagram of another embodiment of a touch sensor device (TSD), which may or may not include touchscreen display or display functionality, that is configured to distinguish separate user interaction from at least two users in accordance with the present invention;

FIG. 36F is a schematic block diagram of another embodiment of a touch sensor device (TSD), which may or may not include touchscreen display or display functionality, that is configured to distinguish separate user interaction from at least two users in accordance with the present invention;

FIG. 36G is a schematic block diagram of another embodiment of a touch sensor device (TSD), which may or may not include touchscreen display or display functionality, that is configured to distinguish separate user interaction from at least two users in accordance with the present invention;

FIG. 36H is a schematic block diagram of another embodiment of a touch sensor device (TSD), which may or may not include touchscreen display or display functionality, that is configured to distinguish separate user interaction from at least two users in accordance with the present invention;

FIG. 36I is a schematic block diagram of another embodiment of a touch sensor device (TSD), which may or may not include touchscreen display or display functionality, that is configured to distinguish separate user interaction from at least two users in accordance with the present invention; and FIG. 36J is a schematic block diagram of another embodiment of a touch sensor device (TSD), which may or may not include touchscreen display or display functionality, that is configured to distinguish separate user interaction from at least two users in accordance with the present invention.

DETAILED DESCRIPTION OF THE INVENTION

Figure 1:
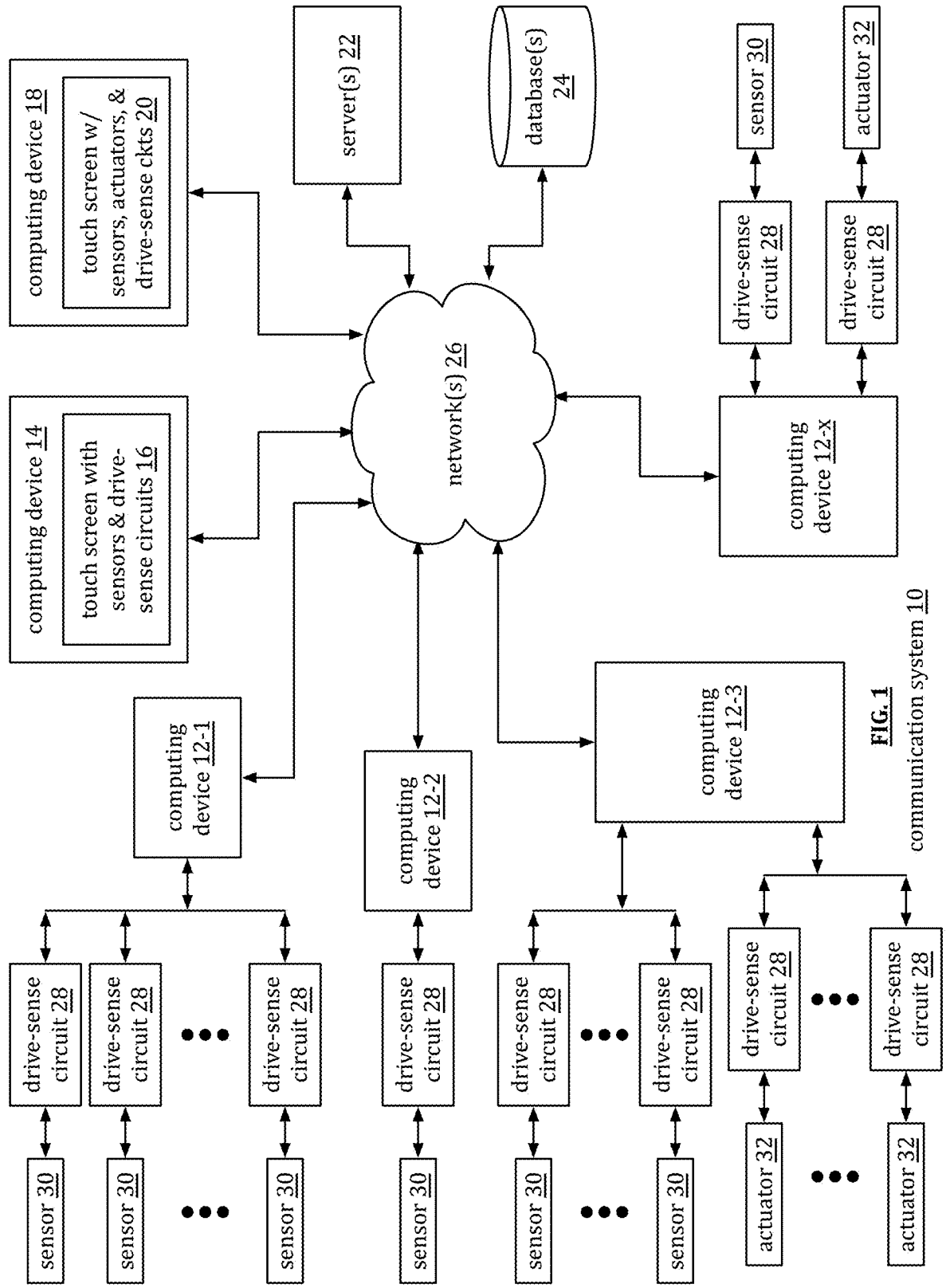
FIG. 1 is a schematic block diagram of an embodiment of a communication system in accordance with the present disclosure.

FIG. 1 is a schematic block diagram of an embodiment of a communication system 10 that includes a plurality of computing devices 12-10, one or more servers 22, one or more databases 24, one or more networks 26, a plurality of drive-sense circuits 28, a plurality of sensors 30, and a plurality of actuators 32. Computing devices 14 include a touchscreen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device

12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the effect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The general functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
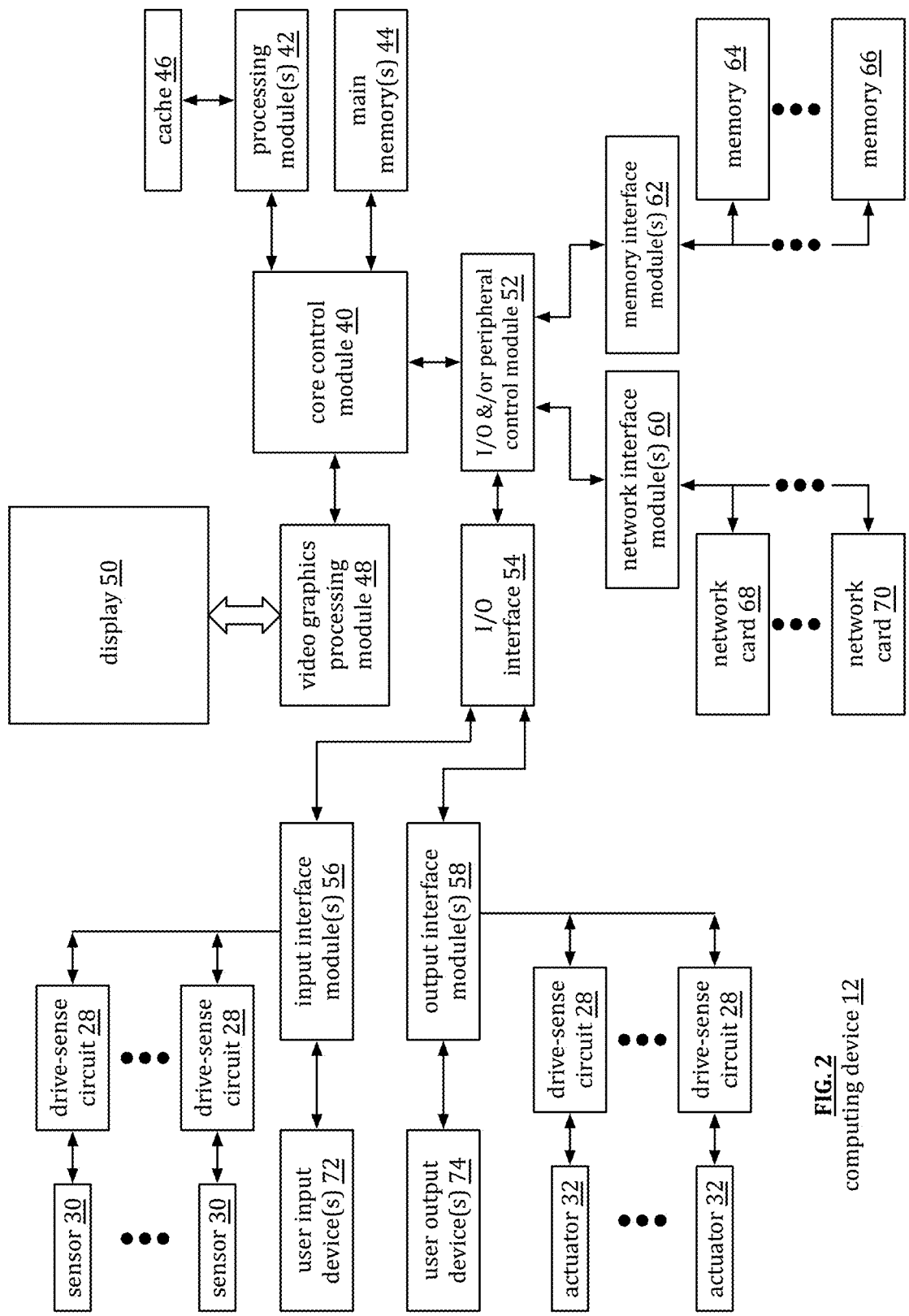
FIG. 2 is a schematic block diagram of an embodiment of a computing device in accordance with the present disclosure.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
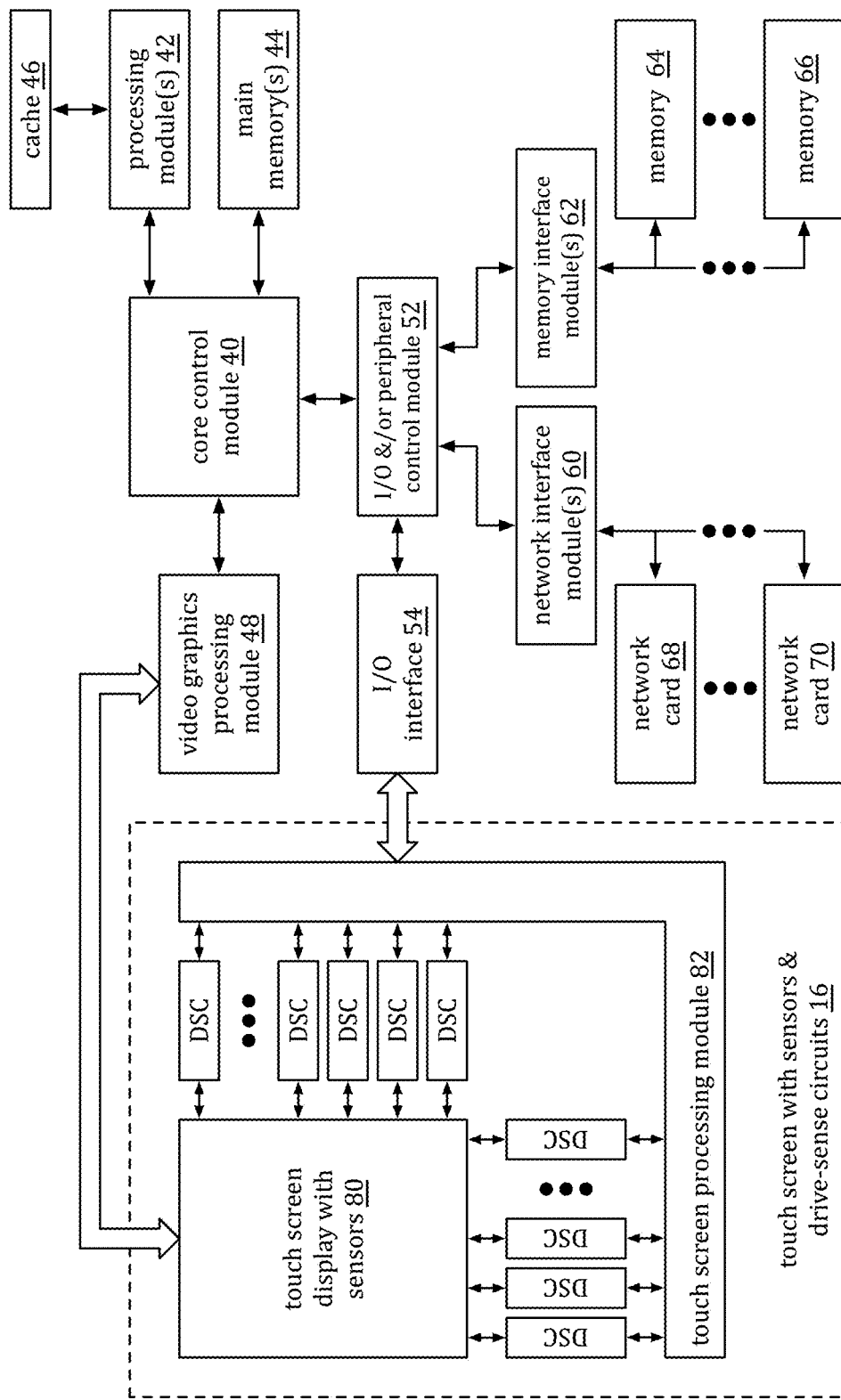
FIG. 3 is a schematic block diagram of another embodiment of a computing device in accordance with the present disclosure.

FIG. 3 is a schematic block diagram of another embodiment of a computing device 14 that includes a core control module 40, one or more processing modules 42, one or more main memories 44, cache memory 46, a video graphics processing module 48, a touchscreen 16, an Input-Output (I/O) peripheral control module 52, one or more input interface modules 56, one or more output interface modules 58, one or more network interface modules 60, and one or more memory interface modules 62. The touchscreen 16 includes a touchscreen display a plurality of sensors 30, a plurality of drive-sense circuits (DSC), and a touchscreen processing module 82.

Computing device 14 operates similarly to computing device 12 of FIG. 2 with the addition of a touchscreen as an input device. The touchscreen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
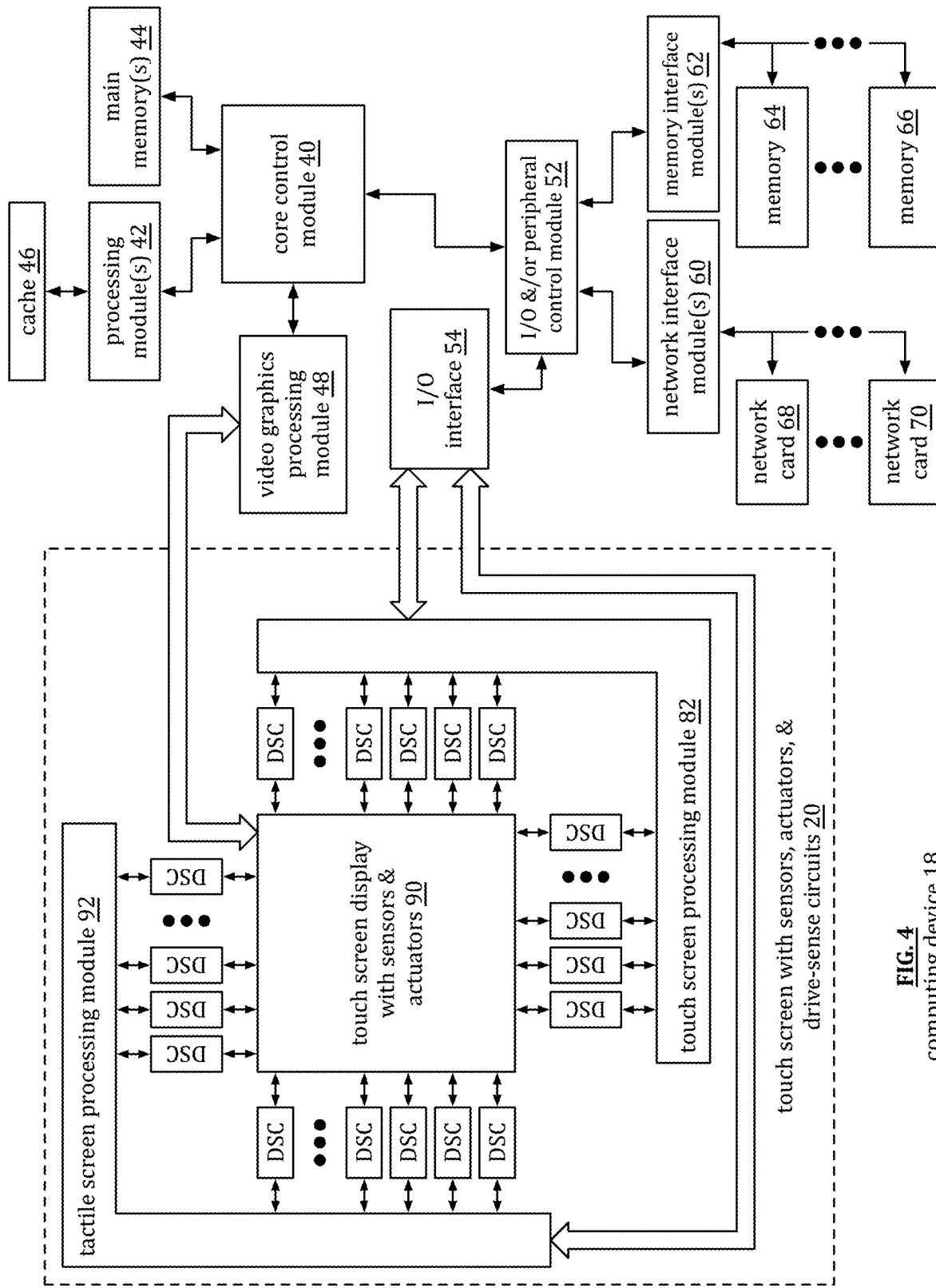
FIG. 4 is a schematic block diagram of another embodiment of a computing device in accordance with the present disclosure.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touchscreen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5A:
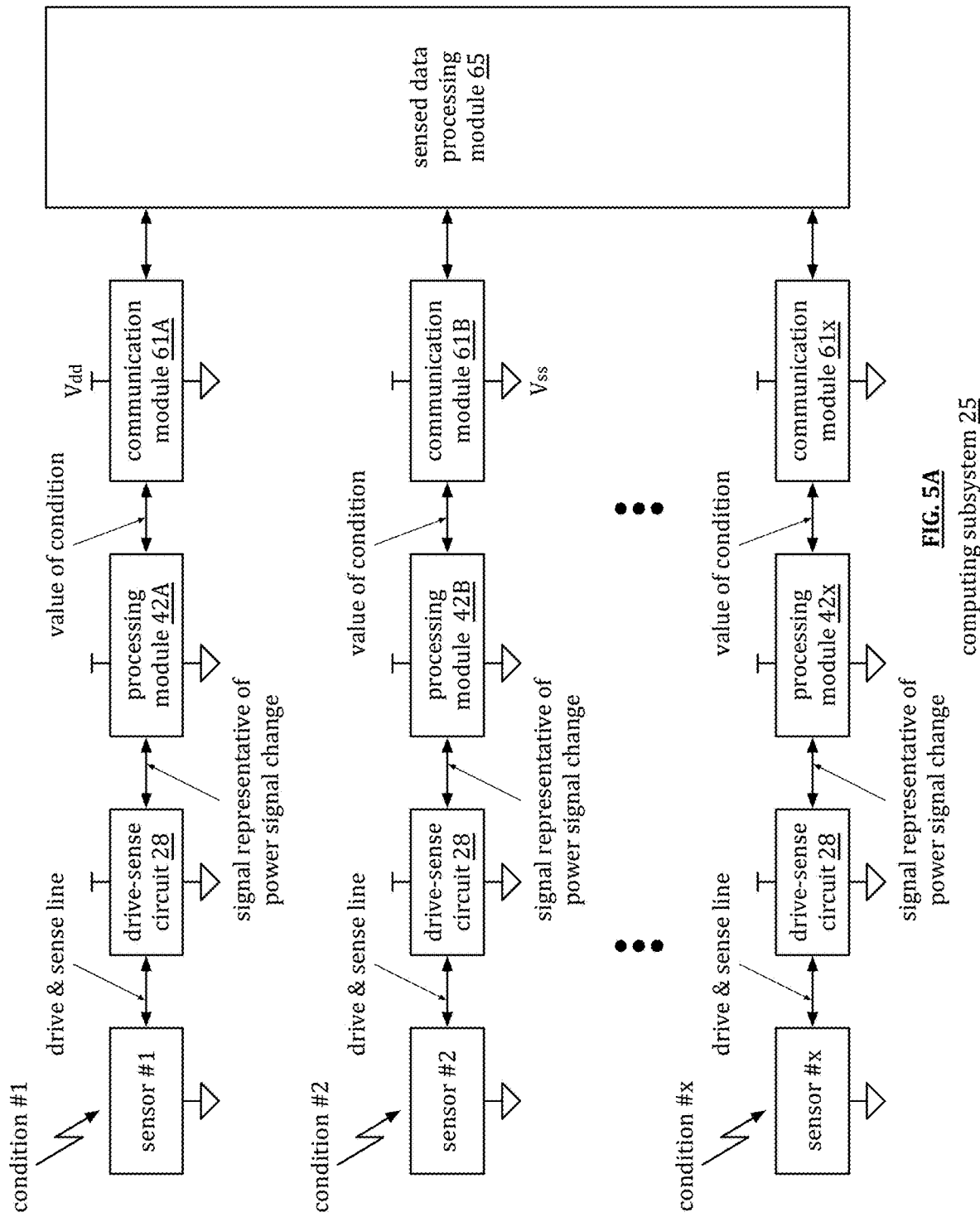
FIG. 5A is a schematic plot diagram of a computing subsystem in accordance with the present disclosure.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a standalone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

Figure 5C:
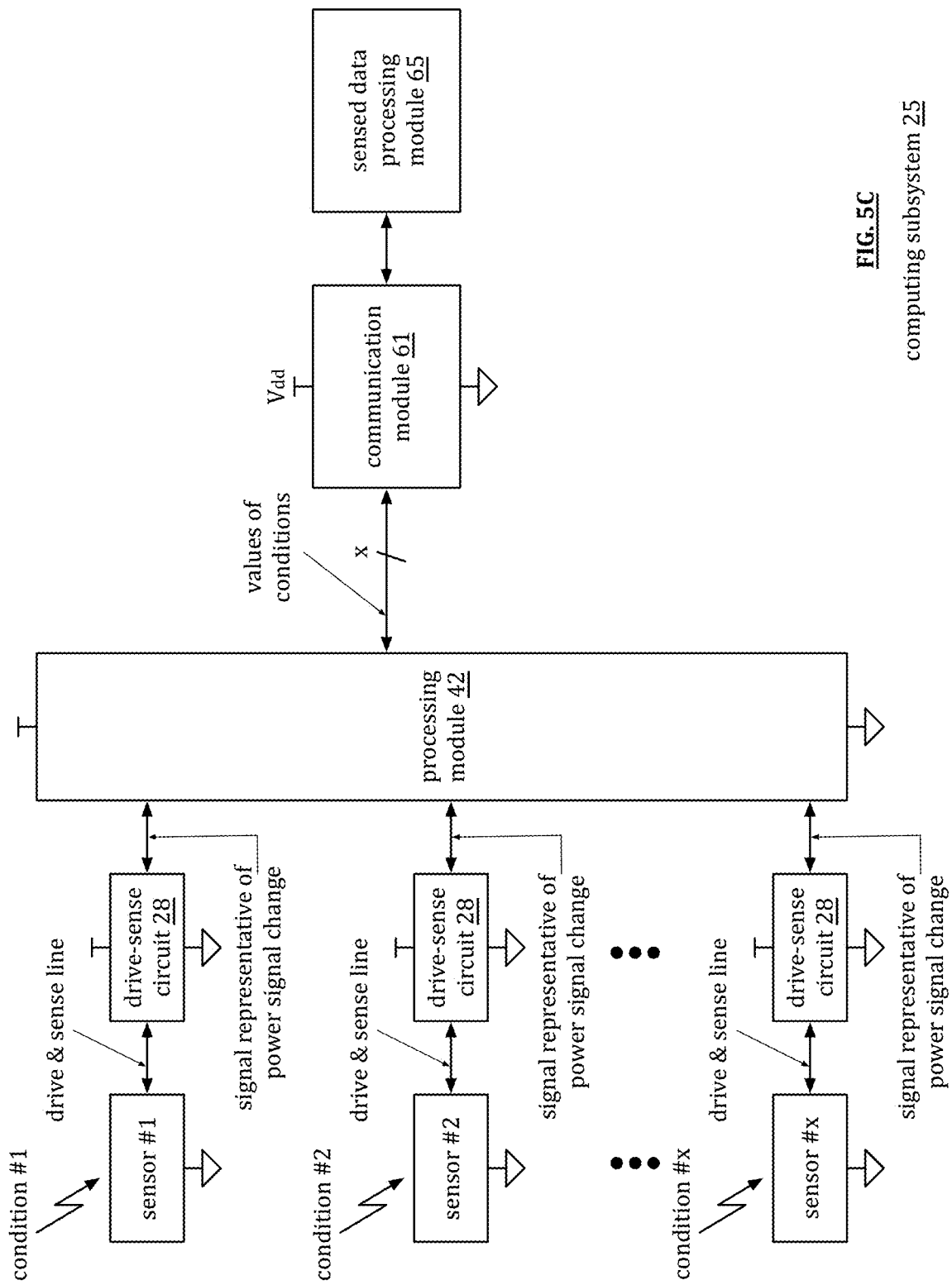
FIG. 5C is a schematic block diagram of another embodiment of a computing subsystem in accordance with the present disclosure.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
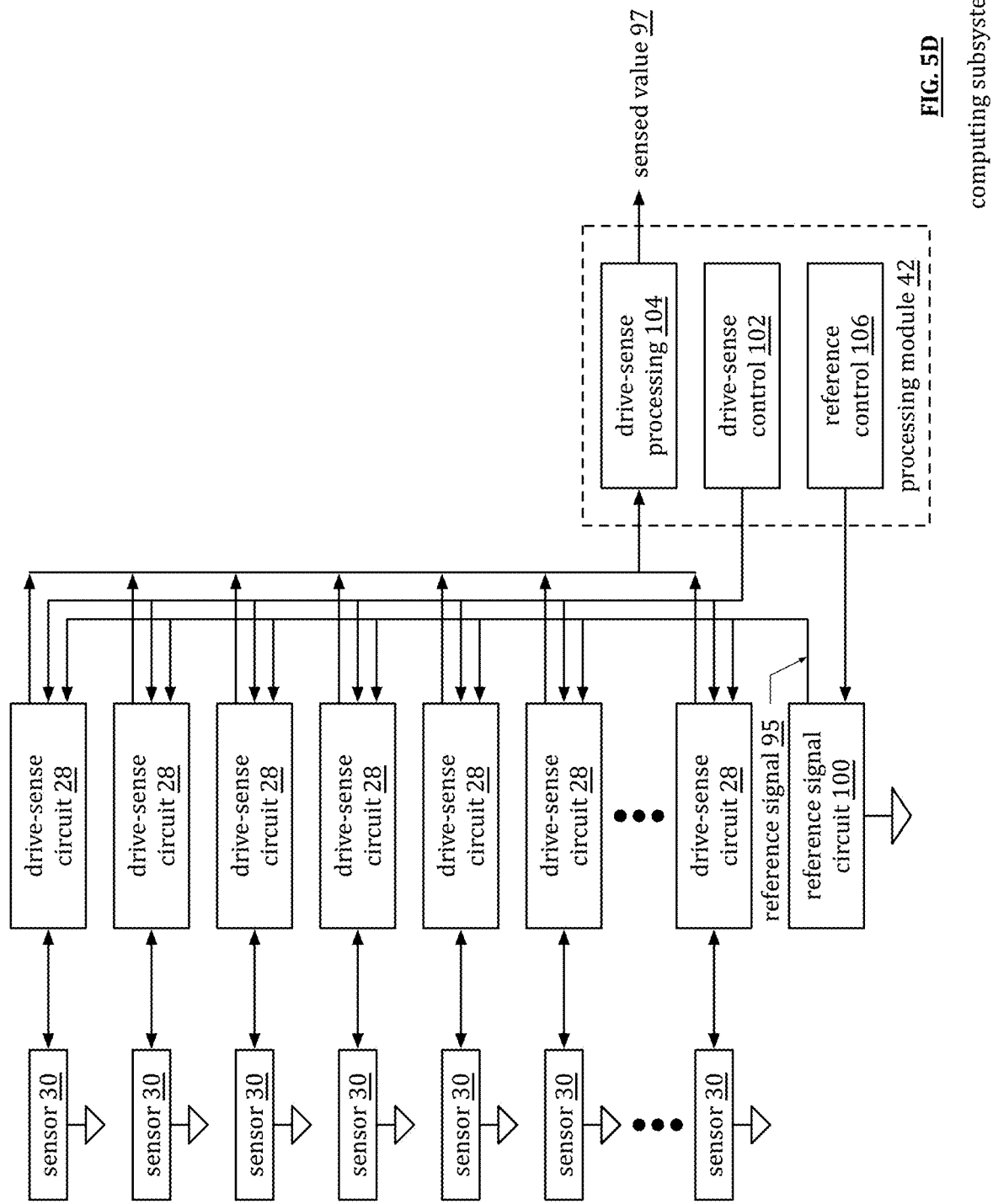
FIG. 5D is a schematic block diagram of another embodiment of a computing subsystem in accordance with the present disclosure.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
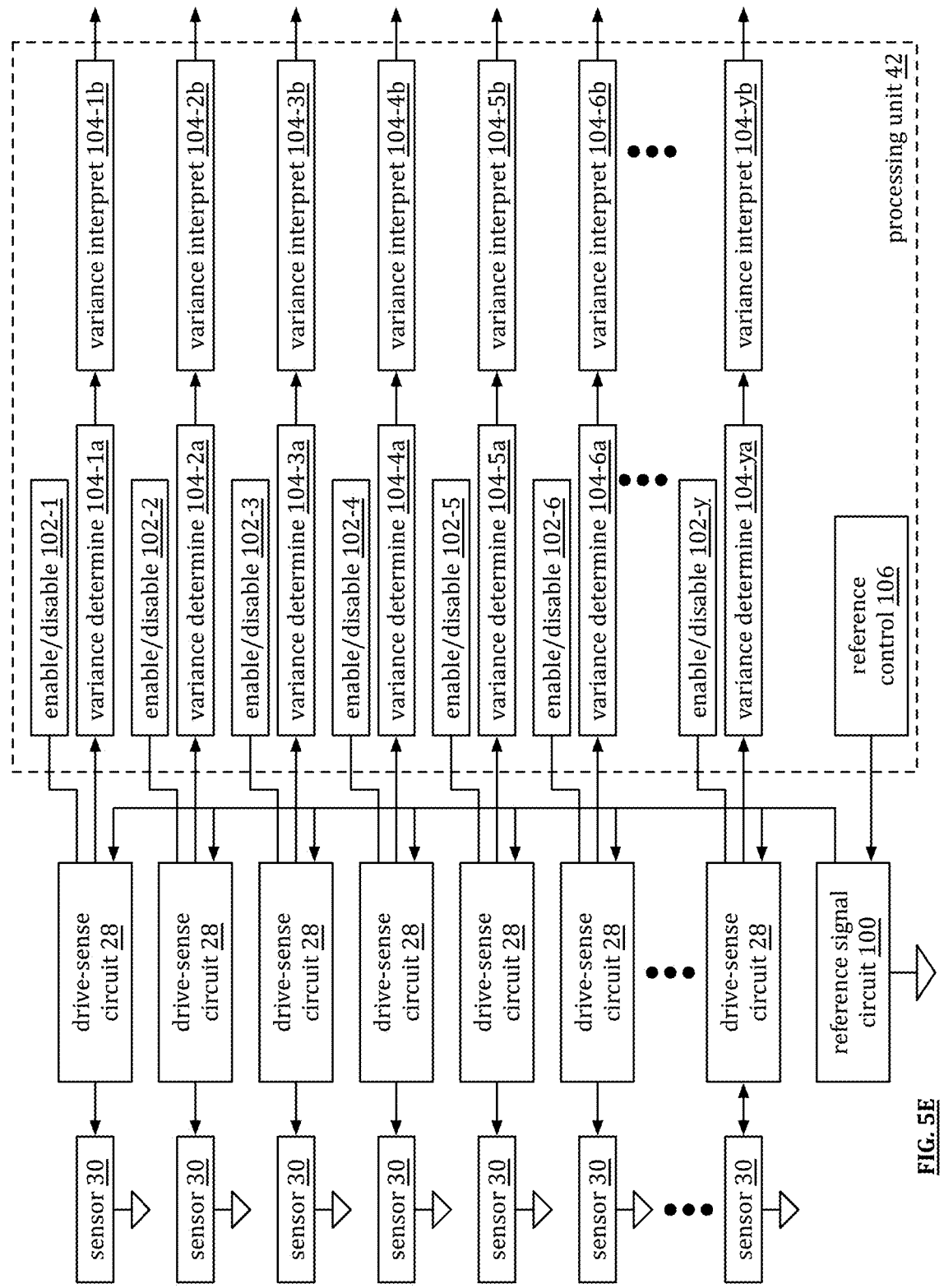
FIG. 5E is a schematic block diagram of another embodiment of a computing subsystem in accordance with the present disclosure.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256) =25+33.6=58.6 degrees Celsius.

Figure 6A:
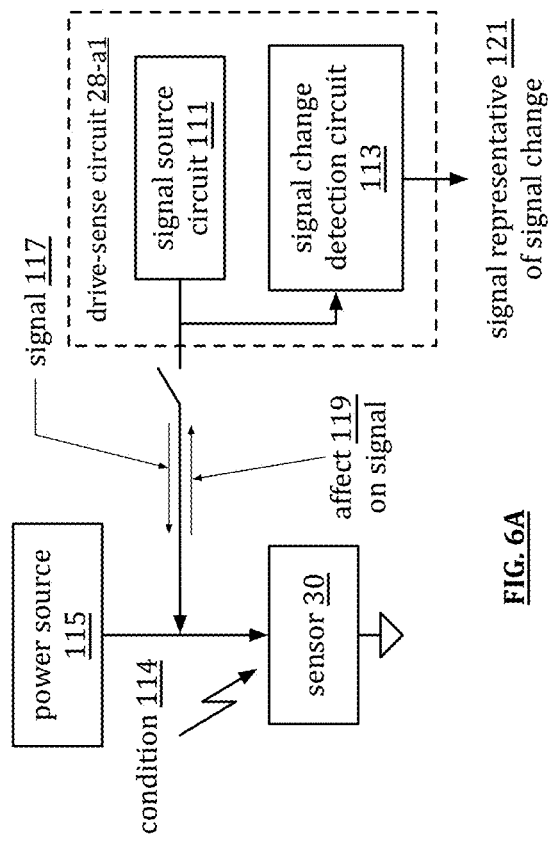
FIG. 6A is a schematic block diagram of another embodiment of a drive sense circuit in accordance with the present disclosure.
Figure 6:
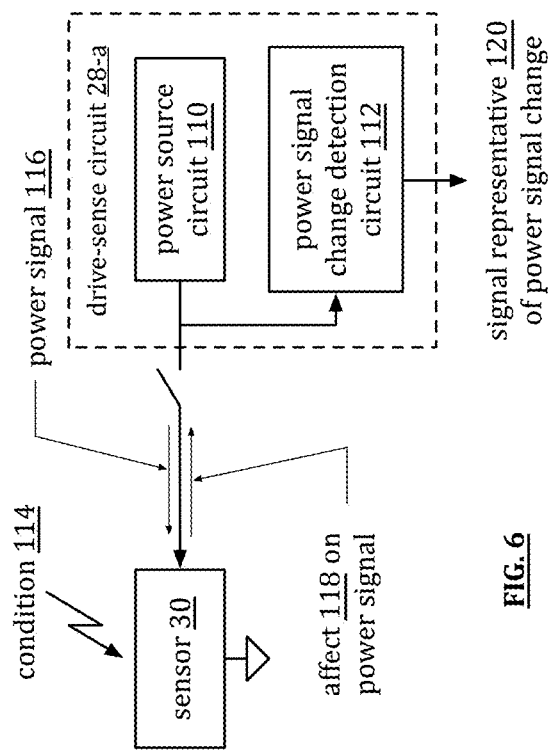
FIG. 6 is a schematic block diagram of a drive center circuit in accordance with the present disclosure.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

Figure 7:
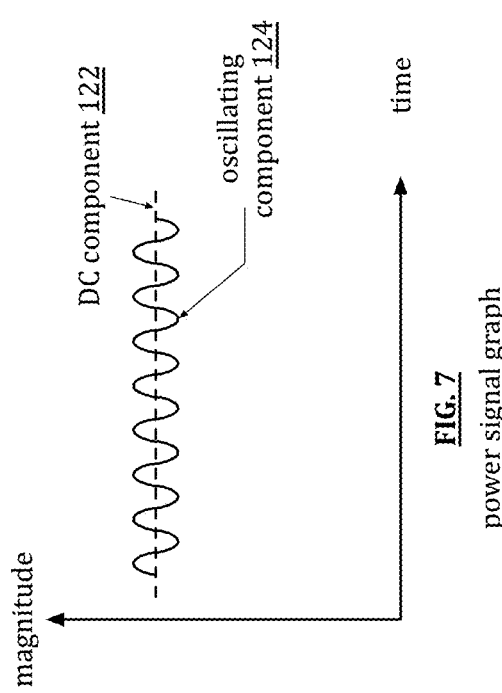
FIG. 7 is an example of a power signal graph in accordance with the present disclosure.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

Figure 8:
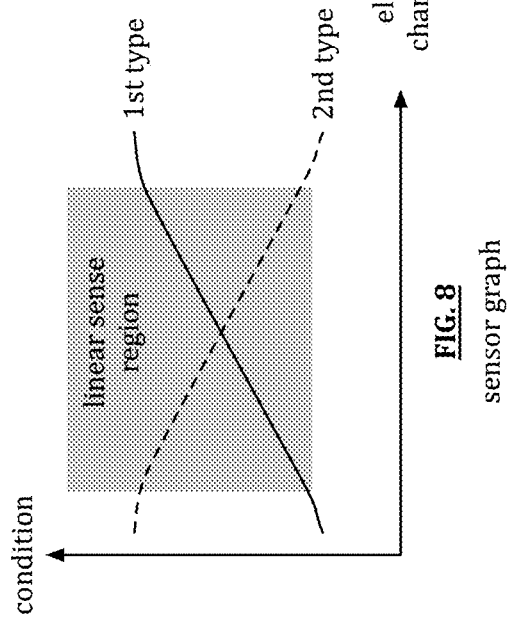
FIG. 8 is an example of a sensor graph in accordance with the present disclosure.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
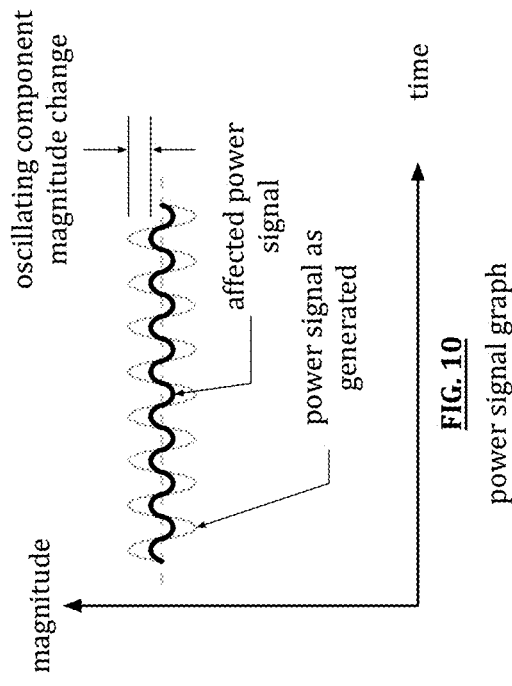
FIG. 9 is a schematic block diagram of another example of a power signal graph in accordance with the present disclosure.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
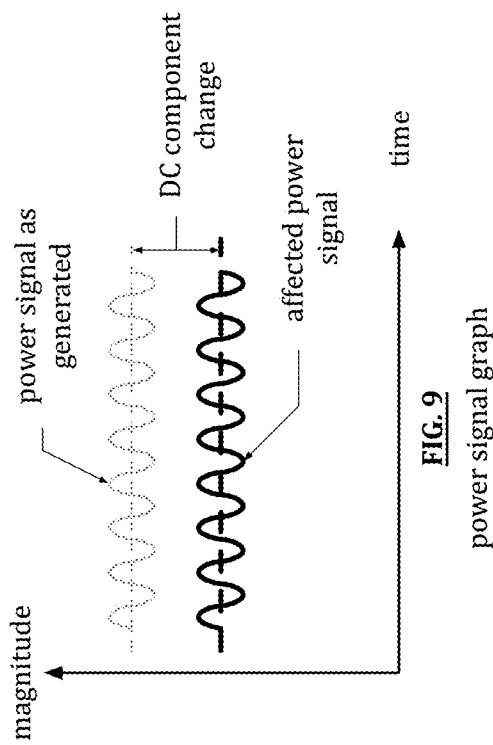
FIG. 10 is a schematic block diagram of another example of a power signal graph in accordance with the present disclosure.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11A:
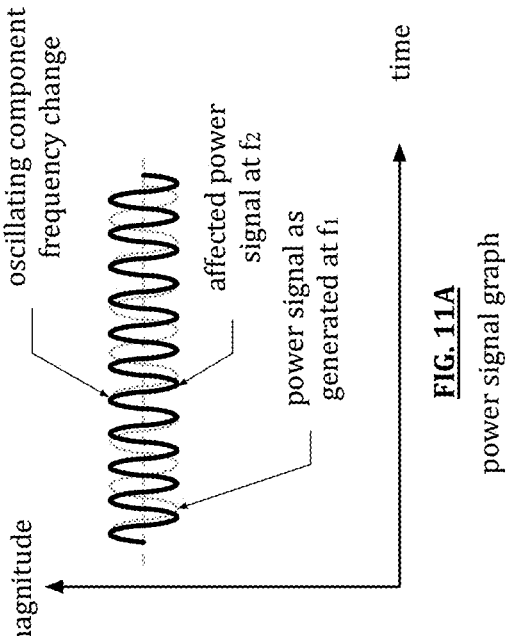
FIG. 11A is a schematic block diagram of another example of a power signal graph in accordance with the present disclosure.
Figure 11:
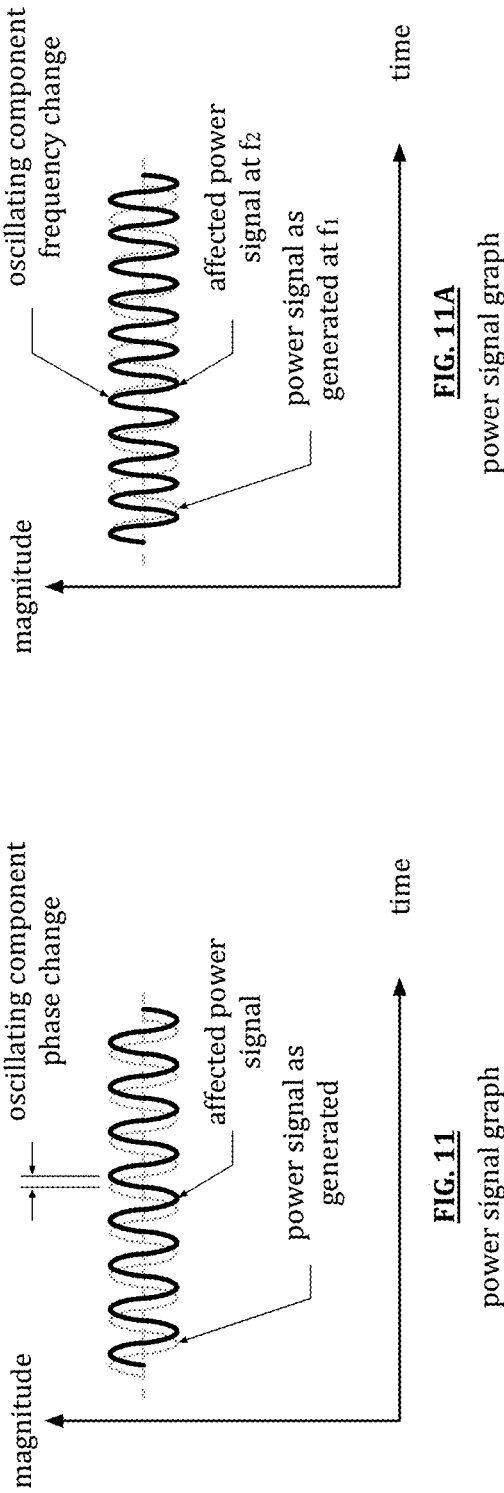
FIG. 11 is a schematic block diagram of another example of a power signal graph in accordance with the present disclosure.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE," filed Aug. 27, 2018, now U.S. Pat. No. 11,099,032. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, trellis coded modulation (TCM), turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or EEC code may be used in any of various implementations including concatenation (e.g., first ECC and/or EEC code followed by second ECC and/or EEC code, etc. such as based on an inner code/outer code architecture, etc.), parallel architecture (e.g., such that first ECC and/or EEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, battery, load, electrical coupling or connection, etc.

Note that the different respective signals that are driven and simultaneously sensed by one or more DSCs may be differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113, 379, etc. and/or their equivalents.

Note that certain of the following diagrams show a computing device (e.g., alternatively referred to as device; the terms computing device and device may be used interchangeably) that may include or be coupled to one or more processing modules. In certain instances, the one or more processing modules is configured to communicate with and interact with one or more other devices including one or more of DSCs, one or more components associated with a DSC, one or more components associated with a display, a touch sensor device that may or may not include display functionality (e.g., a touchscreen display with sensors, a panel without display functionality that includes one or more sensors, etc., one or more other components associated with a display, a touchscreen display with sensors, or generally a touch sensor device that may or may not include display functionality, etc.) Note that any such implementation of one or more processing modules may include integrated memory and/or be coupled to other memory. At least some of the memory stores operational instructions to be executed by the one or more processing modules. In addition, note that the one or more processing modules may interface with one or more other computing devices, components, elements, etc. via one or more communication links, networks, communication pathways, channels, etc. (e.g., such as via one or more communication interfaces of the computing device, such as may be integrated into the one or more processing modules or be implemented as a separate component, circuitry, etc.).

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

In addition, while many examples, embodiments, diagrams, etc. herein include one or more DSCs (e.g., coupled to one or more processing modules and one or more electrodes), note that any instantiation of a DSC may alternatively be implemented using a channel drive circuitry, an Analog Front End (AFE) that includes analog to digital and/or digital to analog conversion capability, etc. within alternative embodiments.

Figure 14:
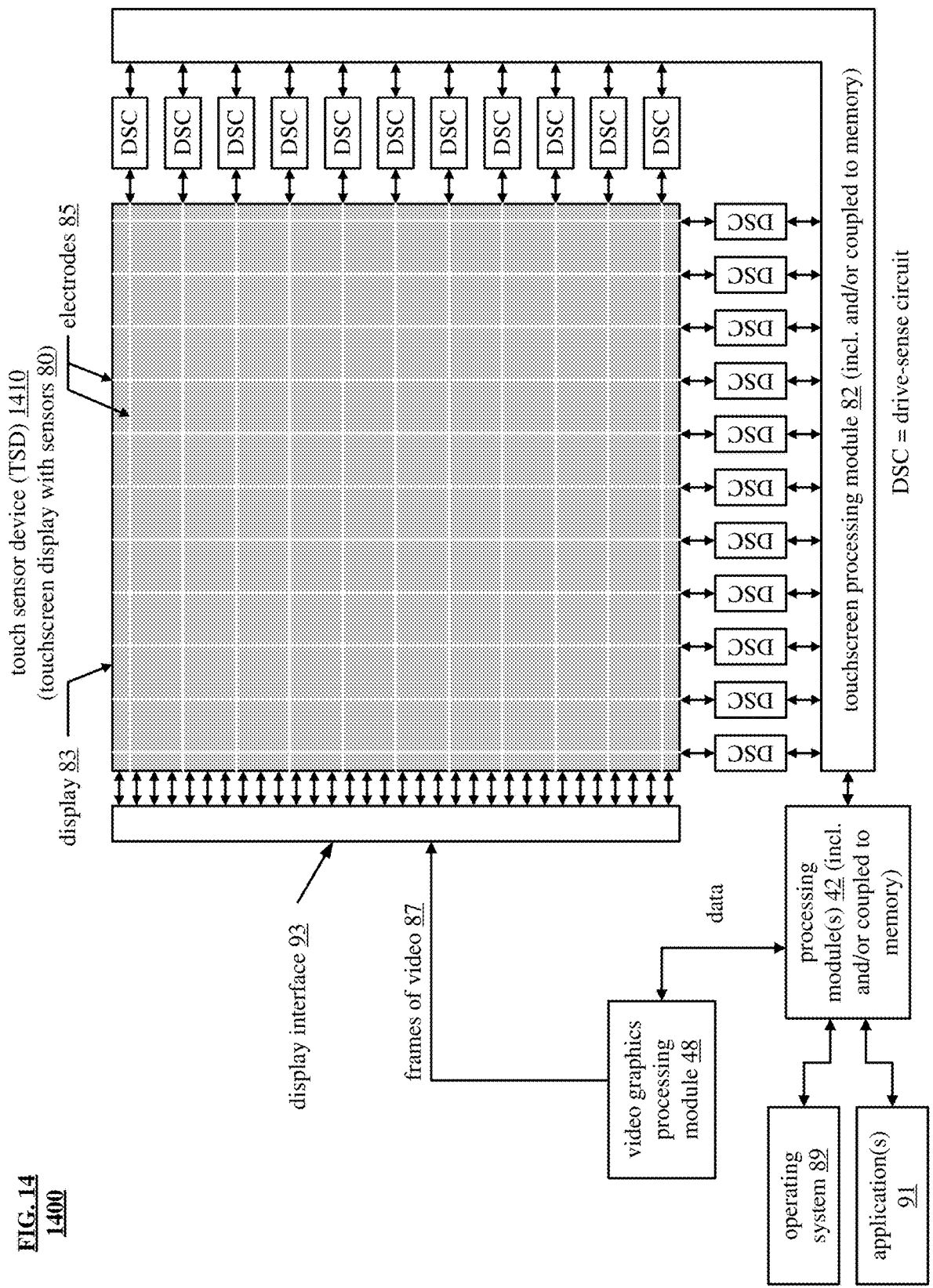
FIG. 14 is a schematic block diagram of an embodiment of a touch sensor device (TSD) in accordance with the present disclosure.

FIG. 14 is a schematic block diagram of an embodiment 1400 of a touch sensor device (TSD) in accordance with the present disclosure. This diagram includes a schematic block diagram of an embodiment of a TSD 1410 that is implemented to include a touchscreen display with sensors 80 that also includes a plurality of drive-sense circuits (DSCs), a touchscreen processing module 82, a display 83, and a plurality of electrodes 85 (e.g., the electrodes operate as the sensors or sensor components into which touch and/or proximity may be detected in the touchscreen display with sensors 80). The touchscreen display with sensors 80 is coupled to a processing module 42, a video graphics processing module 48, and a display interface 93, which are components of a computing device (e.g., one or more of computing devices 14-18), an interactive display, or other device that includes a touchscreen display. An interactive display functions to provide users with an interactive experience (e.g., touch the screen to obtain information, be entertained, etc.). For example, a store provides interactive displays for customers to find certain products, to obtain coupons, to enter contests, etc.

In some examples, note that display functionality and touchscreen functionality are both provided by a combined device that may be referred to as a touchscreen display with sensors 80. However, in other examples, note that touchscreen functionality and display functionality are provided by separate devices, namely, the display 83 and a touchscreen that is implemented separately from the display 83. Generally speaking, different implementations may include display functionality and touchscreen functionality within a combined device such as a touchscreen display with sensors 80, or separately using a display 83 and a touchscreen.

There are a variety of other devices that may be implemented to include a touchscreen display. For example, a vending machine includes a touchscreen display to select and/or pay for an item. Another example of a device having a touchscreen display is an Automated Teller Machine (ATM). As yet another example, an automobile includes a touchscreen display for entertainment media control, navigation, climate control, etc.

The touchscreen display with sensors 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list. Other screen sizes, resolutions, aspect ratios, etc. may be implemented within other various displays.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280 ->= 7680 | 720 ->= 4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touchscreen display. The electrodes 85 are distributed throughout the display area or where touchscreen functionality is desired. For example, a first group of the electrodes are arranged in rows and a second group of electrodes are arranged in columns. As will be discussed in greater detail with reference to one or more of FIGS. 18, 19, 20, and 21, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

In certain examples, one or more images are displayed so as to facilitate communication of data from a first computing device to a second computing device via a user. For example, one or more images are displayed on the touchscreen display with sensors 80, and when a user is in contact with the one or more images that are displayed on the touchscreen display with sensors 80, one or more signals that are associated with the one or more images are coupled via the user to another computing device. In some examples, the touchscreen display with sensors 80 is implemented within a portable device, such as a cell phone, a smart phone, a tablet, and/or any other such device that includes a touching display with sensors 80. Also, in some examples, note that the computing device that is displaying one or more images that are coupled via the user to another computing device does not include a touchscreen display with sensors 80, but merely a display that is implemented to display one or more images. In accordance with operation of the display, whether implemented as it display alone for a touchscreen display with sensors, as the one or more images are displayed, and when the user is in contact with the display (e.g., such as touching the one or more images with a digit of a hand, such as found, fingers, etc.) or is within sufficient proximity to facilitate coupling of one or more signals that are associated with a lot of images, then the signals are coupled via the user to another computing device.

When the display 83 is implemented as a touchscreen display with sensors 80, while the display 83 is rendering the frames of video into visible images, the drive-sense circuits (DSC) provide sensor signals to the electrodes 85. When the touchscreen (e.g., which may alternatively be referred to as screen) is touched, capacitance of the electrodes 85 proximal to the touch (i.e., directly or close by) is changed. The DSCs detect the capacitance change for affected electrodes and provide the detected change to the touchscreen processing module 82.

The touchscreen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

In addition, note that certain implementations of TSDs may be made to include many more row electrodes and many more column electrodes than shown in this diagram as well as others included herein. In certain examples, a TSD includes tens, hundreds, thousands, etc. or an even larger number of row electrodes and/or tens, hundreds, thousands, etc. or an even larger number of column electrodes. In general, a TSD may be implemented to include one or more electrodes. In certain examples, such one or more electrodes includes a first group of one or more electrodes implemented in a first direction and a second group of one or more electrodes implemented in a second direction that is different than the first direction. In one implementation, the second direction is 90 degrees different than the first direction. In another implementation, the second direction is offset from the first direction by some other amount (e.g., a difference in alignment that is greater than 10 degrees and less than 90 degrees different than the first direction).

FIG. 15 is a schematic block diagram of another embodiment 1500 of a TSD 1510 in accordance with the present disclosure. This diagram has certain similarities to the prior diagram and includes a schematic block diagram of another embodiment of a TSD 1510 that includes display functionality, e.g., a touchscreen display 80, and that also includes a plurality of drive-sense circuits (DSCs), the touchscreen processing module 82, the processing module 42, the video graphics processing module 48, a display 83, and a plurality of electrodes 85. The processing module 42 is executing an operating system 89 and one or more user applications 91 to produce data that is processed by the video graphics processing module 48 to generate frames of data 87. The processing module 42 provides the frames of data 87 to the display interface 93.

This diagram is similar to the prior diagram with at least one different being that the electrodes 85 are diagonally aligned. Generally speaking, the electrodes 85 may be implemented using any desired pattern, configuration, arrangement, etc. In addition, interfaces (I/Fs) 86 provide interfacing between the DSCs and the electrodes 85 appropriately such that a respective DSC services one or more electrodes 85 that are diagonally aligned in this implementation of a TSD 1510. For example, given the diagonally aligned electrodes 85, the DSCs as implemented in a particular architecture may not align directly with the respective electrodes that they service, and the I/Fs 86 provide for appropriate coupling between the DSCs and the electrodes 85. The TSD 1510 operates similarly to the TSD 1410 of FIG. 14 with the above noted differences.

Figure 16:
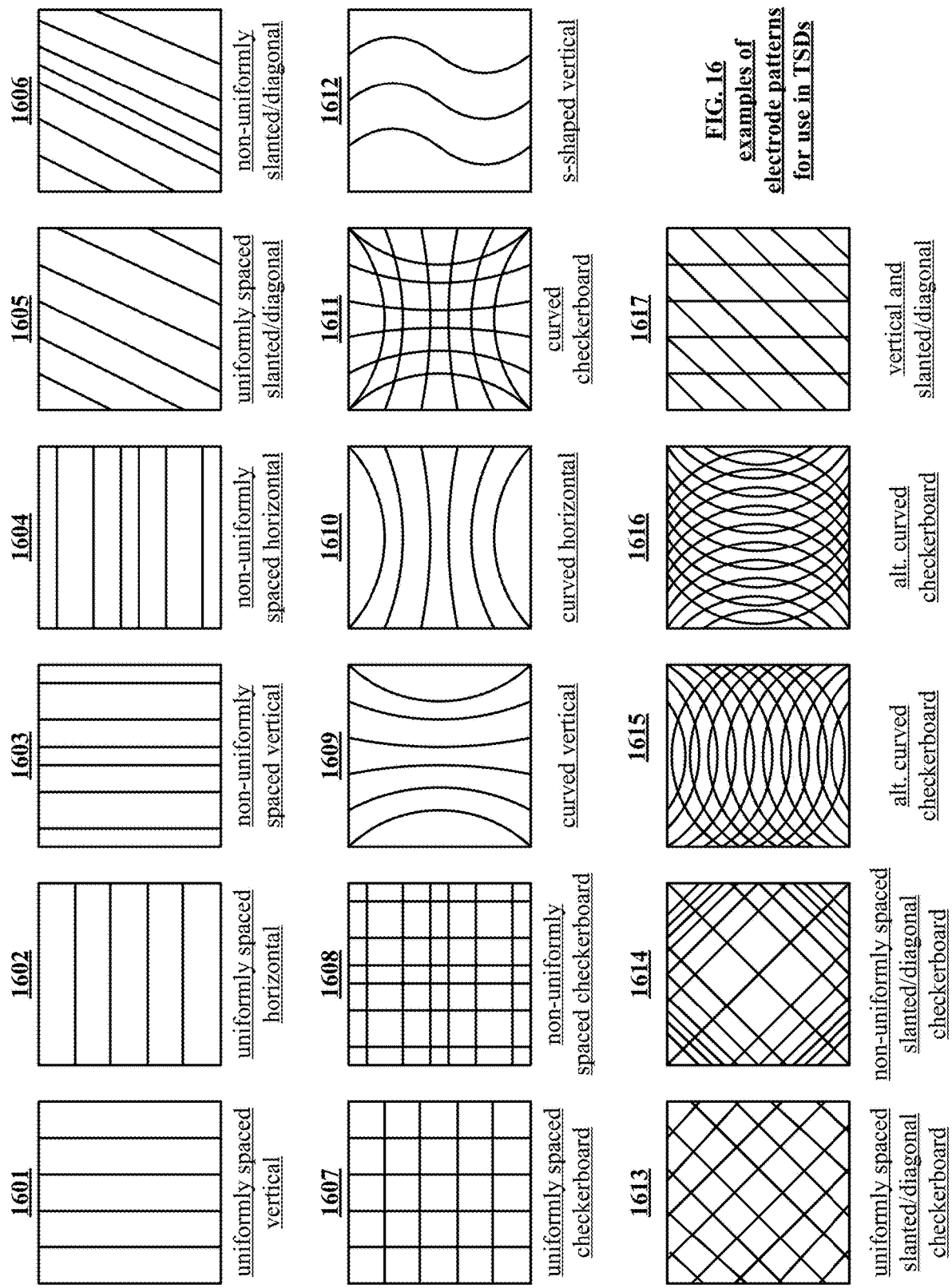
FIG. 16 is a schematic block diagram of various embodiments of electrode patterns that may be used on a touch sensor device (TSD) in accordance with the present disclosure.

FIG. 16 is a schematic block diagram of various embodiments 1601 through 1617 of electrode patterns that may be used on a TSD in accordance with the present disclosure. These diagrams show portions of or cross-sections of various embodiments of electrode patterns that may be used in accordance with any of the various TSDs described herein and/or their equivalents.

Generally speaking, the various electrodes within a TSD may be implemented in any desired configuration, pattern, arrangement, etc. In addition, note that alternative embodiments may include an electrode that is a pad, a button, etc. that is not implemented in a configuration, pattern, arrangement, etc. that facilitate capacitive coupling between a first electrode implemented in a first direction and a second electrode implemented in a second direction.

Reference 1601 corresponds to a pattern that includes uniformly spaced vertical electrodes. Reference numeral 1602 corresponds to a pattern that includes uniformly spaced horizontal electrodes. Generally speaking, note that the electrodes of such patterns may be aligned in any desired direction. Also, they may be uniformly spaced, non-uniformly spaced, parallel, non-parallel, etc.

Reference numeral 1603 corresponds to a pattern that includes non-uniformly spaced vertical electrodes. Reference numeral 1604 corresponds to a pattern that includes non-uniformly spaced horizontal electrodes. Note that the non-uniformity of spacing of the vertical or horizontal electrodes may be based on any desired pattern, including a repetitive pattern, a random pattern, etc.

Reference numeral 1605 corresponds to a pattern that includes uniformly spaced slanted/diagonal electrodes. Reference numeral 1606 corresponds to a pattern that includes nonuniformly spliced slanted electrodes.

Reference 1607 corresponds to a pattern that includes a uniformly spaced checkerboard. Reference 1608 corresponds to a pattern that includes non-uniformly spaced checkerboard. Note that the non-uniformity of spacing of the vertical and horizontal electrodes within such a non-uniformly spaced checkerboard pattern may be based on any desired pattern, including a repetitive pattern, a random pattern, etc. In addition, note that a pattern including electrodes extending in various directions such as checkerboard may include electrical isolation between the electrodes aligned in one direction and the electrodes aligned in another direction. For example, considering a checkerboard pattern such as these, the vertical and horizontal aligned electrodes may be electrically isolated such that there is not direct electrical connection between the vertical and horizontal aligned electrodes yet are configured to facilitate capacitive coupling of signals between the vertical and horizontal aligned electrodes.

Reference 1609 corresponds to a pattern that includes curved vertical aligned electrodes. In this particular example, the electrodes are more closely aligned to one another near the middle of the pattern than at the top or the bottom of the pattern. Reference 1610 corresponds to a pattern that includes curved horizontal aligned electrodes. In this particular example, the electrodes are more closely aligned to one another near the middle of the pattern than at the left or the right of the pattern.

Reference 1611 corresponds to a pattern that includes a curved checkerboard that includes both curved vertical aligned electrodes and curved horizontal aligned electrodes. Note also that the curved vertical aligned electrodes and curved horizontal aligned electrodes may be electrically isolated from one another such that such that there is not direct electrical connection between the vertical aligned electrodes and curved horizontal aligned electrodes.

Reference 1612 corresponds to a pattern that includes s-shaped vertical aligned electrodes. Note that an alternative pattern may alternatively include s-shaped horizontal aligned electrodes.

Reference 1613 corresponds to a pattern that includes a uniformly spaced slanted/diagonal checkerboard. Reference 1614 corresponds to a pattern that includes a non-uniformly spaced slanted/diagonal checkerboard. In this particular example, the electrodes are more closely aligned near the corners of this cross-section than in the middle/center of this cross-section.

Reference 1615 corresponds to a pattern that includes an alternative curved checkerboard such that some electrodes curve up and back down when traversing from left to right and other electrodes curve down and back up when traversing from left to right and other. Reference 1616 corresponds to a pattern that includes an alternative curved checkerboard such that some electrodes curve to the right and back to the left when traversing from top to bottom and other electrodes curve to the left and back to the right when traversing from top to bottom. Reference 1617 corresponds to a vertical and slanted/diagonal pattern that includes some electrodes aligned vertically and other electrodes aligned in a slanted/diagonal manner.

For example, considering the patterns shown by reference numerals 1613, 1614, 1615, 1616, and 1617 that include electrodes aligned in at least 2 different directions may be electrically isolated such that there is not direct electrical connection between the electrodes aligned in at least 2 different directions yet are configured to facilitate capacitive coupling of signals between the electrodes aligned in at least 2 different directions.

Generally speaking, any desired pattern of electrodes may be used in a TSD and may be implemented on any surface, layer, component, etc. of the TSD. In some examples, note that one or more protective layers may be implemented over electrodes to ensure that they are not damaged, etc. yet still are configured to facilitate capacitive coupling with the electrodes and/or between electrodes through the one or more protective layers.

In addition, with respect to electrodes implemented in different directions (e.g., rows and columns, or some other pattern) within a TSD, a mutual capacitance is created between a first electrode implemented in a first direction in a first surface, layer, component, etc. of the TSD and a second electrode implemented in a second direction in a second surface, layer, component, etc. of the TSD. In addition, each electrode has a self-capacitance, which corresponds to a parasitic capacitance created by the electrode with respect to other conductors in the TSD (e.g., ground, conductive layer(s), and/or one or more other electrodes). Also, a mutual capacitance exists between a first electrode implemented in a first direction in a first surface, layer, component, etc. of the TSD and a second electrode implemented in a second direction in a second surface, layer, component, etc. of the TSD. When no touch (e.g., from a user, stylus, other device that may or may not include TSD functionality, another other TSD, etc. is present), the self-capacitances and mutual capacitances of the TSD are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

FIG. 17 is a schematic block diagram of another embodiment 1700 of a TSD that is similar to FIG. 15 with the option of using any desired electrode pattern in accordance with the present disclosure. For example, the electrodes 85 of the TSD 1710 may be implemented using any of the various electrode patterns shown within FIG. 16, or alternatively, using any other desired electrode pattern, configuration, etc. Similar to FIG. 15, I/Fs 86 provide for appropriate coupling between the DSCs and the electrodes 85 to accommodate any desired electrode pattern and coupling between the DSCs and the electrodes 85.

FIG. 18 is a schematic block diagram of another embodiment 1800 of a touchscreen display in accordance with the present disclosure. This diagram includes a schematic block diagram of another embodiment of a touch sensor device (TSD) 1810 that includes display functionality, e.g., a touchscreen display 80, and that also includes a plurality of drive-sense circuits (DSCs), the processing module 42, a display 83, and a plurality of electrodes 85. The processing module 42 is executing an operating system 89 and one or more user applications 91 to produce frames of data 87. The processing module 42 provides the frames of data 87 to the display interface 93. The TSD 1810 operates similarly to the TSD 1410 of FIG. 14 with the above noted differences.

FIG. 19 is a schematic block diagram of an embodiment 1900 of a touch sensor device (TSD) in accordance with the present disclosure. Note that a touch sensor device may or may not include display functionality. For example, one example of a touch sensor device includes a touchscreen display (e.g., such as described with respect to FIG. 14 or FIG. 15). Alternatively, a touch sensor device may include touch sensor functionality without including display functionality. In this diagram, an alternative example of a touch sensor device, namely, touch sensor device 1910, includes sensor 80 but with no display functionality. Generally speaking, any reference to a touch sensor device herein may be used to refer to a touch sensor device that may or may not include display functionality (e.g., a touchscreen display or a touch sensor device such as touch sensor device 1910 that does not include display functionality). This diagram is similar to FIG. 17 with at least some differences being that this diagram includes a touch sensor device 1910 with sensors 80. The touch sensor device 1910 of this diagram includes a panel 1912 (e.g., that includes embedded/integrated electrodes 85) that facilitates touch sensor functionality. However, the touch sensor device 1910 of this diagram does not include display functionality and does not include a video graphics processing module 48 or a display interface 93 as does FIG. 17. In addition, the touchscreen processing module 82 of FIG. 14, which may include and/or be coupled to memory, is replaced in FIG. 19 by a touch sensor device processing module 1942, which may include and/or be coupled to memory.

The touch sensor device processing module 1942 operates similarly to the touchscreen processing module 82 of FIG. 17 with respect to touch related functionality yet with at least some differences being that the touch sensor device processing module 1942 does not particularly operate in accordance with display related functionality. For example, the touch sensor device 1910 includes a panel 1912, a plurality of sensors (e.g., shows as electrodes 85 in the diagram), a plurality of drive-sense circuits (DSCs), and the touch sensor device processing module 1942. The touch sensor device 1910 includes a plurality of sensors (e.g., electrodes 85, capacitor sensing cells, capacitor sensors, inductive sensor, etc.) to detect a proximal touch of the panel 1912. For example, when one or more fingers, styluses, other components, etc. touches the screen, capacitance of sensors proximal to the touch(es) are affected (e.g., impedance changes). The drive-sense circuits (DSC) coupled to the affected sensors detect the change and provide a representation of the change to the touch sensor device processing module 1942, which may be a separate processing module or integrated into the processing module 42.

The touch sensor device processing module 1942 processes the representative signals from the drive-sense circuits (DSC) to determine the location of the touch(es). This information is inputted to the processing module 42 for processing as an input. For example, a touch represents a selection of a location on the panel 1912, a motion on the panel 1912, a gesture of a user with respect to the panel 1912, etc.

In addition, with respect to this diagram and others herein, note that the panel 1912 may be implemented in a variety of ways including in a rigid format such as is made when such electrodes are implemented in a TSD that includes display functionality. However, when the panel 1912 that includes the electrodes 85, which may be implemented in any desired pattern, may alternatively be implementation using other non-rigid materials that are flexible and allow for adaptability to a variety of applications. Such materials may be polymer, flexible plastic, any other materials that facilitates capacitive coupling to the electrodes of the panel 1912 while also allowing flexibility of the panel 1912.

FIG. 20 is a schematic block diagram of another embodiment 2000 of a touch sensor device (TSD) in accordance with the present disclosure. This diagram has some similarities to prior diagrams including FIG. 19. In this diagram, the functionality from a touch sensor device processing module 1942, which may include or be coupled to memory, such as with respect to FIG. 19, is integrated into the processing module 42, which may include or be coupled to memory. The processing module 42 facilitates touch related functionality without specifically supporting display related functionality.

Note that while many of the examples of electrode alignment within a panel or touchscreen display show the electrodes as being aligned with respect to rows and columns, any other desired configuration of electrodes may alternatively be made. For example, electrodes may be arranged angularly such as a first set of electrodes are implemented as extending from upper left to lower right of the panel or touch screen display and a second set of electrodes are implemented as extending from upper right to lower left of the panel or touchscreen display. Generally speaking, any desired configuration and implementation of electrode arrangement within such a panel or touchscreen display, including any such pattern shown with respect to FIG. 16, may be implemented within any such device as described here including various aspects, embodiments, and/or examples of the disclosure (and/or their equivalents).

Figure 21:
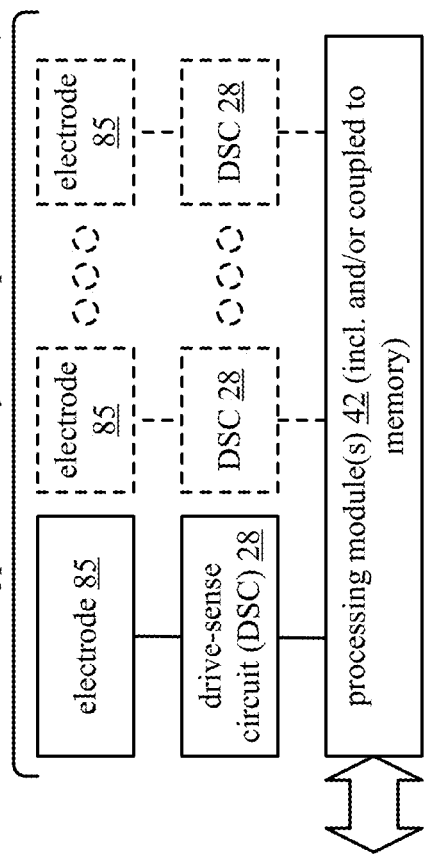
FIG. 21 is a schematic block diagram of another embodiment of a touch sensor device (TSD) in accordance with the present disclosure.

FIG. 21 is a schematic block diagram of another embodiment 2100 of a touch sensor device (TSD) in accordance with the present disclosure. The TSD includes one or more drive-sense circuits (DSCs) 28 and one or more electrodes 85 in accordance with the present disclosure. Within this diagram, as well as any other diagram described herein, or their equivalents, the one or electrodes 85 that are in communication with one or more DSC 28 (e.g., touch sensor electrodes such as may be implemented within a TSD configured to facilitate sensing of touch, proximity, gesture, etc.) may be of any of a variety of one or more types including any one or more of a touch sensor element (e.g., including one or more touch sensors with or without display functionality), a touchscreen including both touch sensor and display functionality, a button, an electrode, an external controller, one or more rows of electrodes, one or more columns of electrodes, a matrix of buttons, an array of buttons, a film that includes any desired implementation of components to facilitate touch sensor operation, and/or any other configuration by which interaction with the touch sensor may be performed.

Note that the one or more electrodes 85 may be implemented within any of a variety of devices including any one or more of a touchscreen, a pad device, a laptop, a cell phone, a smartphone, a whiteboard, an interactive display, a navigation system display, an in-vehicle display, a panel (e.g., implemented using rigid or flexible material), etc., and/or any other device in which one or more touch electrodes 85 may be implemented. Note also that the one or more electrodes 85 may be implemented within any of a variety of vehicles (e.g., an automobile, a, a boat, an aircraft, a spacecraft, etc.). Moreover, the one or more electrodes 85 may be implemented within any one or more components within any such vehicle. Note also that the one more electrodes 85 may be implemented within any of variety of structures (e.g., a home, an office building, a hospital, a hotel, etc.). Moreover, the one or more electrodes 85 may be implemented within any one or more components within any such structure (e.g., a wall, a floor, a window, a table, a countertop, a table, and appliance, etc.)

Note that such interaction of a user with an electrode 85 may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor including proximity detection, gesture detection, etc.). With respect to the various embodiments, implementations, etc. of various respective electrodes as described herein, note that they may also be of any such variety of one or more types. For example, electrodes may be implemented within any desired shape or style (e.g., lines, buttons, pads, etc.) or include any one or more of touch sensor electrodes, capacitive buttons, capacitive sensors, row and column implementations of touch sensor electrodes such as in a touchscreen, etc.

One example of such user interaction with the one or more electrodes 85 is via capacitive coupling between the user and the one or more electrodes 85. Such capacitive coupling (CC) may be achieved from a user, via a stylus, an active element such as an electronic pen (e-pen), and/or any other element such as an overlay, another TSD, etc. implemented to facilitate capacitive coupling between the user and the electrode 85. In some examples, note that the one or more electrodes 85 are also implemented to detect user interaction based on user touch (e.g., via capacitive coupling (CC) from a user, such as a user's finger, to the one or more electrodes 85).

Another example of such interaction with the one or more electrodes 85 is via capacitive coupling between a non-user element and the one or more electrodes 85. For example, consider a robotic arm, article of manufacture, etc. comes into proximity to the one or more electrodes 85, then capacitive coupling between the a robotic arm, article of manufacture, etc. may be detected via the one or more electrodes 85. Note that any example, embodiment, etc. described herein corresponding to user interaction with the TSD may analogously be performed based on interaction of any other object other than a user when interacting with the TSD.

At the bottom of this diagram, one or more processing modules 42 is coupled to drive-sense circuits (DSCs) 28. Note that the one or more processing modules 42 may include integrated memory and/or be coupled to other memory. At least some of the memory stores operational instructions to be executed by the one or more processing modules 42.

Figure 22:
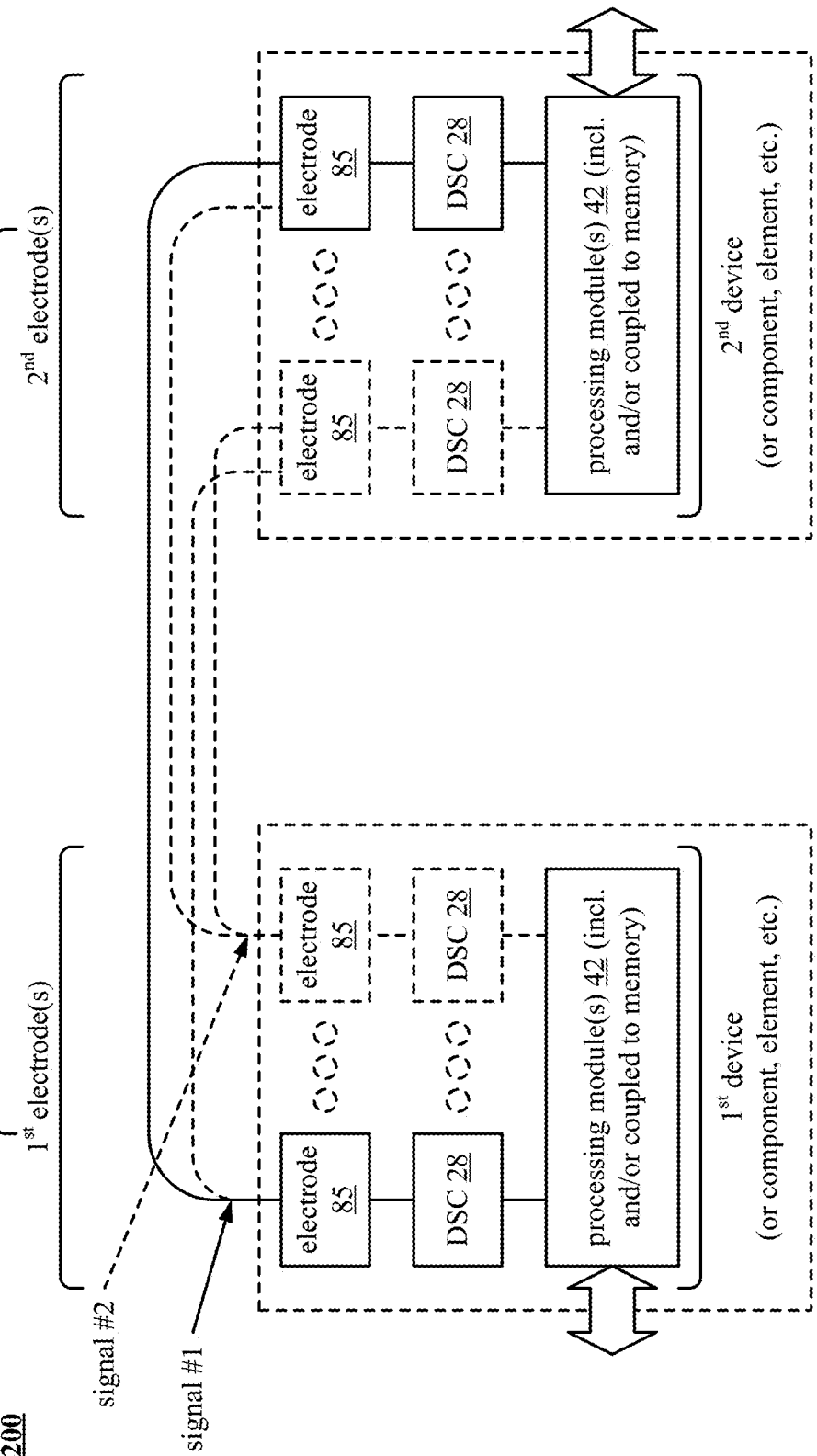
FIG. 22 is a schematic block diagram of another embodiment of multiple touch sensor devices (TSDs) in accordance with the present disclosure.

FIG. 22 is a schematic block diagram of another embodiment 2200 of multiple touch sensor devices (TSDs) in accordance with the present disclosure. At the bottom of this diagram, a first TSD/$1^{st}$ device includes one or more processing modules 42 includes a first subset of the one or more processing modules 42 that are in communication and operative with a first subset of the one or more DSCs 28 (e.g., those in communication with one or more row and/or column electrodes of the first TSD/$1^{st}$ device) and a second TSD/$2^{nd}$ device includes a second subset of the one or more processing modules 42 that are in communication and operative with a second subset of the one or more DSCs 28 (e.g., those in communication with one or more row and/or column electrodes of the second TSD/$2^{nd}$ device).

In even other examples, the one or more processing modules 42 shown in the first TSD/$1^{st}$ device or the second TSD/$2^{nd}$ device includes a first subset of the one or more processing modules 42 that are in communication and operative with a first subset of the one or more DSCs 28 (e.g., those in communication with one or more row and/or column electrodes of a TSD) and a second subset of the one or more processing modules 42 that are in communication and operative with a second subset of the one or more DSCs 28 (e.g., those in communication with electrodes of an e-pen or some other TSD).

In some examples, the first subset of the one or more processing modules 42, a first subset of one or more DSCs 28, and a first subset of one or more electrodes 85 are implemented within or associated with a first TSD/$1^{st}$ device, and the second subset of the one or more processing modules 42, a second subset of one or more DSCs 28, and a second subset of one or more electrodes 85 are implemented within or associated with a second TSD/$2^{nd}$ device. The different respective devices (e.g., first and second) may be similar type devices or different devices. For example, they may both be devices that include touch sensors (e.g., without display functionality). For example, they may both be devices that include touchscreens (e.g., with display functionality). For example, the first TSD/$1^{st}$ device may be a device that include touch sensors (e.g., with or without display functionality), and the second TSD/$2^{nd}$ device is an e-pen device.

In an example of operation and implementation, with respect to the first subset of the one or more processing modules 42 that are in communication and operative with a first subset of one or more DSCs 28, a signal #1 is coupled from a first electrode 85 that is in communication to a first DSC 28 of the first subset of one or more DSCs 28 that is in communication and operative with the first subset of the one or more processing modules 42 to a second electrode 85 that is in communication to a first DSC 28 of the second subset of one or more DSCs 28 that is in communication and operative with the second subset of the one or more processing modules 42.

When more than one DSC 28 is included within the first subset of one or more DSCs 28, the signal #1 may also be coupled from the first electrode 85 that is in communication to a first DSC 28 of the first subset of one or more DSCs 28 that is in communication and operative with the first subset of the one or more processing modules 42 to a third electrode 85 that is in communication to a second DSC 28 of the second subset of one or more DSCs 28 that is in communication and operative with the second subset of the one or more processing modules 42.

Generally speaking, signals may be coupled between one or more electrodes 85 that are in communication and operative with the first subset of the one or more DSCs 28 associated with the first subset of the one or more processing modules 42 and the one or more electrodes 85 that are in communication and operative with the second subset of the one or more DSCs 28 (e.g., signal #1, signal #2). In certain examples, such signals are coupled from one electrode 85 (e.g., such as associated with the first TSD/$1^{st}$ device) to one or more other electrodes 85 (e.g., such as associated with the second TSD/$2^{nd}$ device).

In some examples, these two different subsets of the one or more processing modules 42 are also in communication with one another (e.g., via communication effectuated via capacitive coupling between a first subset of electrodes 85 serviced by the first subset of the one or more processing modules 42 and a second subset of electrodes 85 serviced by the first subset of the one or more processing modules 42, via one or more alternative communication means such as a backplane, a bus, a wireless communication path, etc., and/or other means). In some particular examples, these two different subsets of the one or more processing modules 42 are not in communication with one another directly other than via the signal coupling between the one or more electrodes 85 themselves.

A first group of one or more DSCs 28 is/are implemented simultaneously to drive and to sense respective one or more signals provided to a first of the one or more electrodes 85. In addition, a second group of one or more DSCs 28 is/are implemented simultaneously to drive and to sense respective one or more other signals provided to a second of the one or more electrodes 85.

For example, a first DSC 28 is implemented simultaneously to drive and to sense a first signal via a first sensor electrode 85. A second DSC 28 is implemented simultaneously to drive and to sense a second signal via a second sensor electrode 85. Note that any number of additional DSCs implemented simultaneously to drive and to sense additional signals to additional electrodes 85 as may be appropriate in certain embodiments. Note also that the respective DSCs 28 may be implemented in a variety of ways. For example, they may be implemented within a device that includes the one or more electrodes 85, they may be implemented within a TSD such as a touchscreen that includes display functionality, they may be distributed among a TSD that includes the one or more electrodes 85 that does not include display functionality, etc.

In this diagram as well as any other diagram herein, note that the different respective signals that are driven and simultaneously sensed via the electrodes 85 may be differentiated from one another. For example, appropriate filtering and processing can identify the various signals given their differentiation, orthogonality to one another, difference in frequency, etc. Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

Other examples described herein and their equivalents operate using any of a number of different characteristics other than or in addition to frequency. Differentiation between the signals based on frequency corresponds to a first signal has a first frequency and a second signal has a second frequency different than the first frequency. Differentiation between the signals based on amplitude corresponds to the first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or EEC code may be used in any of various implementations including concatenation (e.g., first ECC and/or FEC code followed by second ECC and/or EEC code, etc. such as based on an inner code/outer code architecture, etc.), parallel architecture (e.g., such that first ECC and/or EEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC). Alternatively, differentiation between the different respective signals may be made based on using different types of FEC/ECC for the different respective signals.

Differentiation between the signals based on type corresponds to a first signal being or a first type and a second signal being of a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents.

Figure 23A:
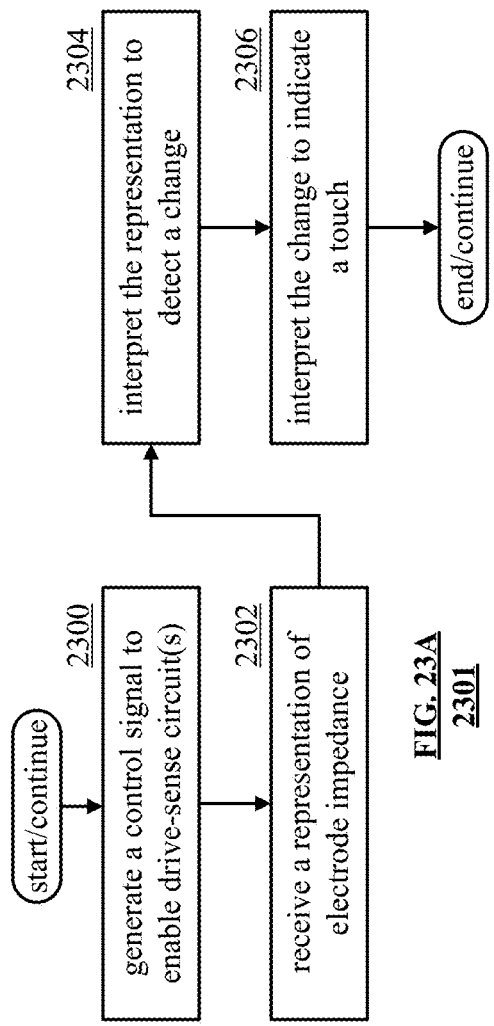
FIG. 23A is a logic diagram of an embodiment of a method for sensing a touch on a touch sensor device (TSD)(with or without display functionality) in accordance with the present disclosure.

FIG. 23A is a logic diagram of an embodiment of a method for sensing a touch on a touch sensor device (TSD)(with or without display functionality) in accordance with the present disclosure. This diagram includes a logic diagram of an embodiment of a method 2301 for execution by one or more computing devices for sensing a touch on a TSD that is executed by one or more processing modules of one or various types (e.g., 42, 82, 1942 and/or 48 of other figures included herein). The method 2301 begins at step 2300 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method 2301 continues at step 2302 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method 2301 continues at step 2304 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode of a user or other element. As another example, a decrease in mutual capacitance (e.g., the capacitance between a row electrode and a column electrode) is also indicative of a touch and/or presence of a user or other element near the electrodes. The processing module does this for each representation of the impedance of the electrode it receives. Note that the representation of the impedance is a digital value, an analog signal, an impedance value, and/or any other analog or digital way of representing a sensor's impedance.

The method 2301 continues at step 2306 where the processing module interprets the change in the impedance to indicate a touch and/or presence of a user or other element of the TSD in an area corresponding to the electrode. For each change in impedance detected, the processing module indicates a touch and/or presence of a user or other element. Further processing may be done to determine if the touch is a desired touch or an undesired touch.

Figure 23B:
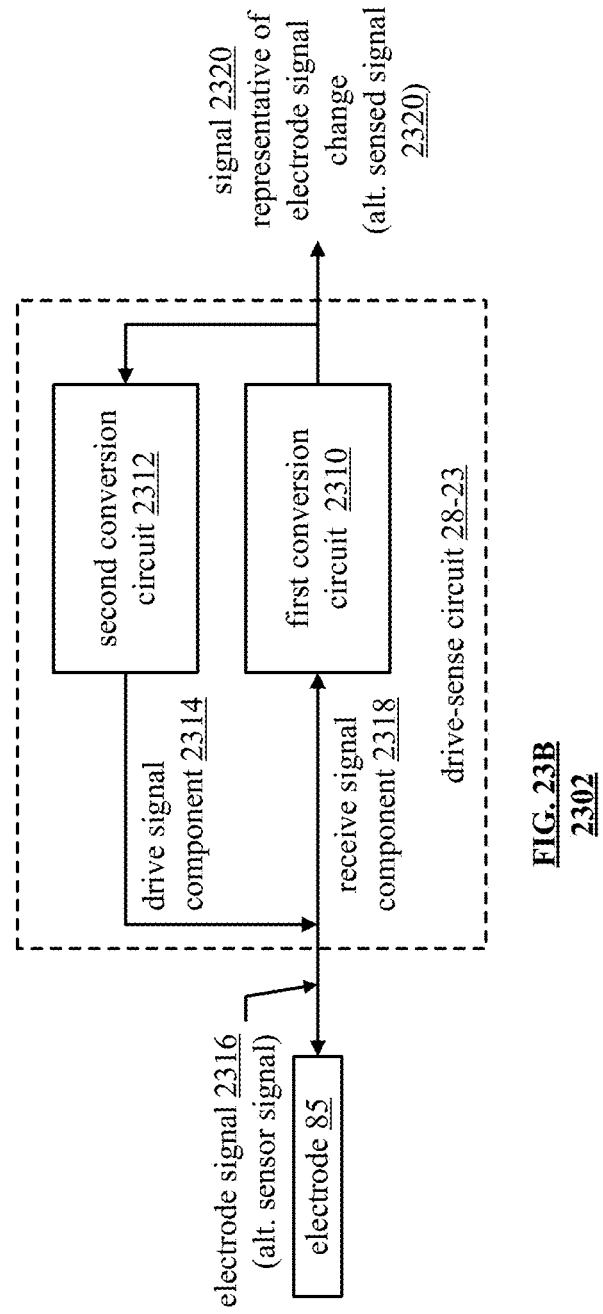
FIG. 23B is a schematic block diagram of an embodiment of a drive sense circuit in accordance with the present disclosure.

FIG. 23B is a schematic block diagram of an embodiment 2302 of a drive sense circuit in accordance with the present disclosure. this diagram includes a schematic block diagram of an embodiment of a drive sense circuit 28-18 that includes a first conversion circuit 2310 and a second conversion circuit 2312. The first conversion circuit 2310 converts an electrode signal 2316 (alternatively a sensor signal, such as when the electrode 85 includes a sensor, etc.) into a signal 2320 that is representative of the electrode signal and/or change thereof (e.g., note that such a signal may alternatively be referred to as a sensor signal, a signal representative of a sensor signal and/or change thereof, etc. such as when the electrode 85 includes a sensor, etc.). The second conversion circuit 2312 generates the drive signal component 2314 from the sensed signal 2312. As an example, the first conversion circuit 2310 functions to keep the electrode signal 2316 substantially constant (e.g., substantially matching a reference signal) by creating the signal 2320 to correspond to changes in a receive signal component 2318 of the sensor signal. The second conversion circuit 2312 functions to generate a drive signal component 2314 of the sensor signal based on the signal 2320 substantially to compensate for changes in the receive signal component 2318 such that the electrode signal 2316 remains substantially constant.

In an example, the electrode signal 2316 (e.g., which may be viewed as a power signal, a drive signal, a sensor signal, etc. such as in accordance with other examples, embodiments, diagrams, etc. herein) is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 2310 adjusts the signal 2320 based on the receive signal component 2318, which is indicative of the impedance of the electrode and change thereof. The second conversion circuit 2312 adjusts the regulated current based on the changes to the signal 2320.

As another example, the electrode signal 2316 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 2310 adjusts the signal 2320 based on the receive signal component 2318, which is indicative of the impedance of the electrode and change thereof. The second conversion circuit 2312 adjusts the regulated voltage based on the changes to the signal 2320.

Figure 24:
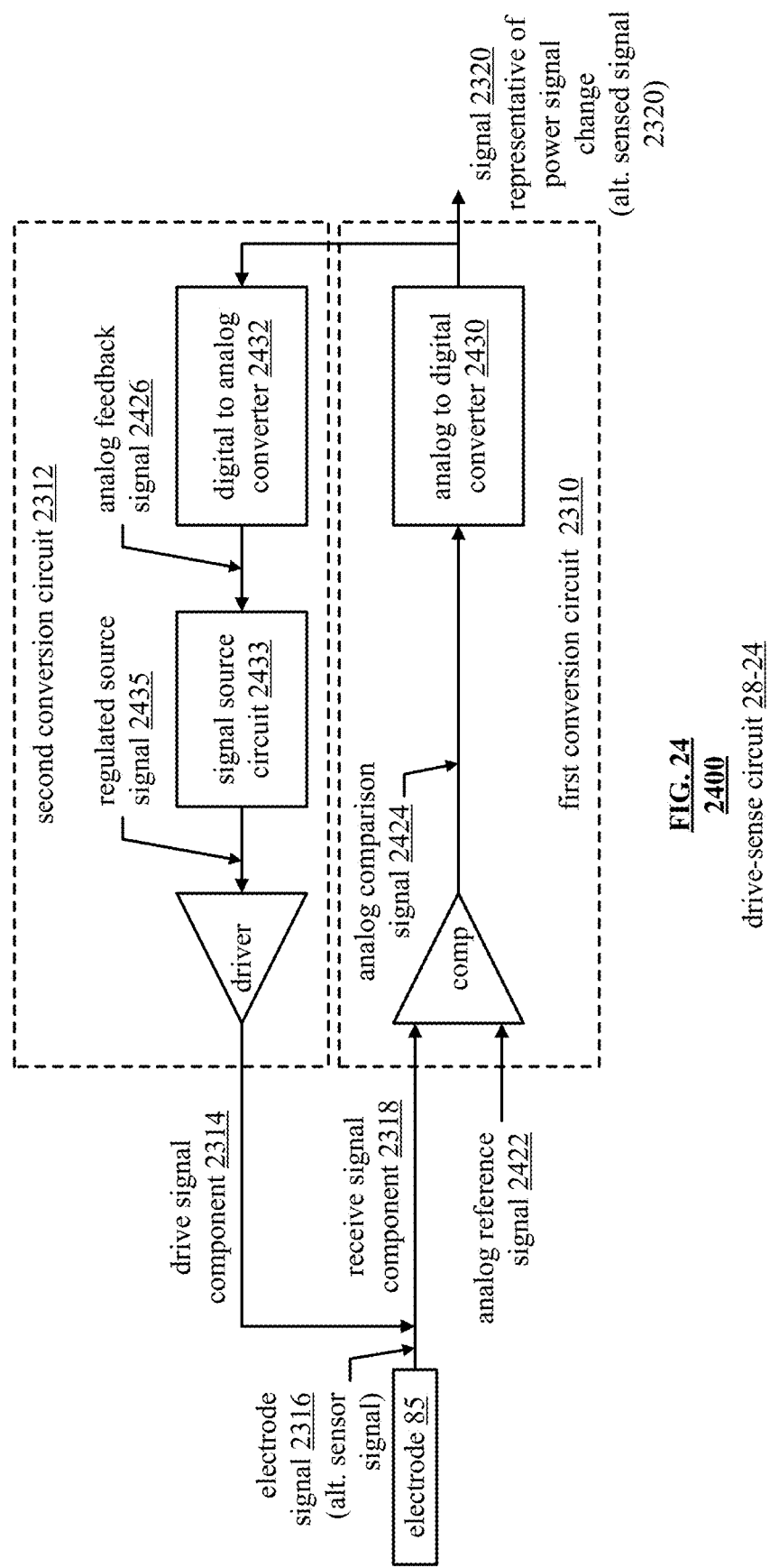
FIG. 24 is a schematic block diagram of another embodiment of a drive sense circuit in accordance with the present disclosure.

FIG. 24 is a schematic block diagram of another embodiment 2400 of a drive sense circuit in accordance with the present disclosure. this diagram includes a schematic block diagram of another embodiment of a drive sense circuit 28 that includes a first conversion circuit 2310 and a second conversion circuit 2312. The first conversion circuit 2310 includes a comparator (comp) and an analog to digital converter 2430. The second conversion circuit 2312 includes a digital to analog converter 2432, a signal source circuit 2433, and a driver.

In an example of operation, the comparator compares the electrode signal 2316 (alternatively, a sensor signal, etc.) to an analog reference signal 2422 to produce an analog comparison signal 2424. The analog reference signal 2424 includes a DC component and/or an oscillating component. As such, the electrode signal 2316 will have a substantially matching DC component and/or oscillating component. An example of an analog reference signal 2422 is also described in greater detail with reference to FIG. 7 such as with respect to a power signal graph.

The analog to digital converter 2430 converts the analog comparison signal 2424 into the signal 2320. The analog to digital converter (ADC) 2430 may be implemented in a variety of ways. For example, the (ADC) 2430 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 2432 may be a sigma-delta DAC, a pulse width modulator DAC, a binary weighted DAC, a successive approximation DAC, and/or a thermometer-coded DAC.

The digital to analog converter (DAC) 2432 converts the signal 2320 into an analog feedback signal 2426. The signal source circuit 2433 (e.g., a dependent current source, a linear regulator, a DC-DC power supply, etc.) generates a regulated source signal 2435 (e.g., a regulated current signal or a regulated voltage signal) based on the analog feedback signal 2426. The driver increases power of the regulated source signal 2435 to produce the drive signal component 2314.

Figure 25:
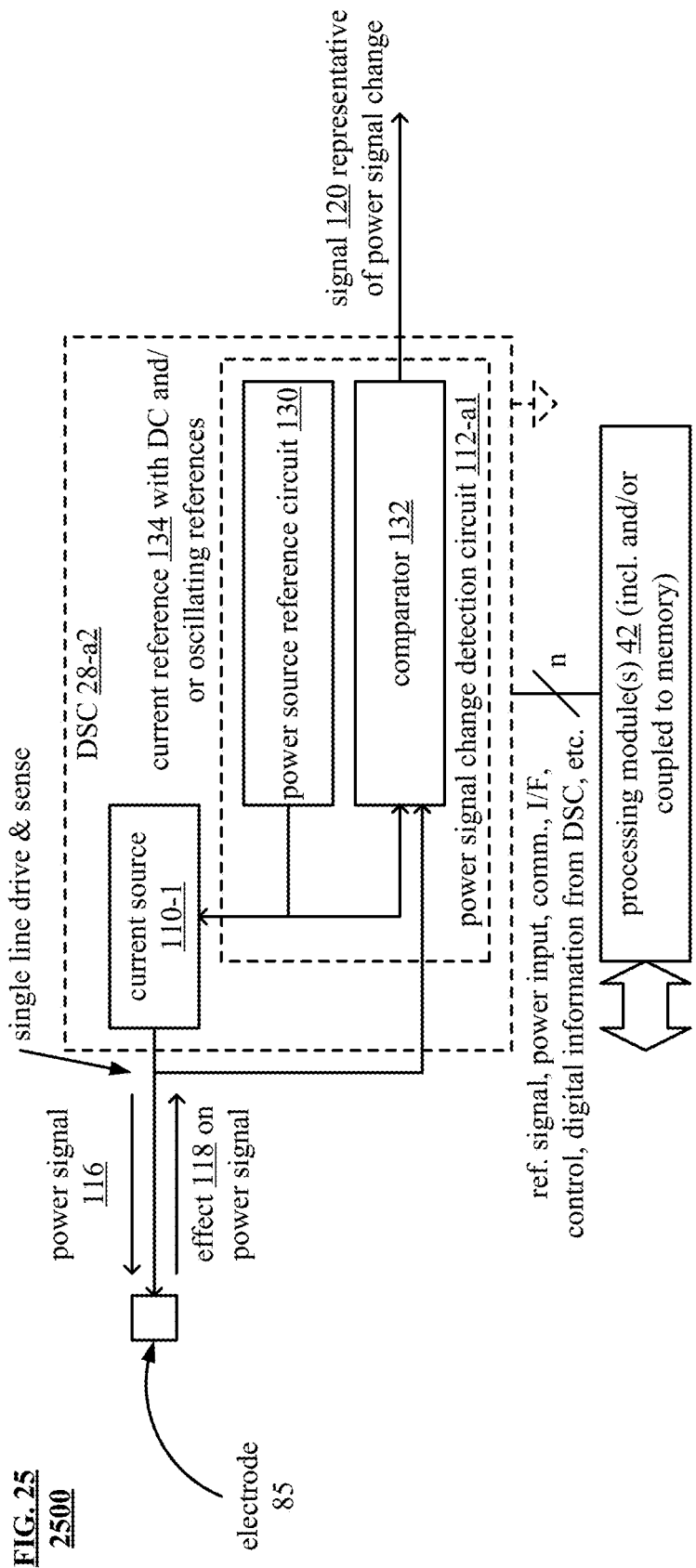
FIG. 25 is a schematic block diagram of an embodiment of a DSC that is interactive with an electrode in accordance with the present disclosure.

FIG. 25 is a schematic block diagram of an embodiment 2500 of a DSC that is interactive with an electrode in accordance with the present disclosure. Similar to other diagrams, examples, embodiments, etc. herein, the DSC 28-a2 of this diagram is in communication with one or more processing modules 42. The DSC 28-a2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a2 includes a current source 110-1 and a power signal change detection circuit 112-a1. The power signal change detection circuit 112-a1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the impedance of the electrode 85 decreases and the current power signal 116 remains substantially unchanged, the voltage across the electrode 85 is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Figure 26:
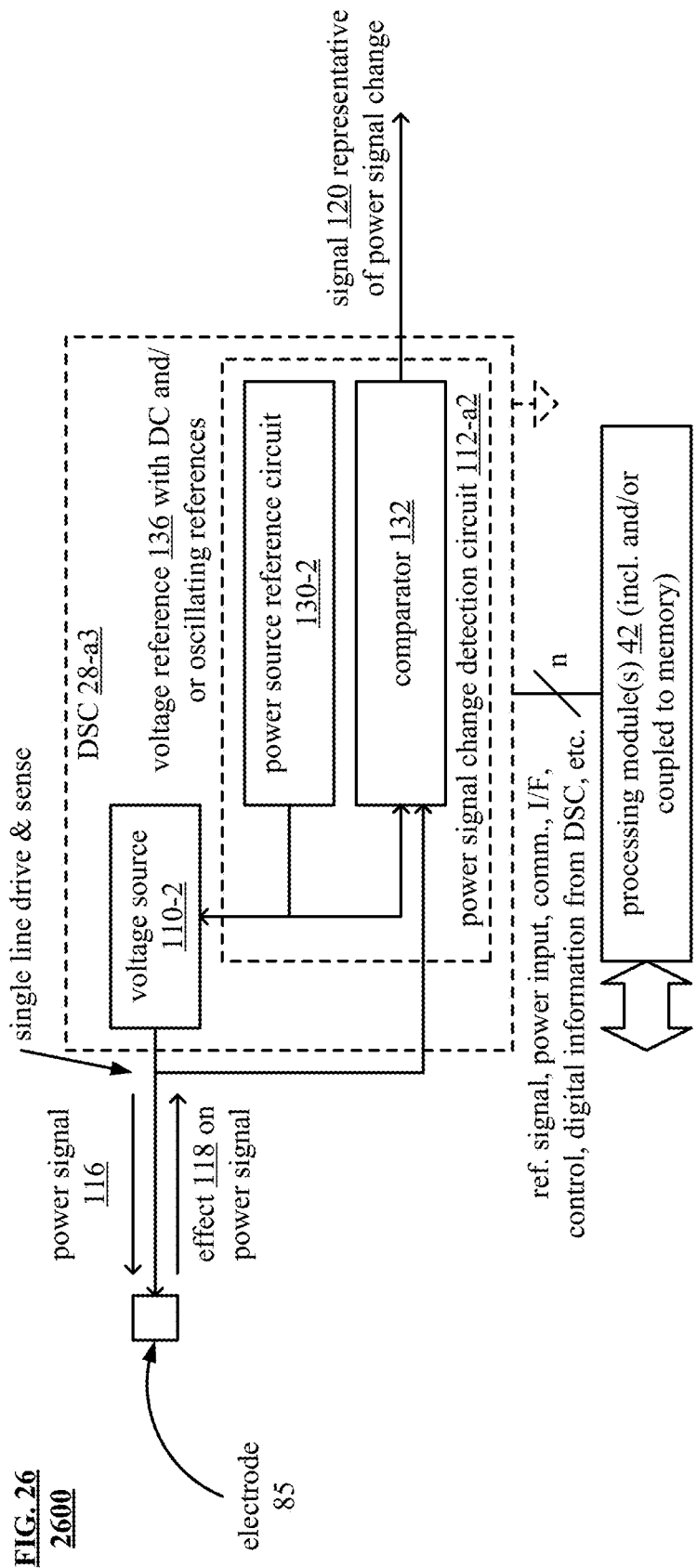
FIG. 26 is a schematic block diagram of another embodiment of a DSC that is interactive with an electrode in accordance with the present disclosure.

FIG. 26 is a schematic block diagram of another embodiment 2600 of a DSC that is interactive with an electrode in accordance with the present disclosure Similar to other diagrams, examples, embodiments, etc. herein, the DSC 28-a3 of this diagram is in communication with one or more processing modules 42. Similar to the previous diagram, although providing a different embodiment of the DSC, the DSC 28-a3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a3 includes a voltage source 110-2 and a power signal change detection circuit 112-a2. The power signal change detection circuit 112-a2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the impedance of the electrode 85 decreases and the voltage power signal 116 remains substantially unchanged, the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

With respect to many of the following diagrams, one or more processing modules 42, which includes and/or is coupled to memory, is configured to communicate and interact with one or more DSCs 28 the coupled to one or more electrodes of the panel or a touchscreen display such as may be implemented within a touch sensor device (TSD) (with or without display functionality). In many of the diagrams, the DSCs 28 are shown as interfacing with electrodes of the panel or touchscreen display (e.g., via interface 86 that couples to row electrodes and another interface 86 that couples to column electrodes). Note that the number of lines that coupled the one or more processing modules 42 to the respective one or more DSCs 28, and from the one or more DSCs 28 to the respective interfaces 86 may be varied (e.g., such as may be described by n and m, which are positive integers greater than or equal to 1). Note that the respective values may be the same or different within different respective embodiments and/or examples herein.

Note that the same and/or different respective signals may be driven simultaneously sensed by the respective one or more DSCs 28 that couple to electrodes 85 within any of the various embodiments and/or examples herein. In some examples, a common signal (e.g., having common one or more characteristics) is implemented in accordance with self signaling, and different respective signals (e.g., different respective signals having one or more different characteristics) are implemented in accordance with mutual signaling as described below. Again, as mentioned above, note that the different respective signals that are driven and simultaneously sensed via the electrodes 85 may be differentiated from one another.

The present disclosure includes various examples, embodiments, implementations, etc. by which user interaction is performed with a touch sensor device (TSD). Note that such a TSD may or may not include display functionality. In addition, note that such a TSD may be implemented in any of a number of desired ways. For example, consider the embodiments of FIG. 21 and FIG. 22. Note that such a device that includes one or more processing modules and one or more DSCs that respectively service one or more electrodes may be implemented in a variety of ways. Such functionality may be included within a touchscreen, a TSD that does include display functionality, a TSD that does not include display functionality, a computing device, a desktop computer, a laptop computer, handheld device such as a pad device, a touch pad device, a cellular phone, smart phone, television, etc. Note also that such functionality may be included within any of a variety of components of a house or building such as a wall, a door, countertop, a metal plate, etc. In addition, note that such functionality may be included within any variety of components of a vehicle (e.g., an automobile, an aircraft, a boat, etc.), such as within a steering wheel, a touchscreen within the vehicle, navigation system, an armrest, and/or any other component that is configured to facilitate user interaction such as within a cockpit, etc. Generally speaking, such functionality may be implemented within any of a variety of ways.

Figure 27:
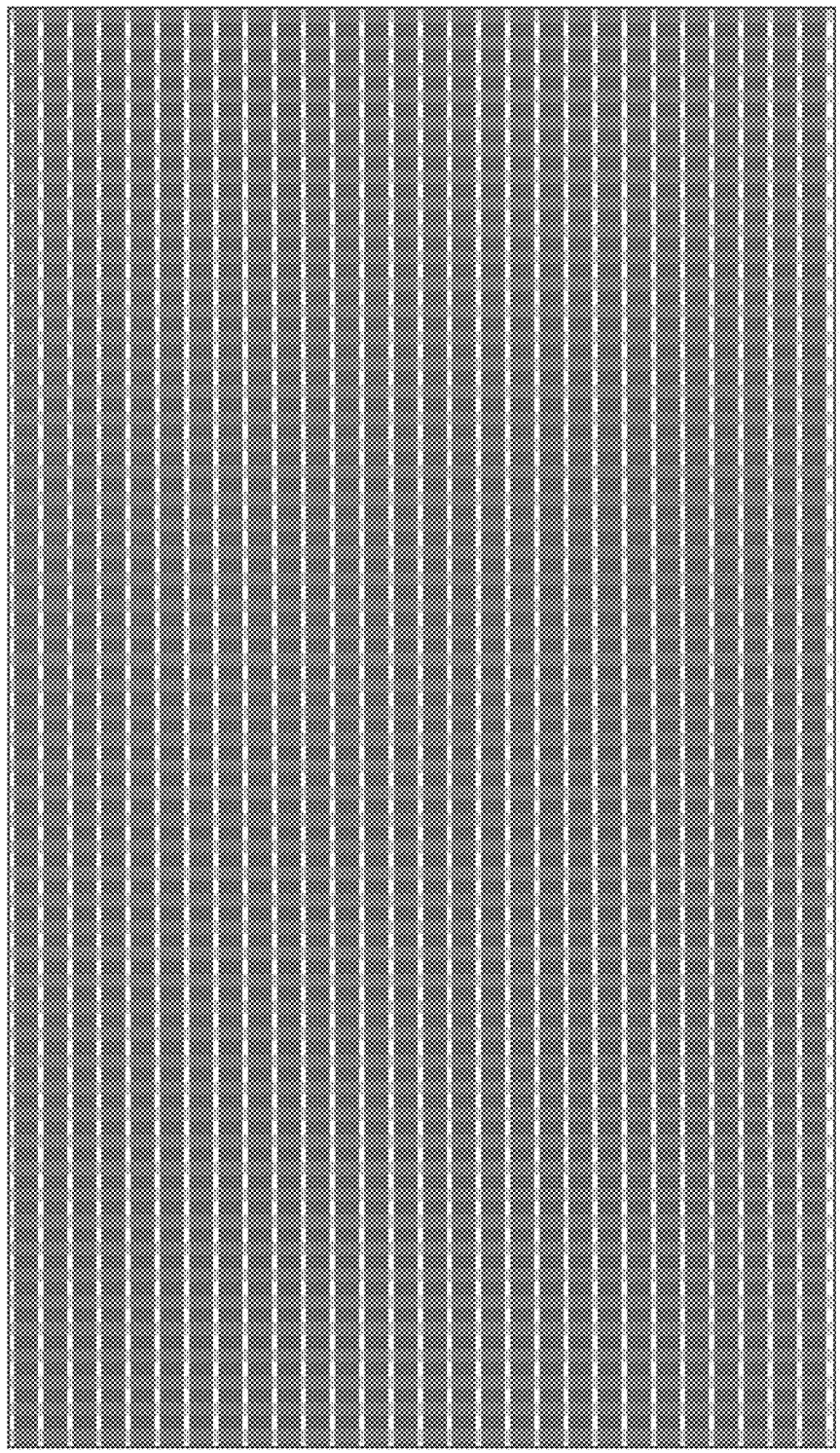
FIG. 27 is a schematic block diagram of an embodiment of a sensor pattern such as may be implemented within a touch sensor device (TSD) in accordance with the present disclosure.

FIG. 27 is a schematic block diagram of an embodiment 2700 of a sensor pattern such as may be implemented within a touch sensor device (TSD) in accordance with the present disclosure. This diagram shows a TSD that includes touch sensors implemented based on rows and columns Generally speaking, these may be viewed as horizontal and vertical channels, or X (horizontal) and Y channels (vertical). Note that this diagram shows an example of a sensor pattern, but any alternative design may instead be implemented. For example, other sensor patterns may include a Manhattan type pattern, a diamond type pattern, a metal mesh type pattern, silver nanowire type pattern, etc. Within various such patterns, typically the touch sensors are implemented in different directions such that a first group of the touch sensors are implemented in a first direction, and a second group of the touch sensors are implemented in a second direction. Note that such a TSD may be implemented to include display functionality or may not include display functionality. For example, a TSD includes a touchscreen such that the TSD includes both touch functionality that facilitates detection of user interaction with the TSD including actual contact of the user with the TSD or detection of user interaction with the TSD based on a user being within sufficient proximity of the TSD so as to affect one or more of the touch sensors of the TSD so that the TSD can detect the user interaction.

Figure 28:
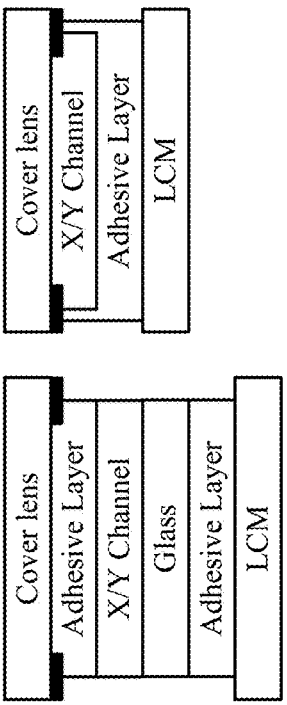
FIG. 28 is a schematic block diagram of various embodiment of out-cell sensor variations such as may be implemented within a touch sensor device (TSD) in accordance with the present disclosure.

FIG. 28 is a schematic block diagram of various embodiment 2800 of out-cell sensor variations such as may be implemented within a touch sensor device (TSD) in accordance with the present disclosure. This diagram shows various examples of out-cell touch sensor.

The top of the diagram shows glass type out-cell touch sensors. At the top of these various structure examples, there is a cover lens, and at the bottom of the various structure examples, there is a liquid crystal monitor (LCM). LCM generally refers to a display type device that employers liquid crystal display (LCD) technology, such as a computer monitor. The structure example identified by GG2 includes adhesive layers adjacent to both the cover lens layer and the LCM layer. Next to each of these adhesive layers are the layers that include the X channels and the Y channels, respectively. A glass layers implement it between the X channels and the Y channels. The structure example identified by GG also includes adhesive layers adjacent to both the cover lens layer and the LCM layer, except the X channels and the Y channels in this example are included within a common layer, and a glass layers implemented below that common layer and above the bottom adhesive layer. The structure example identified by OGS includes the X channels and the Y channels implemented within a common layer above and adhesive layer that is implemented adjacent to the LCM layer.

The bottom of the diagram shows film type out-cell touch sensors. At the top of these various structure examples, there is also a cover lens, and at the bottom of these various structure examples, there is also a liquid crystal monitor (LCM). The structure example identified by G1F includes X channels implemented below the cover lens layer, a first adhesive layer implemented below the X channel layer, a Y channel layer implemented below the first adhesive layer, a film layer implemented below the Y channel layer, and a second adhesive layer implemented below the film layer and above the LCM layer. The structure example identified by GFF includes a first adhesive layer below the cover lens layer, a first film layer below the first adhesive layer, X channels implemented below the first film layer, a second adhesive layer below the X channel layer, Y channels implemented below the second adhesive layer, a second film layer implemented below the Y channel layer, and a third adhesive layer implemented below the second film layer and above the LCM layer. The structure example identified by GF2 includes a first adhesive layer below the cover lens layer, X channels implemented below the first adhesive layer, a film layer implemented below the X channel layer, Y channels implemented below the film layer, and a second adhesive layer implemented below the Y channel layer and above the LCM layer. The structure example identified by GF includes a first adhesive layer below the cover lens layer, X channels and the Y channels implemented within a common layer, a film layer implemented below the common layer, and a second adhesive layer implemented below the film and above the LCM layer.

Note that these are merely examples by which TSDs that are implemented using out-cell touch sensor technology may be made, and these examples are not exhaustive of all possible implementations by which the structure may be implemented. Generally speaking, as can be seen, the one or more layers that include touch sensors (e.g., X channels and Y channels) are implemented in the different layers than the LCM layer. In certain other examples, the touch sensors may alternatively be implemented within a same layer as the LCM layer.

Figure 29A:
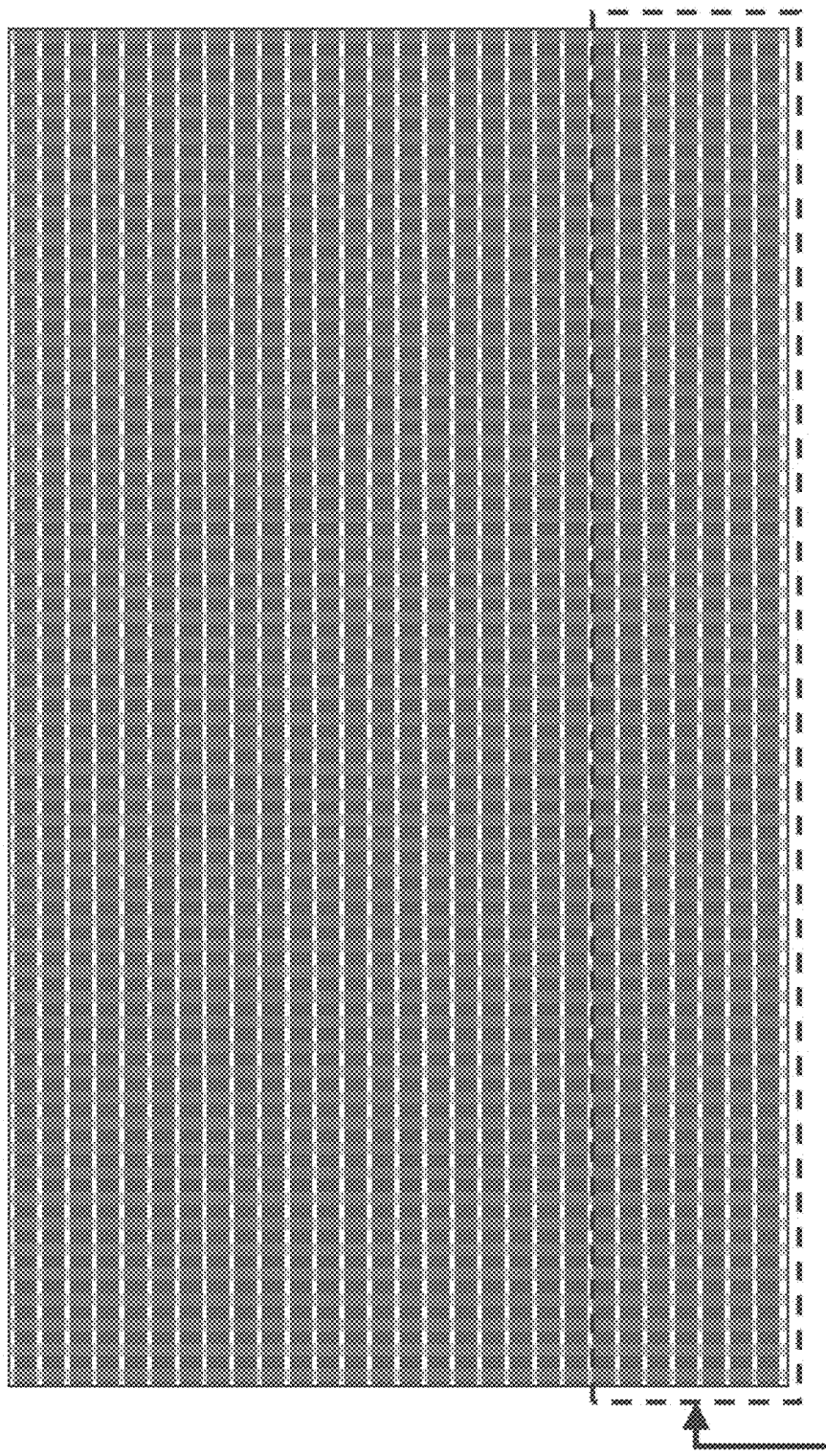
FIG. 29A is a schematic block diagram of an embodiment of a touch sensor device (TSD), which may or may not include touchscreen display or display functionality, that includes one or more prioritized sensing regions in accordance with the present disclosure.

FIG. 29A is a schematic block diagram of an embodiment 2901 of a touch sensor device (TSD), which may or may not include touchscreen display or display functionality, that includes one or more prioritized sensing regions in accordance with the present disclosure. In this diagram, one or more areas of the TSD is implemented for high priority functions. That is to say, user interaction with these one or more areas of the TSD, whether a direct touch or being within sufficient proximity to the TSD, has a different prioritization than user interaction with one or more other areas of the TSD. In an example of operation and implementation, these one or more areas of the TSD are implemented for high priority functions. Only high priority functions are implemented within these one or more areas of the TSD. This allows for a touch controller to prioritize when looking for touches/interactions of a user in these one or more areas of the TSD before processing touches/interactions of a user in one or more other areas of the TSD. In an example, this allows the TSD to ensure that higher priority touches/interactions of a user are always serviced. In another example, this allows the TSD to ensure that higher priority touches/interactions of the user are serviced within one or more areas of the TSD before lower priority touches/interactions of the user are serviced within one or more other areas of the TSD.

For example, for high priority touch/user interaction functions (e.g., any user interaction function, touch, hover, within proximity, etc.), the TSD is implemented such as to designate a specific area of the device (e.g., panel, screen, touchscreen, etc.) for location of these selections. In an example of operation and implementation, the TSD includes only high priority functions in one or more particular areas. This allows the TSD (e.g., the touch controller of the TSD) to prioritize looking for touches/user interactions in these areas before processing any other area. This provides a number of improvements over existing technologies including ensuring that the highest priority touches/user interactions are always serviced, always serviced before relatively lower priority touches/user interactions, ensuring a higher level of certification of such highest priority touches user interactions, etc. In addition, note that more than one respective area of the TSD may be implemented for prioritized and differentiated priority sensing regions. For example, first area of the TSD is implemented as a highest priority sensing region, then a second area of the TSD is implemented as a next to highest priority sensing region, etc. Generally speaking, any desired number of different perspective and sensing regions of the TSD may be operated in accordance with such differentiated priority sensing.

Note that other examples of a TSD include a first area of the TSD that is implemented for functions having a first priority, a second area of the TSD that is implemented for functions having a second priority, and one or more other areas of the TSD implemented for functions having one or more other priorities. Generally speaking, the TSD is implement it such that there is differentiated priority sensing within the TSD such that the TSD includes at least two different areas that have different priority sensing. In an example, the TSD includes two areas such that the first area of the TSD is implemented for one or more functions having a first priority, and a second area of the TSD is implemented for functions having a second priority.

In certain applications and environments, a TSD operates to meet a certain level of certification. For example, consider the automotive industry, for a computer chip to be implemented within an automobile (e.g., a car, truck, a van, etc.), the computer chip must meet a minimum level of certification. Such certifications may be based on a number of different considerations including temperature, pressure, moisture, etc. One example of certification required within the automotive industry is the ASIL standard. The ASIL standard includes a number of levels of certification. Within the ASIL standard, the lowest is the ASIL QM level of certification, and this corresponds to typical computer chips that are generally available (e.g., off-the-shelf computer chips). The TSD is implemented using computer chips that meet this lowest ASIL QM level of certification are not implemented to service functions related to safety. For example, such a TSD implemented using computer chips that meet this lowest ASIL QM level of certification is not implemented to service critical safety functions such as windshield wipers, headlamps, etc. A TSD implemented using computer chips that meet this lowest ASIL QM level of certification is not implemented to service any safety issue of the vehicle. All such safety related applications would be implemented using some means other than a TSD within the vehicle.

There are other levels of certification within the ASIL standard including ASIL A level of certification, ASIL B level of certification, ASIL C level of certification, and ASIL D level of certification. Within these various levels of certification, the ASIL D level of certification is the most stringent. Within the automotive industry today, there are typically no computer chips that are implemented that meet any higher-level certification then the lowest is the ASIL QM level of certification. As such, no TSD implemented within the automotive industry today is implemented so as to service any safety related functions. For a TSD to be implemented within the automotive industry to service one or more safety-related functions, a TSD must be implemented using components that meet higher levels of certification within the ASIL standard. A TSD implemented using drive-sense circuits (DSCs) as described within this disclosure is operable to meet higher levels of certification within the ASIL standard than any other TSD implemented within the automotive industry. Because of the very high-performance of a TSD implemented using DSCs as described within this disclosure, a TSD may be implemented to service one or more safety-related functions of the vehicle and meet higher levels of certification within the ASIL standard (e.g., ASIL A level of certification, ASIL B level of certification, ASIL C level of certification, and/or ASIL D level of certification).

In addition, ASIL and/or other levels of certification may be employed within other environments of operation including aircraft, maritime, spacecraft, etc. environments of operation. For example, different environments of operation, different industries, etc. may have different standards of certification and/or different levels of certification. Nonetheless, a TSD such as implemented in accordance with various examples of this disclosure is capable to perform more effectively than prior art devices.

In an example of operation and implementation, a TSD implemented using DSCs as described within this disclosure is also implemented to include one or more areas of the TSD to service one or more functions associated with different priority than one or more other areas of the TSD. In this diagram, an area towards the bottom of the TSD is shown to be implemented for high priority functions.

In another example of operation and implementation, a TSD is implemented to include a panel and drive-sense circuits (DSCs). The panel includes electrodes. For example, FIG. 14 and FIG. 15 show examples of TSDs that include electrodes. FIG. 16 shows example of electrode patterns that may be used within various TSDs. FIGS. 17, 18, and 19 show various examples of TSDs that may or may not include display functionality. For example, a panel of a TSD may be implemented with or without display functionality. In certain instances, a panel that includes not only touch something capability but also display functionality may be referred to as a touch screen.

In the TSD, the DSCs are operably coupled to the electrodes. For example, each respective electrode is serviced by a corresponding DSC. In alternative implementations, a DSC is configured to service more than one electrode. For example, such servicing of electrodes may be performed on a time division multiplexing manner such that a DSC services a first electrode at a first time and a second electrode at a second time. A drive-sense circuit (DSC) of the DSCs is operably coupled via a single line to an electrode of the electrodes.

The DSC is configured to provide a signal via the single line to the electrode and simultaneously to sense the signal via the single line. Note that the sensing of the signal includes detection of an electrical characteristic of the electrode and/or a change of the signal. The DSC is also configured to generate a digital signal representative of the electrical characteristic of the electrode and/or the change of the signal.

In certain examples, the TSD also includes memory that stores operational instructions and one or more processing modules operably coupled to the DSCs and the memory. When enabled, the one or more processing modules is configured to execute the operational instructions to process the digital signal to determine the electrical characteristic of the electrode and/or the change of the signal. The one or more processing modules is also configured to process first digital signals generated by a first subset of the DSCs that includes fewer than all of the plurality of DSCs. Note that the first subset of the DSCs is configured to service a first area of the panel that corresponds to a first one or more functions. The one or more processing modules is also can be geared to process second digital signals generated by a second subset of the DSCs that is different than the first subset of the DSCs and that includes fewer than all of the DSCs after processing the first digital signals. Note that second subset of the plurality of DSCs configured to service a second area of the panel that corresponds to a second one or more functions. The one or more processing modules is also configured to facilitate operation of the first one or more functions before operation of any other functions.

Note that the TSD may be implemented in any of a variety of environments. The respective functions corresponding to the different areas of the panel may be varied. For example, consider the TSD is implemented within a vehicle. The different respective areas of the panel may correspond to different respective automotive control functions. For example, a first one or more functions associated with a first area of the panel correspond to critical automotive control functions, and a second one or more functions associated with a second area of the panel correspond to non-critical automotive control functions. Examples of critical automotive control functions may include the ignition, door lock, steering, braking, motor control, windshield wiper operation, etc. and/or any other automotive control functions deemed critical. Examples of non-critical automotive control functions may include volume level of and audio and/or video system, selection of a particular source of media within a media system, location of a heads up display in the field of view of a driver, air conditioning or heating temperature setting, blower setting of air conditioning or heating, etc. and/or any other automotive control functions deemed non critical.

In certain examples, the TSD is implemented such that the first one or more functions have a first priority, and the second one or more functions have a second priority that is different than the first priority. Also, in some examples, the first priority is a higher priority than the second priority such that the first one or more functions are higher priority functions than the second one or more functions.

Also, in other examples, the TSD is implemented such that the first area of the panel that corresponds to the first one or more functions includes a first subset of the electrodes having a first electrode density, and the second area of the panel that corresponds to the second one or more functions includes a second subset of the electrodes having a second electrode density. For example, the first electrode density is greater than the second electrode density such that the first area of the panel includes more electrodes per unit area than the second area of the panel. A greater electrode density within a particular region of the panel may be viewed as a greater number of electrodes implemented within a particular area of the panel.

Also, note that the respective electrodes may be implemented in any of a variety of patterns. FIG. 16 shows multiple examples of electrode patterns that may be used within TSDs. For example, the TSD is implemented such that the panel includes a first subset of the electrodes arranged in a first direction and a second subset of the electrodes arranged in a second direction (e.g., horizontal and vertical directions as one possible implementation).

In addition, in an example of operation, when enabled, the one or more processing modules is further configured to execute the operational instructions to facilitate operation of the second one or more functions after facilitating operation of the first one or more functions. For example, the different respective functions are serviced in a prioritized manner such that the first one or more functions are prioritized over the second one or more functions.

With respect to the various environments in which such a TSD may be implemented, note that the TSD may be implemented within a component of a vehicle. Examples of a vehicle may include an automobile, an aircraft, or a boat. Examples of the component of the vehicle may include a steering wheel, a touchscreen within vehicle, a navigation system, or an armrest. Generally speaking, a TSD may be implemented within any desired component of the vehicle.

In addition, note that the DSC is configured in certain examples to generate the signal based on a reference signal. This reference signal is provided by the one or more processing modules in certain examples.

In an example of operation and implementation of the DSC, the DSC includes a power source circuit operably coupled via the single line to the electrode. When enabled, the power source circuit is configured to provide an analog signal via the single line coupling to the electrode, and wherein the analog signal includes at least one of a DC (direct current) component or an oscillating component. The DSC also includes a power source change detection circuit operably coupled to the power source circuit. When enabled, the power source change detection circuit is configured to detect an effect on the analog signal that is based on the electrical characteristic of the electrode and/or the change of the signal and also to generate a digital signal representative of the electrical characteristic of the electrode and/or the change of the signal.

In certain examples, the power source circuit is implemented to include a power source to source a voltage and/or a current via the single line to the electrode. The power source change detection circuit is implemented to include a power source reference circuit configured to provide a voltage reference and/or a current reference, and a comparator configured to compare the voltage and/or the current provided via the single line to the electrode to the voltage reference and/or the current reference in accordance with producing the analog signal.

Figure 29B:
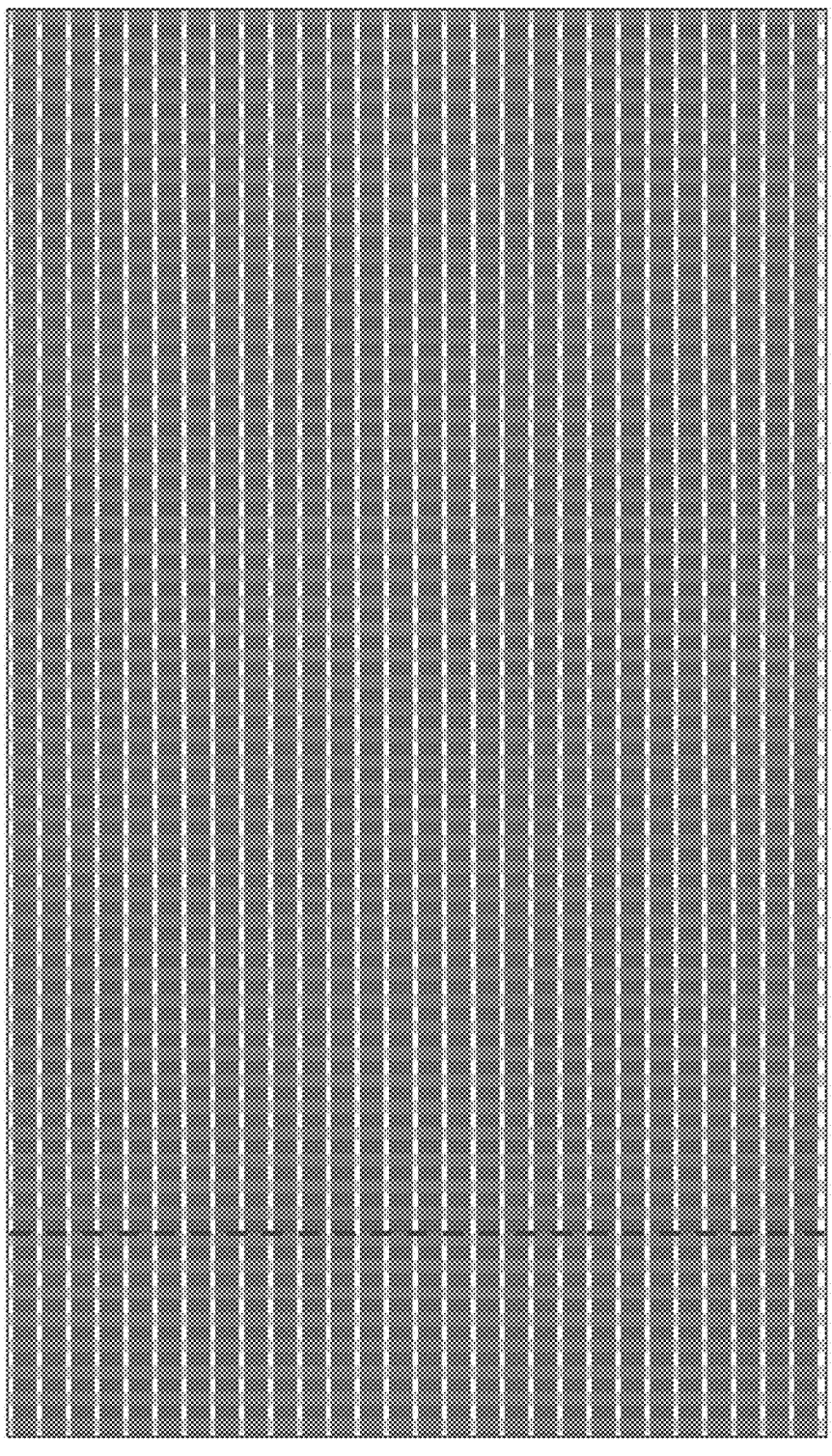
FIG. 29B is a schematic block diagram of another embodiment of a touch sensor device (TSD), which may or may not include touchscreen display or display functionality, that includes one or more prioritized sensing regions in accordance with the present disclosure.

FIG. 29B is a schematic block diagram of another embodiment 2902 of a touch sensor device (TSD), which may or may not include touchscreen display or display functionality, that includes one or more prioritized sensing regions in accordance with the present disclosure. This diagram shows an area towards the left-hand side of the TSD that is implemented for high priority functions. Generally speaking, one or more areas of the TSD that are implemented for one or more different priority functions may be located anywhere within the TSD that is configured to facilitate detection of user interaction with the TSD. This diagram shows an alternative example to the previous diagram.

Figure 29C:
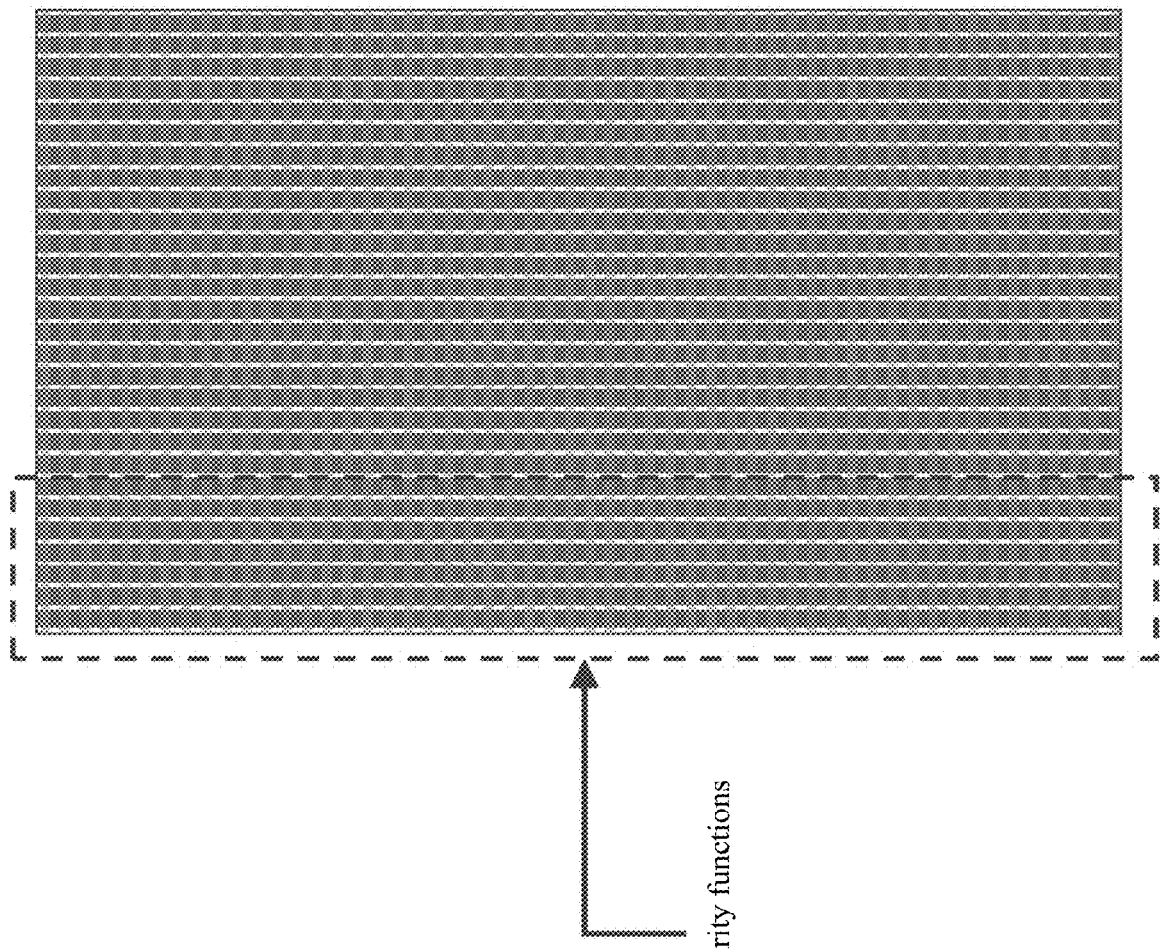
FIG. 29C is a schematic block diagram of another embodiment of a touch sensor device (TSD), which may or may not include touchscreen display or display functionality, that includes one or more prioritized sensing regions in accordance with the present disclosure.

FIG. 29C is a schematic block diagram of another embodiment 2903 of a touch sensor device (TSD), which may or may not include touchscreen display or display functionality, that includes one or more prioritized sensing regions in accordance with the present disclosure. This diagram shows a different type of TSD than the previous two diagrams. For example, the TSD this diagram has a height that is longer than the width of the TSD. This diagram shows an area towards the left-hand side of the TSD that is implemented for high priority functions.

With respect to the location of these one or more areas of the TSD correspond to those one or more functions associated with different priority than one or more other areas of the TSD, the locations of these one or more areas of the TSD is communicated to a user of the TSD. For example, a user of the TSD is informed that the one or more areas of the TSD that correspond to those one or more functions associated with different priority than one or more other areas of the TSD is communicated to the user of the TSD so that the user of the TSD knows particularly which one or more areas of the TSD correspond to such functions. Such information may be provided to the user in any of a number of ways including within packaging, paperwork, literature, associated with the TSD when the TSD is provided to and received by the user of the TSD. Such information may be indicated on the TSD such that there are one or more markings that describe or indicate which of these one or more areas of the TSD corresponding to such functions. In addition, any of a number of other means may be used to indicate to the user of the TSD where these one or more areas of the TSD corresponding to such functions are located on the TSD.

Several of the touch sensor devices (TSDs) shown in subsequent diagrams may be viewed as alternative examples of TSD 1410 or TSD 1910. Specifically, TSD 1410 includes a touchscreen display with sensors 80, while TSD 1910 includes sensors 80 but does not include any display functionality. Certain TSDs may be implemented to include display functionality while other TSDs do not include display functionality. Generally speaking, note that electrodes 85 may be implemented within such TSDs in accordance with any desired pattern.

FIG. 30A is a schematic block diagram of an embodiment 3001 of a touch sensor device (TSD), which includes touchscreen display or display functionality, that includes one or more prioritized sensing regions as identified using backlights in accordance with the present disclosure. This diagram shows a TSD that includes touchscreen display or display functionality and that includes one or more areas that are to service one or more functions associated with different priority than one or more other areas of the TSD. For example, the one or more areas having different priority are of higher priority than other areas of the TSD.

FIG. 30B is a schematic block diagram of an embodiment 3002 of a touch sensor device (TSD), which does not include touchscreen display or display functionality yet does include at least one portion having backlights, that includes one or more prioritized sensing regions as identified using the backlights in accordance with the present disclosure. This diagram shows a TSD that does not include touchscreen display or display functionality and that includes one or more areas that are to service one or more functions associated with different priority than one or more other areas of the TSD. For example, the one or more areas having different priority are of higher priority than other areas of the TSD.

Each of the TSDs of these two diagrams, FIG. 30A and FIG. 30B, includes backlights. For example, the backlights are implemented using LCD or LED technology. Specifically, the backlights are implemented in within these one or more areas that are to service one or more functions associated with different priority than one or more other areas of the TSD. The backlights are used to provide indication to the user of the TSDs regarding which one or more areas of the TSDs correspond to those one or more functions associated with different priority than one or more other areas of the TSD. These backlights provide another mechanism by which a user is able to identify the one or more areas of the TSDs correspond to those one or more functions associated with different priority than one or more other areas of the TSDs.

FIG. 30C is a schematic block diagram of an embodiment 3003 of a touch sensor device (TSD), which includes touchscreen display or display functionality, that includes one or more prioritized sensing regions as identified by a screen that is configured to slide over the one or more prioritized sensing regions in accordance with the present disclosure. This diagram shows a TSD that includes touchscreen display or display functionality and that includes one or more areas that are to service one or more functions associated with different priority than one or more other areas of the TSD. For example, the one or more areas having different priority are of higher priority than other areas of the TSD.

Each of the TSDs of these two diagrams, FIG. 30C and FIG. 30C, includes one or more screens that is configured to slide over the one or more areas of the TSD associated with the one or more functions associated with different priority than one or more other areas of the TSD. For example, the screen is a cover that is configured to be slid by a user over these one or more areas of the TSD. In certain examples, the cover provides a mechanism by which a user is able to identify the one or more areas of the TSDs correspond to those one or more functions associated with different priority than one or more other areas of the TSDs. In various examples, the screen is opaque. In other examples, the screen includes a color that is different than an area of the TSD over which the cover is configured to be slid by a user. Generally speaking, one or more covers provide another mechanism to indicate to the user of the TSD the one or more areas of the TSD that are to service one or more functions associated with different priority than one or more other areas of the TSD.

FIG. 30D is a schematic block diagram of an embodiment 3004 of a touch sensor device (TSD), which does not include touchscreen display or display functionality, that includes one or more prioritized sensing regions as identified by a screen that is configured to slide over the one or more prioritized sensing regions in accordance with the present disclosure. This diagram shows a TSD that includes touchscreen display or display functionality and that includes one or more areas that are to service one or more functions associated with different priority than one or more other areas of the TSD. For example, the one or more areas having different priority are of higher priority than other areas of the TSD.

FIG. 30E is a schematic block diagram of an embodiment 3005 of a touch sensor device (TSD), which includes touchscreen display or display functionality, that includes one or more prioritized sensing regions as identified by a surface pattern in accordance with the present disclosure. This diagram shows a TSD that includes touchscreen display or display functionality and that includes one or more areas that are to service one or more functions associated with different priority than one or more other areas of the TSD. For example, the one or more areas having different priority are of higher priority than other areas of the TSD.

FIG. 30F is a schematic block diagram of an embodiment 3006 of a touch sensor device (TSD), which does not include touchscreen display or display functionality, that includes one or more prioritized sensing regions as identified by a surface pattern in accordance with the present disclosure.

This diagram shows a TSD that does not include touchscreen display or display functionality and that includes one or more areas that are to service one or more functions associated with different priority than one or more other areas of the TSD. For example, the one or more areas having different priority are of higher priority than other areas of the TSD.

Each of the TSDs of these two diagrams, FIG. 30D and FIG. 30E, includes one or more surface patterns over the one or more areas of the TSD associated with the one or more functions associated with different priority than one or more other areas of the TSD. For example, the surface pattern is implemented over these one or more areas of the TSD tube provide indication to the user of the TSD where the one or more areas of the TSD associated with the one or more functions associated with different priority than one or more other areas of the TSD are located. For example, a surface pattern is configured to reflect light differently than other portions of the TSD. The different refracting light provides indication to the user of the TSD regarding the location of the one or more areas of the TSD corresponding to those one or more functions associated with different priority than one or more other areas of the TSDs are located. In an example of operation and implementation, the surface pattern is configured to reflect light of a certain color in a particular direction so as to provide indication to the user of the TSD regarding where those one or more areas of the TSD are located. In another example of operation and implementation, the surface pattern is configured to absorb light so as to provide indication of the user of the TSD regarding where those one or more areas of the TSD are located. Such a service pattern may be implemented in a number of ways that provide indication to the user of the TSD regarding where those one or more areas of the TSD are located.

Figure 31A:
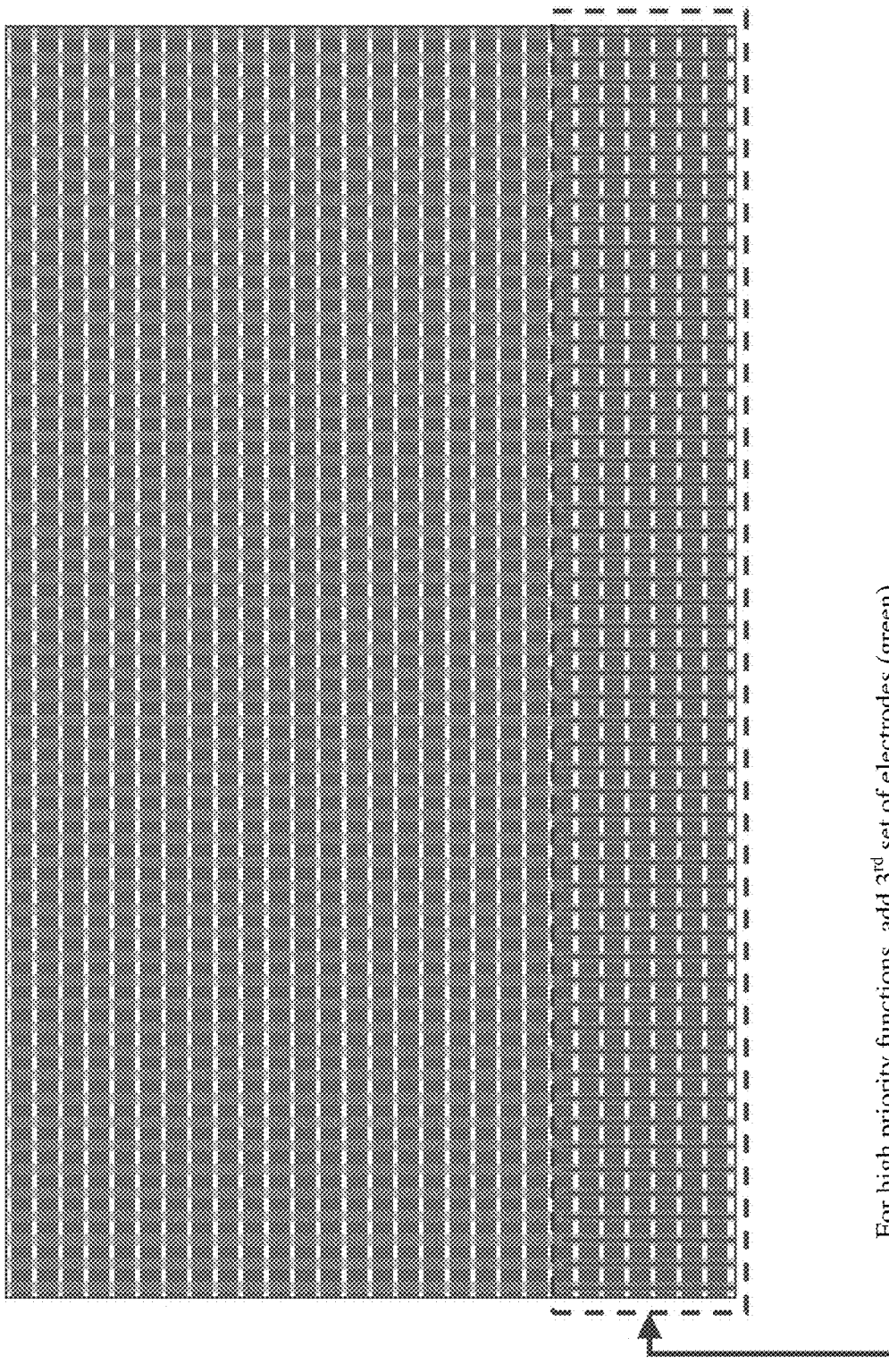
FIG. 31A is a schematic block diagram of an embodiment of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure.

FIG. 31A is a schematic block diagram of an embodiment 3101 of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure. This diagram shows a TSD that includes one or more areas that are to service one or more functions associated with different priority than one or more other areas of the TSD. For example, the one or more areas having different priority are of higher priority than other areas of the TSD. Consider an area of the TSD that services one or more functions associated with higher priority than other areas of the TSD, a third set of conductors (e.g., first set being X channel conductors and second set being Y channel conductors) is implemented within this area. In the diagram, this third set of conductors is shown by the color green. In certain examples, this third set of conductors is implemented on a third layer that is separate from the other conductors of the TSD (e.g., on a separate layer from X channel conductors and Y channel conductors). In other examples, this third set of conductors is implemented on the same layer as other conductors of the TSD (e.g., on a same layer as the X channel conductors and Y channel conductors).

The TSD is configured to service these additional conductive traces with additional channels from a touch controller to allow for a second means of detecting touches/interactions of a user of the TSD in a high priority designated area. For example, these additional conductive traces with additional channels or configured to provide a redundant means of detecting touches/interactions of a user of the TSD in a high priority designated area. These channels may be configured to operate in a variety of different ways. In some examples, these channels are configured to sense for touches/interactions of a user using a simplified self-only detection operation. Note that other sensing operations may alternatively be used for these channels. In another example, these channels are configured to sense for touches/interactions of a user using mutual-only detection operation. In even other examples, these channels are configured to sense for touches/interactions of a user using both self and mutual detection operations.

In an example of operation and implementation, a certain number of extra electrodes are implemented adjacently to the Y channel conductors. For example, these extra electrodes are implemented vertically within the TSD adjacently to Y channel conductors, but they do not extend the full length of the Y channel conductors. For example, the extra electrodes are implemented only within the high priority designated area.

In another example operation and implementation, a certain number of extra electrodes are implemented adjacently to the X channel conductors. For example, these extra electrodes are implemented horizontally within the TSD adjacently to X channel conductors, but they do not extend the full length of the X channel conductors. For example, the extra electrodes are implemented only within the high priority designated area.

In yet another example of operation and implementation, a certain number of extra electrodes are implemented adjacently to some of the Y channel conductors or some of the X channel conductors. For example, extra electrodes are implemented adjacently to every other Y channel conductor or every other X channel conductor within a high priority designated area. For another example, extra electrodes are implemented adjacently to every nth Y channel conductor or every nth X channel conductor within a high priority designated area (e.g., n is a positive integer greater than or equal to 2).

In an example of operation and implementation, these extra electrodes are serviced similarly to the other electrodes within the TSD. For example, each one of the extra electrodes is serviced using a corresponding DSC that is in communication with one or more processing modules. These additional electrodes provide even greater sensing capability within the high priority designated area. In addition, note that the extra electrodes within the designated high-priority area need not necessarily be of the same type or shape as the other electrodes within the TSD. For example, consider that the Y channel conductors and the X channel conductors within the TSD are implemented as wires. The extra electrodes within the designated high-priority area of the TSD are implemented in a form and shape that is different than wires. Generally speaking, the extra electrodes may be of any desired shape (e.g., a square pad, a circular pad, coil, etc.).

Generally speaking, note that extra electrodes may be implemented within less than the entirety of the TSD or throughout the entirety of the TSD. For example, two or more entirely independently operating systems may be implemented to perform user interaction detection (e.g., user touch, user hover, and/or user within proximity, etc.), and the detection of user interaction by the two or more independently operating systems are considered in conjunction with one another (e.g., output compared, considered together, correlated, etc.) to determine user interaction. Again, note that extra electrodes may be implemented throughout the entirety of the TSD or only within a portion of the TSD that is less than all of the TSD. In addition, note that extra electrodes may be implemented within different respective portions of the TSD. Moreover, note that such extra electrodes may be implemented within only one dimension (e.g., as X or Y channels), within 2 dimensions (e.g., in both X and Y channels), Within one portion of the TSD and within another dimension the TSD (e.g., in X channel(s) in one portion and in Y channel(s) in another portion of the TSD) in other examples.

Figure 31B:
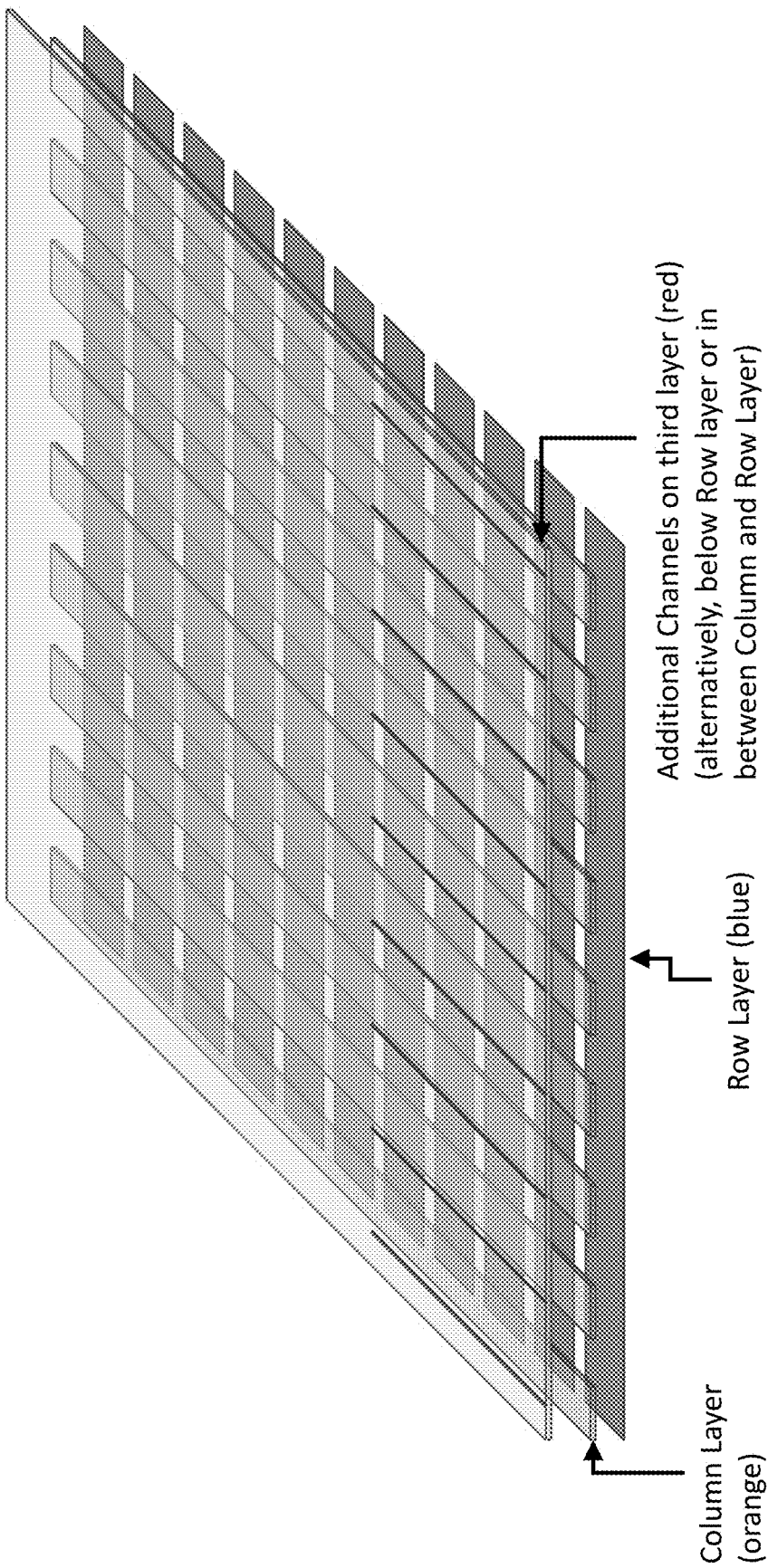
FIG. 31B is a schematic block diagram of another embodiment of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure.

FIG. 31B is a schematic block diagram of another embodiment 3102 of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure. This diagram shows a TSD that includes a first layer that is a column layer (e.g., Y channel conductors) shown in orange, a second layer that is a row layer (e.g., X channel conductors) shown in blue that is a different layer and column layer, and a third layer that is and additional channel layer shown in red and that is different than the row layer and the column layer. In this example, the third layer shown in red is shown as the top layer, the column layer shown in orange is shown as a middle layer, and the row layer shown in blue is shown as a bottom layer. In an alternative example, these additional channels on the third layer shown in red are implemented below the row layer shown in blue. In yet another example, these additional channels on the third layer shown in red are implemented in between the column layer shown in orange and the row layer shown in blue.

Figure 31C:
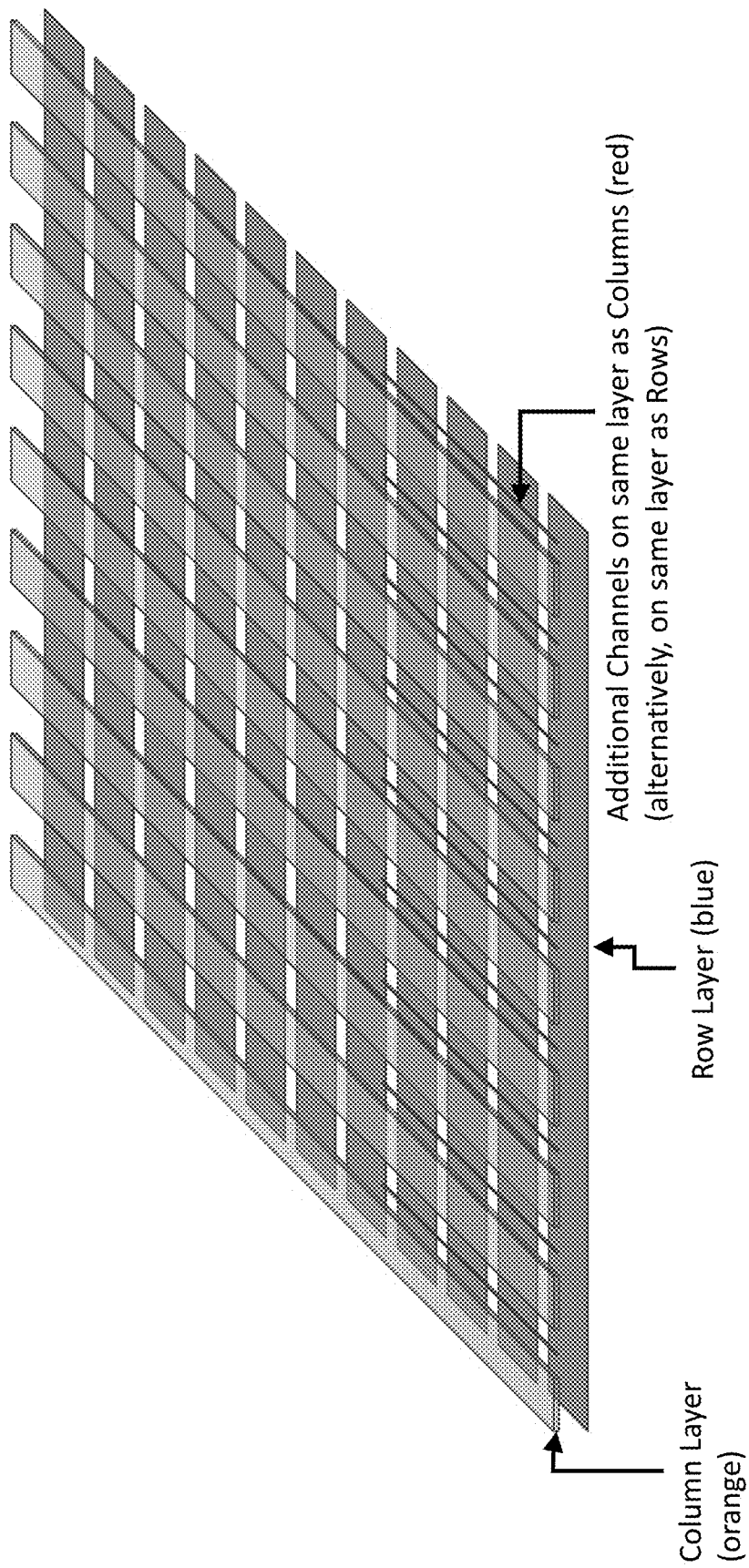
FIG. 31C is a schematic block diagram of another embodiment of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure.

FIG. 31C is a schematic block diagram of another embodiment 3103 of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure. This diagram shows a TSD that includes a first layer that is a column layer (e.g., Y channel conductors) shown in orange, a second layer that is a row layer (e.g., X channel conductors) shown in blue. In this example, additional channels shown in red are implemented within the same layer as the column layer shown in orange. In other examples, additional channels shown in red are implemented within the same layer as the row layer shown in blue.

Figure 31D:
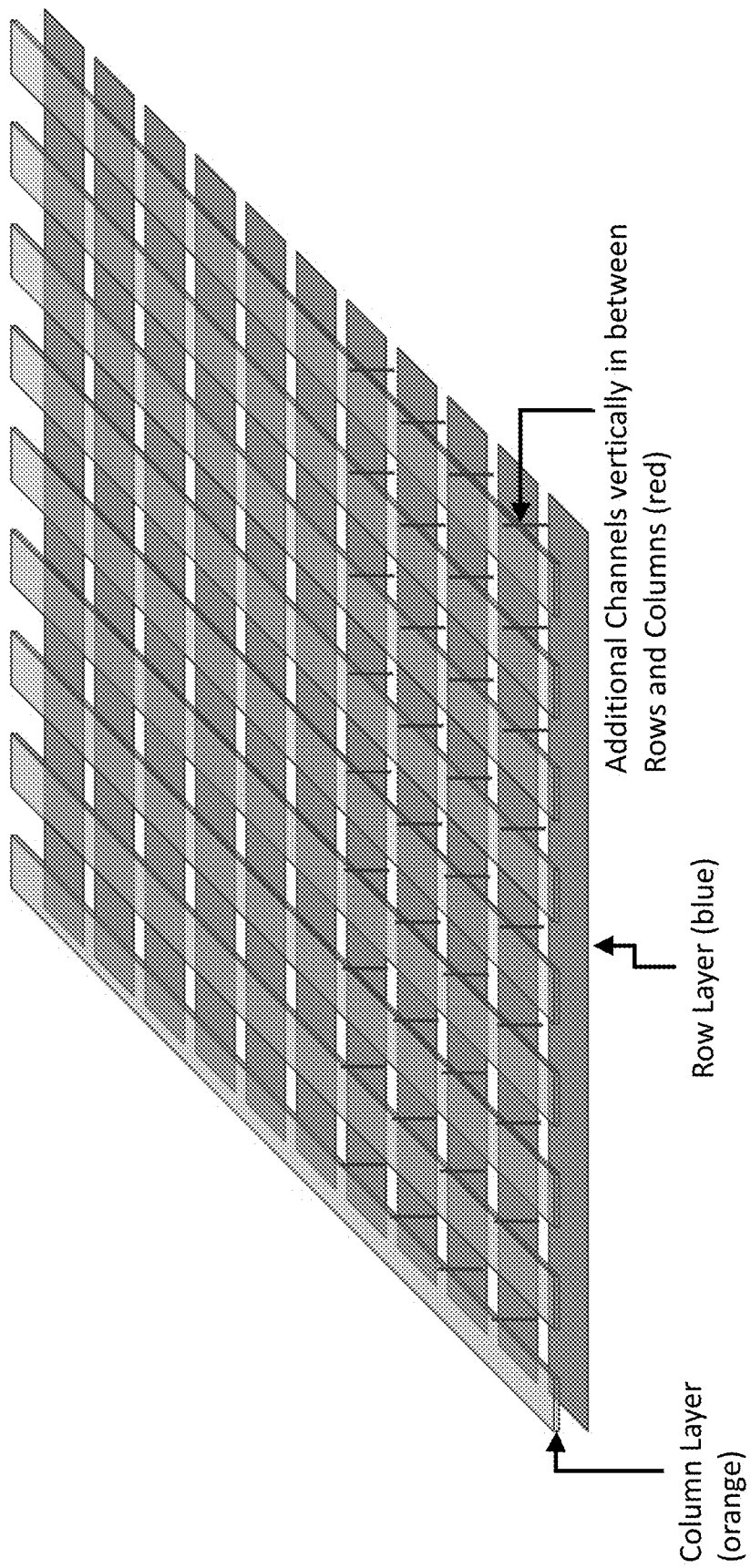
FIG. 31D is a schematic block diagram of another embodiment of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure.

FIG. 31D is a schematic block diagram of another embodiment 3104 of a touch sensor device (TSD), which may or may not include touchscreen display or display functionality, that includes one or more prioritized sensing regions implemented with additional electrodes (e.g., sensors, conductors, conductive traces, etc.) in accordance with the present disclosure. This diagram shows a TSD that includes a first layer that is a column layer (e.g., Y channel conductors) shown in orange, a second layer that is a row layer (e.g., X channel conductors) shown in blue. In this example, additional channels shown in red are implemented vertically in between the conductors within the column layer shown in orange and the row layer shown in blue. For example, these additional conductor shown in red are implemented within gaps between the conductors of the column layer (e.g., Y channel conductors) shown in orange and the conductors of the row layer (e.g., X channel conductors) shown in blue.

FIG. 32A is a schematic block diagram of an embodiment 3201 of a touch sensor device (TSD), which includes touchscreen display or display functionality, that is configured to operate in different modes of operation that includes one or more of self only, mutual only, self and mutual, every other electrode, subsets of electrodes, some electrodes for drive and sense and other electrodes for sense only, some electrodes for drive only and other electrodes for sense only, etc. in accordance with the present disclosure.

FIG. 32B is a schematic block diagram of an embodiment 3202 of a touch sensor device (TSD), which does not include touchscreen display or display functionality, that is configured to operate in different modes of operation that includes one or more of self only, mutual only, self and mutual, every other electrode, subsets of electrodes, some electrodes for drive and sense and other electrodes for sense only, some electrodes for drive only and other electrodes for sense only, etc. in accordance with the present disclosure.

In an example of operation and implementation, a TSD implemented in accordance with FIG. 32A or FIG. 32B is implemented to operate the respective DSCs the service the electrodes of the TSD and one or more different ways. In a particular example of operation and implementation, one or more DSCs that service one or more electrodes of the TSD operate by performing self-only sensing operation. In another example of operation implementation, one or more DSCs that service one or more electrodes of the TSD operate by performing mutual-only sensing operation. In yet another example of operation and implementation, one or more DSCs that service one or more electrodes of the TSD operate by performing both self and mutual sensing operation.

In even another example of operation and implementation, one or more DSCs that service one or more electrodes of the TSD operate by performing sensing operation, whether self, mutual, or a combination of self mutual, such that driving and sensing is performed on some of the electrodes, yet sensing only is performed on other of electrodes.

In an example of operation and implementation, driving and sensing is performed on every other electrode of a set of conductors (e.g., X channel conductors or Y channel conductors), yet sensing only is performed on the remaining electrodes of the set of conductors. Consider 3 conductors that are at adjacently implemented as a set of conductors such as conductor 1, conductor 2, and conductor 3 of set of conductors (e.g., 3 conductors within the X channel conductors or Y channel conductors). Driving and sensing is performed on conductor 1 and conductor 3, yet sensing only is performed on conductor 2.

Consider 5 conductors that are at adjacently implemented as a set of conductors such as conductor 1, conductor 2, conductor 3, conductor 4, and conductor 5 of set of conductors (e.g., 5 conductors within the X channel conductors or Y channel conductors). Driving and sensing is performed on conductor 1, conductor 3, and conductor 5, yet sensing only is performed on conductor 2 and conductor 4.

Alternatively, consider 5 conductors that are at adjacently implemented as a set of conductors such as conductor 1, conductor 2, conductor 3, conductor 4, and conductor 5 of set of conductors (e.g., 5 conductors within the X channel conductors or Y channel conductors). Driving and sensing is performed on conductor 1 and conductor 5, yet sensing only is performed on conductor 2, conductor 3, and conductor 4.

In an alternative example, consider 5 conductors that are at adjacently implemented as a set of conductors such as conductor 1, conductor 2, conductor 3, conductor 4, and conductor 5 of set of conductors (e.g., conductors within the X channel conductors or Y channel conductors). Driving and sensing is performed on conductor 1 and conductor 5, yet sensing only is performed on conductor 3.

In another example of operation and implementation, driving only is performed on every other electrode of a set of conductors (e.g., X channel conductors or Y channel conductors), yet sensing only is performed on the remaining electrodes of the set of conductors. Consider 3 conductors that are adjacently implemented as a set of conductors such as conductor 1, conductor 2, and conductor 3 of set of conductors (e.g., 3 conductors within the X channel conductors or Y channel conductors). Driving only is performed on conductor 1 and conductor 3, yet sensing only is performed on conductor 2.

Consider 5 conductors that are adjacently implemented as a set of conductors such as conductor 1, conductor 2, conductor 3, conductor 4, and conductor 5 of set of conductors (e.g., 5 conductors within the X channel conductors or Y channel conductors). Driving only is performed on conductor 1, conductor 3, and conductor 5, yet sensing only is performed on conductor 2 and conductor 4.

Alternatively, consider 5 conductors that are at adjacently implemented as a set of conductors such as conductor 1, conductor 2, conductor 3, conductor 4, and conductor 5 of set of conductors (e.g., 5 conductors within the X channel conductors or Y channel conductors). Driving only is performed on conductor 1 and conductor 5, yet sensing only is performed on conductor 2, conductor 3, and conductor 4.

In an alternative example, consider 5 conductors that are at adjacently implemented as a set of conductors such as conductor 1, conductor 2, conductor 3, conductor 4, and conductor 5 of set of conductors (e.g., conductors within the X channel conductors or Y channel conductors). Driving only is performed on conductor 1 and conductor 5, yet sensing only is performed on conductor 3.

The operation of the TSD in such manners may be viewed as different types of self and/or mutual sensing. Generally speaking, any number of different combinations of driving and/or sensing of the respective electrodes within the TSD in the performed. Such flexibility and how the respective electrodes of the TSD are operated provide different ways to perform sensing detection of touches/interactions of the user with the TSD. From certain perspectives, the operation of certain electrodes in accordance with drive and sense in the operation of certain other electrodes in accordance with sense only are modifications of mutual sensing as may be performed such that a signal is driven within a first conductor and that signal is coupled to a second conductor, and sensing of that signal is made via the second conductor. In certain examples, mutual detection is performed such that a signal is driven via a row conductor, and when that signal is coupled to a column conductor, sensing of that signal is performed via that column conductor. In accordance with various examples that may operate based on FIG. 32A or FIG. 32B, a modified form of mutual detection is performed such that a signal is driven via a first conductor, and when that signals coupled to a second conductor, sensing of that signals performed via the second conductor. These conductors may be adjacent to one another and aligned in the same direction in certain examples. In other examples, these conductors may have one or more other conductors between them and yet still be aligned in the same direction.

FIG. 33 is a schematic block diagram of an embodiment 3300 of a touch sensor device (TSD), which may or may not include touchscreen display or display functionality, that includes a fully redundant TSD implemented within one or more prioritized sensing regions in accordance with the present disclosure. This diagram shows a TSD that includes one or more areas that are to service one or more functions associated with different priority than one or more other areas of the TSD. For example, the one or more areas having different priority are of higher priority than other areas of the TSD.

For example, within the high priority touch/user interaction function area, the TSD is implemented to operate a fully redundant/second touch sensor/touchscreen. In certain examples, this is achieved by additional/separate rows and columns in same area (e.g., such as in same layers, different layers, etc.). the TSD operates by servicing a fully redundant/second touch sensor/touchscreen from the touch controller(s) allows for a another (redundant) method of detecting touches/interactions in the high priority designated area. The TSD is configured to process outputs from a first touch sensor/touchscreen and a fully redundant/second touch sensor/touchscreen to ensure detection within the high priority touch function area.

In an example, consider a designated area of the TSD of higher priority than others. Within this designated area of higher priority, a fully redundant/second TSD is implemented. That is to say, a first set of conductors operating as a first sensing system is implemented within the entire area shown in the diagram of the TSD (e.g., such as using row conductors/X conductors and column conductors Y conductors), yet a second set of conductors operating as a second sensing system is implemented only within the designated area of higher priority. For example, the second set of conductors operating as the second sensing system may be implemented among or within the same one or more layers as the first set of conductors operating as the first sensing system. In another example, the first set of conductors operating as the first sensing system is implemented within a first one or more layers of the TSD, and the second set of conductors operating as the second sensing system is implemented within a second one or more layers of the TSD. One or more processing modules is configured to process outputs from the first set of conductors operating as the first sensing system and the second set of conductors operating as the second sensing system to improve detection capability within the designated area of higher priority of the TSD.

Servicing a fully redundant second set of conductors within the designated area of high priority provides improved sensing capability of touches/interactions of a user with the TSD within the designated area of high priority. This also allows for confirmation of the detection of touches/interactions of a user with the TSD within the designated area of high priority such that the second set of conductors operating as the second sensing system is configured to confirm or verify the detection of touches/interactions of the user with the TSD based on the first set of conductors operating as the first sensing system.

The TSDs described in the following diagrams, namely, FIGS. 34A, 34B, 34C, and 34D, have similarities with respect to FIGS. 17, 18, 19, and 20, respectively, with at least one difference being that one or more motion detection modules 3410 is implemented to sense one or more movement related parameters associated with the TSD. Examples of one or more motion detection modules 3410 include an accelerometer, a gyroscope, a magnetometer, and/or any other motion detection type device. One or more processing modules 42 within TSDs of these following diagrams is configured to correlate movements of touch/interaction locations on the TSD with one or more movement related parameters associated with the TSD. For example, one more processing modules 42 is configured to perform compensation, as may be needed, to ensure that critical touches/interactions of a user of the TSD are properly detected and interpreted by the TSD. Note that the one or more motion detection modules 3410 is implemented within the TSD or within close proximity to the TSD in certain examples. In other examples, the one or more motion detection modules 3410 is implemented in a different location then the TSD, and remotely located from the TSD, yet is within communication to the one or more processing modules 42 of the TSD. Generally speaking home of the one or more motion detection modules 3410 may be implemented anywhere as desired within an environment, vehicle, device, component, etc. that is associated with the TSD.

In an example of operation and implementation, consider a TSD that is implemented within the vehicle (e.g., an automobile, an airplane, a boat, a spacecraft, etc.). such a TSD may or may not include display functionality (e.g., the TSD may include a touchscreen display or may not include display functionality). A user may be attempting to interact with a TSD within the vehicle as the vehicle is bouncing around. A touch or interaction of the user with the TSD may inadvertently be made in a location unintended by the user. One or more processing modules 42 within the TSD is configured to process one or more movement related parameters associated with the TSD and a touch or interaction of the user with the TSD. Such processing is performed such that the one or more movement related parameters associated with the TSD and the are temporally correlated. Considering example of a vehicle bouncing around as a user is attempting to interact with the TSD of the vehicle, and the location of the touch or interaction of the user with the TSD is also moving around as the vehicle is bouncing around. The one or more processing modules 42 is configured to interpret the touch or interaction of the user with the TSD based on the movement of the vehicle. In an example, consider the vehicle suddenly shifts to the left has a user is attempting to interact with the TSD within the vehicle, and the location of a touch or interaction of the user with the TSD similarly and suddenly shifts to the left, then the one or more processing modules 42 is configured to determine that an intended location of the touch or interaction of the user with the TSD is actually at a location to the right of where the final location of the touch or interaction of the user with the TSD ended up after the sudden shift to the left of the vehicle. As may be understood, various types of vehicles may undergo unexpected movement. An automobile may sometimes unexpectedly hit potholes that may not have been seen by a driver of the automobile. An aircraft may sometimes unexpectedly experience turbulence. A boat may sometimes unexpectedly experience choppy water. The spacecraft may sometimes unexpectedly experience turbulence while exiting or entering the Earth's atmosphere.

In the following diagrams, FIGS. 34A, 34B, 34C, and 34D, one or more motion detectors 3410 is configured to provide input to one or more processing modules 42 that are implemented to perform function and operation differently than the previous diagram in accordance with FIG. 18. In addition, the one or more processing modules 42 is configured to perform any compensation, as may be needed, to ensure that critical touches/interactions of user with the TSD are properly detected and interpreted even in situations where the TSD is experiencing movement including unexpected movement. Note that the TSD main implemented within any desired application and/or environment including within vehicles of various types.

FIG. 34A is a schematic block diagram of another embodiment 3401 of a touch sensor device (TSD) that is similar to FIG. 15 and FIG. 17 with the option of using any desired electrode pattern and that also includes one or more motion detection modules 3410 in accordance with the present disclosure.

FIG. 34B is a schematic block diagram of another embodiment 3402 of a touch sensor device (TSD) that is similar to FIG. 18 and that also includes one or more motion detection modules 3410 in accordance with the present disclosure.

FIG. 34C is a schematic block diagram of an embodiment 3403 of a touch sensor device (TSD) that is similar to FIG. 19 and that also includes one or more motion detection modules 3410 in accordance with the present disclosure.

FIG. 34D is a schematic block diagram of another embodiment 3404 of a touch sensor device (TSD) that is similar to FIG. 20 and that also includes one or more motion detection modules 3410 in accordance with the present disclosure.

FIG. 35A is a schematic block diagram of an embodiment 3501 of computing devices within a system operative to facilitate coupling of one or more signals from a first computing device via a user to a second computing device in accordance with the present invention.

In the following diagrams, FIGS. 35A and 35B, a signal that is relatively larger than other signals within system are used to provide another mechanism to ensure a high degree of confidence for a touch/user interaction with a TSD (e.g., such as may be implemented within a computing device). For example, a signal is coupled through a user and into the TSD, and this signal is of a higher magnitude than other signals in the system. In certain diagrams, note that the signal is coupled from another device into and through a user and into the TSD. This coupling of the signal into and through a user and into the TSD may be implemented in a variety of ways. For example, the signal may be coupled into and through a user from a display of a computing device. Alternatively, the signal may be coupled into and through a user from another component of a computing device other than from a display (e.g., a button, and antenna, a metal contact, etc.).

For example, consider that signaling within such a TSD is of the first level, then this signal is coupled through the user and into the TSD is on the second level that is of higher than the first level. In an example of operation and implementation, consider a TSD that operates using voltage signals in the approximately 100s of mV range (e.g., voltage signal levels in the range between 0 V and 300 mV), then this signal that is coupled through the user and into the TSD is significantly larger than those signals. For example, the signal that is coupled through the user and into the TSD is approximately 1 V, or approximately 3.33 times the magnitude of the typically largest voltage signals operating within the TSD. In another example of operation and implementation, consider a TSD it operates using current signals in the approximately 10s of mA range (e.g., current signal levels in the range between 0 A and 50 mA), then this signal is coupled through the user and into the TSD is a complete larger than those signals.

For example, consider that the signal that is coupled through the user and into the TSD is approximately 200 mA, or approximately 4 times the magnitude of the typically largest current signals operating within the TSD. Generally speaking, a signal that is coupled through the user and into the TSD is of the magnitude that is larger than those other signals typically used in accordance with operation of the TSD. This provides a significant improvement in confirming touches/interactions of the user with the TSD. This signal that is coupled through the user and into the TSD may be viewed as a boosted signal in comparison to other signals within the TSD. In certain examples, such a boosted signal also provides identification of the user who is touching/interacting with the TSD.

Generally speaking, such a boosted signal is larger than the typical signals that are used in accordance with operation of the TSD. In various examples, the boosted signal includes a magnitude that is 1.5 times, 2 times, 5 times, 10 times, or some other multiple X times the magnitude of the typical signals that are used in accordance with operation of the TSD, where X is some number greater than 1.

FIG. 35A is a schematic block diagram of an embodiment 3501 of computing devices within a system operative to facilitate coupling of one or more signals from a first computing device via a user to a second computing device in accordance with the present invention. In an example of operation and implementation, these one or more signals are coupled from the first computing device via the user to a second device are boosted signals. As described above, these boosted signals are larger than those signals typically used in accordance with operation of the computing devices (e.g., the second computing device). These larger signals that are coupled through the user to the second computing device provide for higher confidence of touches/interactions of the user with the computing devices. For example, the second computing device is configured to detect these one or more boosted signals to provide for improved confidence in the detection of touches/interactions of the user with the second computing device. Note that such signals may be coupled into the user from any of a number of means. For example, a boosted signal is coupled into user who is in contact with or within sufficient proximity of image that is being displayed on a display of the first computing device.

Alternatively, a boosted signals coupled into a user who is in contact with or within sufficient proximity to the first computing device. In some examples, a button of the first computing device is the mechanism by which the boosted signal is coupled from the first computing device into the user. For example, when the user is in contact with or within sufficient proximity to the button of the first computing device, a boosted signal that is generated by the first computing device is coupled via the button into the user. Alternatively, a boosted signal that is generated by the first computing device is coupled into the user based on the user being in contact with or within sufficient proximity to any portion of the first computing device. For example, consider the user is holding the first computing device in his or her hand, then the user being in contact with or within sufficient proximity to the computing device facilitates the coupling of the boosted signal from the first computing device into the user. In an example, a boosted signal that is generated by the first computing device and is coupled into the user is of a specific frequency. The second computing device is configured to detect the boosted signal having that particular frequency and that is also larger than other signals typically employed within the second computing device. The use of a boosted signal not only provides information to confirm a touch/interaction of the user with the computing devices, but also provides an additional mechanism to confirm the touch/interaction of the user with the computing devices. This can be very beneficial when one or more of the computing devices are within a noisy environment. Note that the use of such a boosted signal is employed independently of using such a signal is coupled through user and into the second computing device for identification of the user and/or the first computing device. The use of such a boosted signal provides improvements and a higher degree of confidence in the detection of a touch/interaction of the user with the computing devices.

This boosted signal then couples through the user and into the second computing device. The second computing device is configured to detect this boosted signal. the boosted signal, being larger than other signals typically employed within the second computing device, provides for improved confidence in detecting touches/interactions of the user with the computing devices. For example, not only does the second computing device detect a touch/interaction of the user with the second computing device, but detection of the boosted signal provides greater confidence that the touch/interaction of the user with the second computing device is a valid touch/interaction of the user with the second computing device.

In this diagram, FIG. 35A, a user is operative to interact with different respective computing devices. The user interacts with computing device 3520 and also computing device 3524 that includes a touchscreen display with sensors 80. Note that an alternative implementation includes computing device 3524a that includes a touch sensor device (TSD) that does not have display functionality (e.g., not include a touchscreen display). The computing device 3520 may be any of a variety of types including any one or more of a portable device, cell phone, smartphone, tablet, etc. In certain examples, the computing device 3520 is a device capable to be transported with the user as the user moves and changes location. However, note that in other examples, the computing device 3520 is a stationary device having a fixed location and not being a portable device per se, such as a desktop computer, a television, a set-top box, etc. such as a device that substantially remains in a given location.

As the user interacts with the computing device 3524, such as touching the touchscreen display with sensors 80 with a finger, hand, a stylus, e-pen, and/or another appropriate device to interact therewith, etc., or is within sufficiently close proximity to facilitate coupling from the user to the computing device 3524 and TSD with sensors 80 thereof, the computing device 3524 is operative to receive input from the user.

In an example of operation and implementation, the computing device 3520 includes a display 3522 that is operative to display one or more images thereon. The user interacts with the one or more images that are generated on the display 3522, and based on such interaction, one or more signals (e.g., including one or more boosted signals) associated with one or more images are coupled through the user from the computing device 3520 to the computing device 3524. As described herein, when a display such as within computing device 3520 is operative to produce one or more images thereon, the hardware components of the computing device 3520 generate various signals to effectuate the rendering of the one or more images on the display 3522 of the computing device 3520. For example, in accordance with operation of the display 3522 to render the one or more images thereon, the actual hard work components of the display 3522 themselves (e.g., such as the gate lines, the data lines, the sub-pixel electrodes, etc.) include signal generation circuitry that is configured to generate the one or more signals to be coupled into the user's body. These signals are coupled via the user's body from the computing device 3520 to the computing device 3524. The touchscreen display with sensors 80 of the computing device 3520 is configured to detect the one or more signals that are coupled via the user from the computing device 3520.

In certain samples, the computing device 3524 is implemented to include a number of electrodes 85 of the touchscreen display with sensors 80 such that each respective electrode 85 is connected to or communicatively coupled to a respective drive-sense circuit (DSC) 28. For example, a first electrode 85 is connected to or communicatively coupled to a first DSC 28, a second electrode 85 is connected to or communicatively coupled to a second DSC 28, etc.

In this diagram as well as others here and, one or more processing modules 42 is configured to communicate with and interact with the DSC 28. This diagram particularly shows the one or more processing modules 42 implemented to communicate with and interact with a first DSC 28 and up to an nth DSC 28, where n is a positive integer greater than or equal to 2, that are respectively connected to and/or coupled to electrodes 85.

Note that the communication and interaction between the one or more processing modules 42 and any given one of the DSCs 28 may be implemented in via any desired number of communication pathways (e.g., generally n communication pathways, where n is a positive integer greater than or equal to one). The one or more processing modules 42 is coupled to at least one DSC 28 (e.g., a first DSC 28 associated with a first electrode 85 and a second DSC 28 associated with a second electrode 85). Note that the one or more processing modules 42 may include integrated memory and/or be coupled to other memory. At least some of the memory stores operational instructions to be executed by the one or more processing modules 42. In addition, note that the one or more processing modules 42 may interface with one or more other devices, components, elements, etc. via one or more communication links, networks, communication pathways, channels, etc. (e.g., such as via one or more communication interfaces of the computing device 3520, such as may be integrated into the one or more processing modules 42 or be implemented as a separate component, circuitry, etc.).

Considering one of the DSCs 28, the DSC 28 is configured to provide a signal to an electrode 85. Note that the DSC 28 is configured to provide the signal to the electrode and also simultaneously to sense the signal that is provided to the electrode including detecting any change of the signal. For example, a DSC 28 is configured to provide a signal to the electrode 85 to which it is connected or coupled and simultaneously sense that signal including any change thereof. For example, the DSC 28 is configured to sense a signal that is capacitively coupled between the electrodes 85 including any change of the signal. In some examples, the DSC 28 is also configured to sense a signal that is capacitively coupled into an electrode 85 after having been coupled via the user from the computing device 3520.

Generally speaking, a DSC 28 is configured to provide a signal having any of a variety of characteristics such as a signal that includes only a DC component, a signal that includes only an AC component, or a signal that includes both a DC and AC component.

In addition, in some examples, the one or more processing modules 42 is configured to provide a reference signal to the DSC 28, facilitate communication with the DSC 28, perform interfacing and control of the operation of one or more components of the DSC 28, receive digital information from the DSC 28 that may be used for a variety of purposes detecting, identifying, processing, etc. one or more signals that have been coupled from the computing device 3520 via the user to the computing device 3524 and also to interpret those one or more signals. Note that these one or more signals may be used to convey any of a variety of types of information from the computing device 3520 via the user to the computing device 3524.

Examples of some types of information that may be conveyed within these one or more signals may include any one or more of user identification information related to the user, name of the user, etc., financial related information such as payment information, credit card information, banking information, etc., shipping information such as a personal address, a business address, etc. to which one or more selected or purchase products are to be shipped, etc., and/or contact information associated with the user such as phone number, e-mail address, physical address, business card information, a web link such as a Universal Resource Location (URL), etc. Generally speaking, such one or more signals may be generated and produced to include any desired information to be conveyed from the computing device 3520 to the computing device 3524 via the user.

Other examples of other types of information that may be conveyed within these one or more signals may include any one or more of information from the computing device 3520 that is desired to be displayed on the display of the computing device 3524. For example, consider the computing device 3520 as including information therein that the user would like to display it on another screen, such as the display of the computing device 3524. Examples of such information may include personal health monitoring information, such as may be collected and provided by a smart device such as a smart watch, which monitors any one or more characteristics of the user. Examples of such characteristics may include any one or more of heart rate, EKG patterns, number of steps during a given period of time, the number of hours of sleep within a given period of time, etc. The user of such a smart device may desire to have information collected by that smart device to be displayed on another screen, such as the display of the computing device 3524.

Even other examples of types of information may be conveyed within these one or more signals may include instructional information. For example, the information provided from the computing device 3520 to the computing device 3524 may include instructional information from the computing device 3520 that is operative to instruct the computing device 3524 to perform some operation. For example, the instruction may include the direction for the computing device 3524 to retrieve information from a database, server, via one or more networks 26, such as the Internet, etc. The instruction may alternatively include the direction for the computing device 3524 two locate a particular file, perform a particular action, etc.

In some examples, such instructional information may be conveyed as tokenized information. For example, the data that is transferred from the computing device 3520 to the computing device 3524 may include a token that, when interpreted based on a tokenized communication protocol understood and used by both the computing device 3520 in the computing device 3524, instructs the computing device 3524 to perform a particular operation. This may include instructing the computing device 3524 to retrieve certain information from a database, server, via one or more networks 26, such as the Internet, etc. Alternatively, this may include instructing the computing device 3524 to go to and/or retrieve information from a particular website link, such as a web link such as a Universal Resource Location (URL), etc.

For example, the information that is conveyed within these one or more signals that are communicated from the computing device 3520 via the user to the computing device 3524 may include information that is be based on some particular communication protocol such that the information, upon being interpreted and recovered by the computing device 3524, instructs the computing device 3524 to perform some operation (e.g., locating a file, performing some action, accessing a database, displaying a particular image or particular information on its display, etc.).

Even other examples of information that is conveyed within these one or more signals that are communicated from computing device 3520 via the user to the computing device 3524 may correspond to one or more gestures that are performed by a user that is interacting with a touchscreen of the computing device 3520. For example, a particular pattern, sequence of movements, such as a signature, such as spreading two digits apart as they are in contact with the touchscreen or closing the distance between two digits as they are in contact with the touchscreen, etc. may be used to instruct the computing device 3520 include particular information within one or more signals that are coupled from the computing device 3520 via the user to the computing device 3524.

For example, consider a user having to digits in contact with an image that is displayed on the display of the computing device 3520 and spreading two digits apart has to scale or increase the size of the image being displayed on the display of the computing device 3520. Such a gesture by the user instructs the computing device 3520 to generate information that includes instruction for the computing device 3524 to scale or increase the size of the same image or another image that is being displayed on the display of the computing device 3524, and the computing device 3520 then generates one or more signals that includes such instruction and are then coupled from the computing device 3520 via the user to the computing device 3524. Similarly, a different gesture, such as a user closing the distance between two digits as they are in contact with a portion of the touchscreen that is displaying an image, made results in the computing device 3520 to generate information that includes instruction for the computing device 3524 to scale or decrease the size of the same image or another image that is being displayed on the display of the computing device 3524. In general, any desired mapping of gestures to instructions, information, etc. may be made within the computing device 3520.

With respect to the signals that are generated by the computing device 3520 accordance with displaying one or more images on the display 3522 of the computing device 3520, note that such signals may be of any of a variety of types. Various examples are described below regarding different respective images being used to produce different respective signals, based on displaying images on the display 3522 of the computing device 3520 having certain characteristics. In accordance with generating such signals by displaying images on the display 3522 of the computing device 3520, the computing device 3520 is configured to produce and transmit one or more signals having any of a number of desired properties via the user to the computing device 3524.

In addition, note that such signals may be implemented to include any desired characteristics, properties, parameters, etc. For example, a signal generated by the display of an image 3521 on the display 3522 of the computing device 3520 may be based on encoding of one or more bits to generate one or more coded bits used to generate modulation data (or generally, data). For example, one or more processing modules is included within or associated with computing device 3520. Note that the one or more processing modules implemented within or associated with the computing device 3520 may include integrated memory and/or be coupled to other memory. At least some of the memory stores operational instructions to be executed by the one or more processing modules. In addition, note that the one or more processing modules 42 may interface with one or more other devices, components, elements, etc. via one or more communication links, networks, communication pathways, channels, etc. (e.g., such as via one or more communication interfaces of the computing device 3520, such as may be integrated into the one or more processing modules 42 or be implemented as a separate component, circuitry, etc.).

These one or more processing modules included within or associated with computing device 3520 is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or EEC code may be used in any of various implementations including concatenation (e.g., first ECC and/or EEC code followed by second ECC and/or EEC code, etc. such as based on an inner code/outer code architecture, etc.), parallel architecture (e.g., such that first ECC and/or EEC code operates on first bits while second ECC and/or FEC code operates on second bits, etc.), and/or any combination thereof.

Also, these one or more processing modules included within or associated with computing device 3520 is configured to process the one or more coded bits in accordance with modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In certain examples, the display 3522 of the computing device 3520 includes a display alone. In other examples, the display 3522 of the computing device 3520 includes a display with touchscreen display capability, but is not particularly implemented in accordance with electrodes 85 that are respectively serviced by a number of respective DSCs 28.

However, in even other examples, the display 3522 of the computing device 3520 includes a display with touchscreen display with sensors 80 capability that is implemented in accordance with electrodes 85 that are respectively serviced by a number of respective DSCs 28 as described herein. For example, the display 3522 of the computing device 3520 includes a touchscreen display with sensors 80. For example, similar to the implementation shown with respect to computing device 3524, a number of electrodes 85 of a touchscreen display with sensors 80 may be implemented within the computing device 3520 such that a number of respective DSCs 28 are implemented to service the respective electrodes 85 of such a touching display with sensors 80 that are implemented within the computing device 3520 and also: communicate with and cooperate with one or more processing modules 42 that may include memory and/or be coupled to memory, in a similar fashion by which such components are implemented and operated within the computing device 3524.

In accordance with implementation that is based on a display with touchscreen display with sensors capability that is implemented in accordance with electrodes 85 that are respectively serviced by a number of respective DSCs 28 as described herein, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC 28, note that any additional signal that is coupled into an electrode 85 associated with that DSC 28 is also detectable. For example, a DSC 28 that is associated with such electrode is configured to detect any signal from one or more other sources that may include any one or more of electrodes, touch sensors, buses, communication links, loads, electrical couplings or connections, etc. that get coupled into that line, electrode, touch sensor, bus, communication link, a battery, load, electrical coupling or connection, etc.

In addition, note the different respective signals that are driven and simultaneously sensed by one or more DSCs 28 may be differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

In an example of operation and implementation, an application, an "app," is opened by the user on the computing device 3520 based on the user appropriately interacting with the computing device 3520 (e.g., pressing a button of the computing device 3520, such as a hard button on a side of the computing device 3520, by pressing an icon that is associated with the application that is displayed on the display 3522 of the computing device 3520, etc.), and the initiation of the operation of such an application produces an image 3521 on a display 3522 of the computing device 3520. As the image 3521 is generated and displayed on the display 3522 of the computing device 3520, one or more signals are generated by the image 3521 on the display 3522 of the computing device 3520 and are coupled into the user's body as the user is touching the image 3521 on the display 3522 of the computing device 3520 or is within sufficient proximity to facilitate coupling of signals associated with the image 3521 into the user's body. These signal(s) are coupled into user's body. This may be performed via finger, hand, stylus, e-pen, etc. being in contact with (or sufficiently close to) the image 3521 on the display 3522 of the computing device 3520.

Then, based on operation of the application, one or more signals associated with the image 3521 are coupled into the user's body, through the user's body, and are coupled into one or more of the electrodes 85 of the touchscreen display with sensors 80 of the computing device 3524. One or more DSCs 28 of the computing device 3524 is configured to detect the one or more signals associated with the image 3521 that have been generated within the computing device 3520 and coupled via the user's body to the into one or more of the electrodes 85 of the touchscreen display with sensors 80 of the computing device 3524. These signal(s) are coupled from the user's body to electrode(s) 85 of the touchscreen display with sensors 80. This may be performed via finger, hand, stylus, e-pen, etc. being in contact with (or sufficiently close to) electrode(s) 85.

In accordance with operation of a DSC 28 within the computing device 3524, a reference signal is used to facilitate operation of the DSC 28 as described herein. Note that such a reference signal that provided from the one or more processing modules 42 to a DSC 28 in this diagram as well as any other diagram herein may have any desired form. For example, the reference signal may be selected to have any desired magnitude, frequency, phase, etc. among other various signal characteristics. In addition, the reference signal may have any desired waveform. For example, many examples described herein are directed towards a reference signal having a DC component and/or an AC component. Note that the AC component may have any desired waveform shape including sinusoid, sawtooth wave, triangular wave, square wave signal, etc. among the various desired waveform shapes. In addition, note that DC component may be positive or negative. Moreover, note that some examples operate having no DC component (e.g., a DC component having a value of zero/0). In addition, note that more the AC component may include more than one component corresponding to more than one frequency. For example, the AC component may include a first AC component having a first frequency and a second AC component having a second frequency. Generally speaking, the AC component may include any number of AC components having any number of respective frequencies.

Based on coupling of the one or more signals associated with the image 3521, via the user's body, and into one or more of the electrodes 85 of the touchscreen display with sensors 80 of the computing device 3524 will be affected by those one or more signals. The one or more DSCs 28 that is configured to interact with and service the one or more electrodes 85 of the touchscreen display with sensors 80 of the computing device 3524 into which the one or more signals associated with the image 3521 are coupled is also configured to detect those one or more signals associated with the image 3521 such as based on any change of signals that are driven to the one or more electrodes 85 of the touchscreen display with sensors 80 of the computing device 3524 and simultaneously sensed by the one or more DSCs 28 within the computing device 3524.

From certain perspectives, this diagram provides an illustration of the communication system that facilitates communication from the computing device 3520 to the computing device 3524, and vice versa if desired, using the user as the communication channel, the communication medium, etc. In addition, note that communication may be made between the computing device 3520 and the computing device 3524 via alternative means as also described herein including via one or more communication systems, communication networks, etc. with which the computing device 3520 and the computing device 3524 are configured to interact with and communicate (e.g., a cellular telephone system, a wireless communication system, satellite communication system, a wireless local area network (WLAN), a wired communication system, a local area network (LAN), a cable based communication system, fiber-optic communication system, etc.).

In an example of operation and implementation, the computing device 3520 includes signal generation circuitry. When enabled, the signal generation circuitry operably coupled and configured to generate a signal that includes information corresponding to a user and/or an application that is operative within the computing device. Also, the signal generation circuitry operably coupled and configured to couple the signal into the user from a location on the computing device based on a bodily portion of the user being in contact with or within sufficient proximity to the location on the computing device that facilitates coupling of the signal into the user. Also, note that the signal is coupled via the user to computing device 3524 that includes a touchscreen display that is operative to detect and receive the signal based on another bodily portion of the user being in contact with or within sufficient proximity to the touchscreen display of the other computing device that facilitates coupling of the signal from the user.

In some examples, the computing device includes a display and/or a touchscreen display that is operative as the signal generation circuitry. For example, the computing device 3520 includes a display that includes certain hardware components. Examples of such hardware components may include a plurality of pixel electrodes coupled via a plurality of lines (e.g., gate lines, data lines, etc.) to one or more processing modules. When enabled, the display is operably coupled and configured to display an image within at least a portion of the display based on image data associated with operation of the application that is operative within the computing device. In such an implementation, the signal generation circuitry includes at least some of the plurality of pixel electrodes and at least some of the plurality of lines of the display that are operative to facilitate display the image within the at least a portion of the display.

Also, in certain examples, the computing device includes memory that stores operational instructions and one or more processing modules that is operably coupled to the display and the memory. Wherein, when enabled, the one or more processing modules is configured to execute the operational instructions to generate the image data based on operation of the application within the computing device that is initiated based on input from the user to the computing device. The one or more processing modules is also configured to execute the operational instructions to provide the image data to the display via a display interface to be used by the display to render image within the at least a portion of the display.

In some examples, the display includes a resolution that specifies a number of pixel rows and is operative based on a frame refresh rate (FRR). A gate scanning frequency of the display is a product resulting from the number of pixel rows multiplied by the FRR, and a frequency of the signal is a sub-multiple of a gate scanning frequency that is the gate scanning frequency divided by a positive integer that is greater than or equal to 2.

In even other examples, the frequency of the signal is a sub-multiple of the gate scanning frequency that is one-half of the gate scanning frequency multiple by a fraction N/M, where N is a first positive integer that is greater than or equal to 2, and M is a second positive integer that is greater than or equal to 2 and also greater than N.

Examples of the location on the computing device may include any one or more of at least a portion of a display of the computing device, a touchscreen display of the computing device, a button of the computing device, a frame of the computing device, and/or a ground plane of the computing device.

Also, examples of the information corresponding to the user and/or the application that is operative within the computing device may include any one or more of user identification information related to the user, financial related information associated with the user, shipping information associated with the user, and/or contact information associated with the user.

Moreover, in certain specific examples, the user identification information related to the user includes any one or more of a name of the user, a username of the user, a phone number of the user, an e-mail address of the user, a personal address of the user, a business address of the user, and/or business card information of the user. Also, the financial related information associated with the user includes any one or more of payment information of the user, credit card information of the user, or banking information of the user. The shipping information associated with the user includes any one or more of a personal address of the user and/or a business address of the user. Also, the contact information associated with the user includes any one or more of a phone number of the user, an e-mail address of the user, a personal address of the user, a business address of the user, and/or business card information of the user.

In some particular examples, the touchscreen display of the other computing device includes a plurality of sensors and a plurality of drive-sense circuits (DSCs), wherein, when enabled, a DSC of the plurality of DSCs is operably coupled and configured to provide a sensor signal via a single line to a sensor of the plurality of sensors and simultaneously to sense the sensor signal via the single line. Note that the sensing of the sensor signal includes detection of an electrical characteristic of the sensor signal that includes coupling of the signal from the user into the sensor of the plurality of sensors. Also, the DSC of the plurality of DSCs is operably coupled and configured to generate a digital signal representative of the electrical characteristic of the sensor signal.

In some implementations of the DSC, the DSC includes a power source circuit operably coupled and configured to the sensor of the plurality of sensors. When enabled, the power source circuit is operably coupled and configured to provide the sensor signal via the single line to the sensor of the plurality of sensors. Also, the sensor signal includes a DC (direct current) component and/or an oscillating component. The DSC also includes a power source change detection circuit that is operably coupled and configured to the power source circuit. When enabled, the power source change detection circuit is configured to detect an effect on the sensor signal that is based on the coupling of the signal from the user into sensor of the plurality of sensors.

In some specific examples of the DSC, the power source circuit includes a power source to source a voltage and/or a current to the sensor of the plurality of sensors via the single line. Also, the power source change detection circuit included a power source reference circuit configured to provide a voltage reference and/or a current reference. The DSC also includes a comparator configured to compare the voltage and/or the current provided to the sensor of the plurality of sensors to the voltage reference and/or the current reference, appropriately such as voltage to voltage reference and current to current reference, to produce the sensor signal.

In an example of operation and implementation, the computing device 3520 includes a touchscreen display that includes a plurality of sensors and a plurality of drive-sense circuits (DSCs). When enabled, a DSC of the plurality of DSCs is operably coupled and configured to provide a first signal via a single line to a sensor of the plurality of sensors and simultaneously to sense the first signal via the single line, wherein sensing of the first signal includes detection of an electrical characteristic of the first signal. The DSC also is operably coupled and configured to generate a digital signal representative of the electrical characteristic of the first signal.

The computing device 3520 also includes signal generation circuitry. When enabled, the signal generation circuitry is operably coupled and configured to generate a second signal that includes information corresponding to a user and/or an application that is operative within the computing device 3520. The signal generation circuitry is operably coupled and configured to couple the second signal into the user from a location on the computing device 3520 based on a bodily portion of the user being in contact with or within sufficient proximity to the location on the computing device 3520 that facilitates coupling of the second signal into the user, wherein the second signal is coupled via the user to another computing device 3524 that includes another that is operative to detect and receive the second signal based on another bodily portion of the user being in contact with or within sufficient proximity to the touchscreen display of the another computing device 3524 that facilitates coupling of the second signal from the user.

FIG. 35B is a schematic block diagram of another embodiment 3502 of computing devices within a system operative to facilitate coupling of one or more signals from a first computing device via a user to a second computing device in accordance with the present invention. This diagram has similarities to the previous diagram with at least one difference being that the computing device 3520 includes one or more buttons implemented thereon. For example, the computing device 3520 includes a button 3523 that is configured to produce an couple one or more signals (e.g., including one or more boosted signals) into the user's body. In some examples, the button 3523 includes a hard button on the computing device 3520 (e.g., such as having similar shape, style, etc., such as a power on or off button, a volume up or down button, a display intensity increase or decrease button, a dimmer button, and/or any other button of the computing device 3520, etc.).

As the user interacts with the button 3523 of the computing device 3520 (e.g., by touching the button 3523 of the computing device 3520 with a finger, a thumb, a hand, a stylus, an e-pen, etc. or alternatively being within sufficiently close proximity to the button 3523 of the computing device 3520 as to facilitate coupling from the button 3523 of the computing device 3520 into the body of the user), one or more signals is coupled into the body of the user. These signal(s) are coupled into user's body. This may be performed via finger, hand, stylus, e-pen, etc. being in contact with (or sufficiently close to) the button 3523 of the computing device 3520.

In an example of operation and implementation, an application, an "app," is opened by the user on the computing device 3520 based on the user appropriately interacting with the computing device 3520 (e.g., pressing the button 3523 of the computing device 3520, by pressing an icon that is associated with the application that is displayed on the display 3522 of the computing device 3520, etc.), and the initiation of the operation of such an application operates to produce one or more signals that is coupled via the button 3523 of the computing device 3520 into the body of the user.

In certain examples, one or more signal generators, signal generation circuitry, and/or one or more processing modules implemented is connected to or communicatively coupled to the button 3523 and is operative to generate one or more signals to be coupled from a first computing device via a user to a second computing device. For example, a signal generator may be coupled to the button 3523, a signal generator may be implemented in computing device 3520 near button 3523. Alternatively, a signal generator may be implemented any other location on device 3520 (e.g., frame, ground plane, etc.) For example, based on operation of the application, the one or more signal generators and/or one or more processing modules is configured to generate one or more signals that are coupled to the button 3523, and when a user is in contact with the button 3523 or within sufficient proximity to the button 3523 so as to facilitate coupling of those signals from the computing device that includes button 3523 to the user, then one or more signals that are associated with the button 3523 are be coupled from the computing device that includes the button 3523 via the user to another computing device.

Then, based on operation of the application, one or more signals (e.g., including one or more boosted signals) are coupled into the user's body via the button 3523, through the user's body, and are coupled into one or more of the electrodes 85 of the touchscreen display with sensors 80 of the computing device 3524. Note that an alternative implementation includes computing device 3524a that includes a touch sensor device (TSD) that does not have display functionality (e.g., not include a touchscreen display). One or more DSCs 28 of the computing device 3524 is configured to detect the one or more signals (e.g., including one or more boosted signals) that have been generated within the computing device 3520 and coupled via the user's body to the into one or more of the electrodes 85 of the touchscreen display with sensors 80 of the computing device 3524. These signal(s) are coupled from the user's body to electrode(s) 85 of the touchscreen display with sensors 80. This may be performed via finger, hand, stylus, e-pen, etc. being in contact with (or sufficiently close to) to electrode(s) 85.

In addition, while the use of a button 3523 is used in certain examples herein, note that any desired element or component of the computing device 3520 may alternatively be the means via which one or more signals is coupled into the user. For example, one or more signals that may be generated by any one or more signal generators, signal generation circuitry, etc. such as one or more processing modules 42, a controller, an integrated circuit, an oscillator, etc. may be coupled into the user using any desired component of the computing device 3520 that may be located at any desired location on the computing device 3520 such as a button of the device, the frame of the device, a ground plane of the device, and/or some other location on the computing device 3520, etc.

In several the following diagrams, signals are respectively associated with users. For example, a first signal is coupled from the first user into a TSD. In another example, a first signal is coupled from a first user into the TSD, and a second signal is coupled from a second user into the TSD. A signal is coupled into the user using any desired means. For example, a signal generator within a computing device is configured to couple a signal into the user, and that signal is coupled through the user into the TSD. In another example, the user being in contact with or within sufficient proximity to the computing device facilitates the coupling of the signal into the user, and that signal is coupled through the user into the TSD. Using different signals for different respective users facilitates identification of which user is interacting with the TSD. Note that the first signal and the second signal may be differentiated in one or more ways. For example, the first signal includes a first frequency, and the second signal includes a second frequency. For another example, the first signal includes a first amplitude, and the second signal includes a second amplitude. Other means of differentiating signal are also described herein (e.g., frequency, amplitude, encoding, etc.). Generally speaking, any one or more desired means may be used to provide differentiation between the first signal and the second signal to facilitate identification of a first user who is associated with the first signal and a second user who is associated with the second signal.

In several the diagrams described below, light blue is associated with a first signal that is associated with the first user, and purple is associated with the second signal that is associated with the second user. A TSD is configured to detect user interaction with the TSD (e.g., touch, contact, and/or a user being within sufficient proximity to the TSD). In addition, based on detection of the first signal and/or the second signal, the TSD is configured to detect which user is interacting with the TSD. In some examples, only one of the users interacts with the TSD. In other examples, both of the users interact with the TSD.

The TSD is configured to detect the location of user interaction based on identifying the row and column corresponding to the user interaction. For example, based on the first signal that is associated with the first user being coupled into a particular row electrode and a particular poem electrode, the TSD is configured to determine the location of the first user interacting with the TSD.

FIG. 36A is a schematic block diagram of an embodiment 3601 of a touch sensor device (TSD), which may or may not include touchscreen display or display functionality, that is configured to distinguish separate user interaction from at least two users in accordance with the present invention. In this diagram, a first signal is associated with the first user (User 1). Based on the first user interacting with the TSD, such as touching the TSD or being within sufficient proximity to the TSD to facilitate the coupling of the first signal into the TSD, the TSD is configured to detect not only interaction of the first user with the TSD, but also to identify the first user based on the first signal that is associated with the first user being coupled into the TSD. In the diagram, a light blue dot is shown at a location on the TSD at which the first user is interacting. This diagram corresponds to a single touch/interaction of the first user with the TSD.

FIG. 36B is a schematic block diagram of another embodiment 3602 of a touch sensor device (TSD), which may or may not include touchscreen display or display functionality, that is configured to distinguish separate user interaction from at least two users in accordance with the present invention. In this diagram, two light blue dots are shown at respective locations on the TSD at which the first user is interacting. This diagram corresponds to two touches/interactions of the first user with the TSD.

FIG. 36C is a schematic block diagram of another embodiment 3603 of a touch sensor device (TSD), which may or may not include touchscreen display or display functionality, that is configured to distinguish separate user interaction from at least two users in accordance with the present invention. In this diagram, five light blue dots are shown at respective locations on the TSD at which the first user is interacting. This diagram corresponds to five touches/interactions of the first user with the TSD.

FIG. 36D is a schematic block diagram of another embodiment 3604 of a touch sensor device (TSD), which may or may not include touchscreen display or display functionality, that is configured to distinguish separate user interaction from at least two users in accordance with the present invention. In this diagram, a second signal is associated with the second user (User 2). Based on the second user interacting with the TSD, such as touching the TSD or being within sufficient proximity to the TSD to facilitate the coupling of the second signal into the TSD, the TSD is configured to detect not only interaction of the second user with the TSD, but also to identify the second user based on the second signal that is associated with the second user being coupled into the TSD. In the diagram, a purple dot is shown at a location on the TSD at which the second user is interacting. This diagram corresponds to a single touch/interaction of the second user with the TSD.

FIG. 36E is a schematic block diagram of another embodiment 3605 of a touch sensor device (TSD), which may or may not include touchscreen display or display functionality, that is configured to distinguish separate user interaction from at least two users in accordance with the present invention. In this diagram, two purple dots are shown at respective locations on the TSD at which the second user is interacting. This diagram corresponds to two touches/interactions of the second user with the TSD FIG. 36F is a schematic block diagram of another embodiment 3606 of a touch sensor device (TSD), which may or may not include touchscreen display or display functionality, that is configured to distinguish separate user interaction from at least two users in accordance with the present invention. In this diagram, five purple dots are shown at respective locations on the TSD at which the second user is interacting. This diagram corresponds to five touches/interactions of the second user with the TSD.

FIG. 36G is a schematic block diagram of another embodiment 3607 of a touch sensor device (TSD), which may or may not include touchscreen display or display functionality, that is configured to distinguish separate user interaction from at least two users in accordance with the present invention. In the diagram, a light blue dot is shown at a location on the TSD at which the first user is interacting, and a purple dot is shown at a location on the TSD at which the second user is interacting. This diagram corresponds to a single touch/interaction of the first user with the TSD and also a single touch/interaction of the second user with the TSD.

FIG. 36H is a schematic block diagram of another embodiment 3608 of a touch sensor device (TSD), which may or may not include touchscreen display or display functionality, that is configured to distinguish separate user interaction from at least two users in accordance with the present invention. In this diagram, two light blue dots are shown at respective locations on the TSD at which the first user is interacting, and two purple dots are shown at respective locations on the TSD at which the second user is interacting. This diagram corresponds to two touches/interactions of the first user with the TSD and also two touches/interactions of the second user with the TSD.

FIG. 36I is a schematic block diagram of another embodiment 3609 of a touch sensor device (TSD), which may or may not include touchscreen display or display functionality, that is configured to distinguish separate user interaction from at least two users in accordance with the present invention. In this diagram, five light blue dots are shown at respective locations on the TSD at which the second user is interacting, and five purple dots are shown at respective locations on the TSD at which the second user is interacting. This diagram corresponds to five touches/interactions of the first user with the TSD and also five touches/interactions of the second user with the TSD.

FIG. 36J is a schematic block diagram of another embodiment 3610 of a touch sensor device (TSD), which may or may not include touchscreen display or display functionality, that is configured to distinguish separate user interaction from at least two users in accordance with the present invention. In this diagram, two light blue dots are shown at respective locations on the TSD at which the first user is interacting, and two purple dots are shown at respective locations on the TSD at which the second user is interacting. This diagram corresponds to two touches/interactions of the first user with the TSD and also two touches/interactions of the second user with the TSD. Note that the first user and the second user are both interacting with common row electrodes and column electrodes of the TSD. These touches/interactions of the first user and the second user may not be properly allocated to each user in certain instances. For example, because the first user and the second user or both interacting with common row electrodes and column electrodes of the TSD, there may be difficulty in determining which user is interacting at which particular location. In an example of operation and implementation, the TSD is configured to detect both the first signal and the second signal being coupled into a first one or more row electrodes and a second one or more row electrodes as well as being coupled into a first one or more column electrodes and a second one or more column electrodes corresponding to the four locations of the two touches/interactions of the first user with the TSD and also two touches/interactions of the second user with the TSD.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition— requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch sensor device comprising:
    a panel that includes a plurality of electrodes;
    a plurality of drive-sense circuits (DSCs) operably coupled to the plurality of electrodes, wherein a drive-sense circuit (DSC) of the plurality of DSCs operably coupled via a single line to an electrode of the plurality of electrodes, the DSC configured to:
        provide a signal via the single line to the electrode and simultaneously to sense the signal via the single line, wherein sensing of the signal includes detection of at least one of an electrical characteristic of the electrode or a change of the signal; and
        generate a digital signal representative of the at least one of at least one of the electrical characteristic of the electrode or the change of the signal; and
    memory that stores operational instructions; and
    one or more processing modules operably coupled to the plurality of DSCs and the memory, wherein, when enabled, the one or more processing modules is configured to execute the operational instructions to:
        process the digital signal to determine the at least one of at least one of the electrical characteristic of the electrode or the change of the signal;
        process a first plurality of digital signals generated by a first subset of the plurality of DSCs that includes fewer than all of the plurality of DSCs to identify first user interaction with the first subset of the plurality of DSCs before processing any other digital signals associated with any other area of the panel, wherein the first subset of the plurality of DSCs configured to service a first area of the panel that corresponds to a first one or more functions;

process a second plurality of digital signals generated by a second subset of the plurality of DSCs that is different than the first subset of the plurality of DSCs and that includes fewer than all of the plurality of DSCs to identify second user interaction with the second subset of the plurality of DSCs after processing the first plurality of digital signals, wherein the second subset of the plurality of DSCs configured to service a second area of the panel that corresponds to a second one or more functions; and facilitate operation of the first one or more functions before operation of any other functions.

2. The touch sensor device of claim 1, wherein:
the first one or more functions have a first priority; and
the second one or more functions have a second priority that is different than the first priority.

3. The touch sensor device of claim 2, wherein the first priority is a higher priority than the second priority such that the first one or more functions are higher priority functions than the second one or more functions.

4. The touch sensor device of claim 1, wherein:
the first area of the panel that corresponds to the first one or more functions includes a first subset of the plurality of electrodes having a first electrode density; and
the second area of the panel that corresponds to the second one or more functions includes a second subset of the plurality of electrodes having a second electrode density.

5. The touch sensor device of claim 4, wherein:
the first electrode density is greater than the second electrode density such that the first area of the panel includes more electrodes per unit area than the second area of the panel.

6. The touch sensor device of claim 1, wherein:
the panel that includes a first subset of the plurality of electrodes arranged in a first direction and a second subset of the plurality of electrodes arranged in a second direction.

7. The touch sensor device of claim 1, wherein, when enabled, the one or more processing modules is further configured to execute the operational instructions to:
facilitate operation of the second one or more functions after facilitating operation of the first one or more functions.

8. The touch sensor device of claim 1, wherein the touch sensor device implemented within a component of a vehicle.

9. The touch sensor device of claim 8, wherein vehicle is an automobile, an aircraft, a boat, or a spacecraft.

10. The touch sensor device of claim 8, wherein the component of the vehicle is a steering wheel, a touchscreen within vehicle, a navigation system, or an armrest.

11. The touch sensor device of claim 1, wherein the DSC is further configured to generate the signal based on a reference signal.

12. The touch sensor device of claim 1, wherein the DSC of the plurality of DSCs further comprises:
a power source circuit operably coupled via the single line to the electrode, wherein, when enabled, the power source circuit is configured to provide an analog signal via the single line coupling to the electrode, and wherein the analog signal includes at least one of a DC (direct current) component or an oscillating component; and a power source change detection circuit operably coupled to the power source circuit, wherein, when enabled, the power source change detection circuit is configured to:
detect an effect on the analog signal that is based on the at least one of at least one of the electrical characteristic of the electrode or the change of the signal; and
generate a digital signal representative of the at least one of at least one of the electrical characteristic of the electrode or the change of the signal.

13. The touch sensor device of claim 12 further comprising:
the power source circuit including a power source to source at least one of a voltage or a current via the single line to the electrode; and
the power source change detection circuit including:
a power source reference circuit configured to provide at least one of a voltage reference or a current reference; and
a comparator configured to compare the at least one of the voltage or the current provided via the single line to the electrode to the at least one of the voltage reference or the current reference in accordance with producing the analog signal.

14. A touch sensor device comprising:
a panel that includes a plurality of electrodes;
a plurality of drive-sense circuits (DSCs) operably coupled to the plurality of electrodes, wherein a drive-sense circuit (DSC) of the plurality of DSCs operably coupled via a single line to an electrode of the plurality of electrodes, the DSC configured to:
generate a signal based on a reference signal;
provide the signal via the single line to the electrode and simultaneously to sense the signal via the single line, wherein sensing of the signal includes detection of at least one of an electrical characteristic of the electrode or a change of the signal; and
generate a digital signal representative of the at least one of at least one of the electrical characteristic of the electrode or the change of the signal; and
memory that stores operational instructions; and
one or more processing modules operably coupled to the plurality of DSCs and the memory, wherein, when enabled, the one or more processing modules is configured to execute the operational instructions to:
process the digital signal to determine the at least one of at least one of the electrical characteristic of the electrode or the change of the signal;
process a first plurality of digital signals generated by a first subset of the plurality of DSCs that includes fewer than all of the plurality of DGs DSCs to identify first user interaction with the first subset of the plurality of DSCs before processing any other digital signals associated with any other area of the panel, wherein the first subset of the plurality of DSCs configured to service a first area of the panel that corresponds to a first one or more functions;
process a second plurality of digital signals generated by a second subset of the plurality of DSCs that is different than the first subset of the plurality of DSCs and that includes fewer than all of the plurality of DSCs to identify second user interaction with the second subset of the plurality of DSCs after processing the first plurality of digital signals, wherein the second subset of the plurality of DSCs configured to service a second area of the panel that corresponds to a second one or more functions; and facilitate operation of the first one or more functions before operation of any other functions; and wherein:
the first one or more functions have a first priority; and
the second one or more functions have a second priority that is different than the first priority.

15. The touch sensor device of claim 14, wherein, when enabled, the one or more processing modules is further configured to execute the operational instructions to:
facilitate operation of the second one or more functions after facilitating operation of the first one or more functions.

16. The touch sensor device of claim 14, wherein the touch sensor device implemented within a component of a vehicle.

17. The touch sensor device of claim 16, wherein vehicle is an automobile, an aircraft, a boat, or a spacecraft.

18. The touch sensor device of claim 16, wherein the component of the vehicle is a steering wheel, a touchscreen within vehicle, a navigation system, or an armrest.

19. The touch sensor device of claim 14, wherein the DSC of the plurality of DSCs further comprises:
a power source circuit operably coupled via the single line to the electrode, wherein, when enabled, the power source circuit is configured to provide an analog signal via the single line coupling to the electrode, and wherein the analog signal includes at least one of a DC (direct current) component or an oscillating component; and a power source change detection circuit operably coupled to the power source circuit, wherein, when enabled, the power source change detection circuit is configured to:
detect an effect on the analog signal that is based on the at least one of at least one of the electrical characteristic of the electrode or the change of the signal; and
generate a digital signal representative of the at least one of at least one of the electrical characteristic of the electrode or the change of the signal.

20. The touch sensor device of claim 19 further comprising:
the power source circuit including a power source to source at least one of a voltage or a current via the single line to the electrode; and
the power source change detection circuit including:
a power source reference circuit configured to provide at least one of a voltage reference or a current reference; and
a comparator configured to compare the at least one of the voltage or the current provided via the single line to the electrode to the at least one of the voltage reference or the current reference in accordance with producing the analog signal.

* * * * *